(12) United States Patent
Tang et al.

(10) Patent No.: US 10,520,705 B2
(45) Date of Patent: Dec. 31, 2019

(54) IMAGING LENS SYSTEM, IMAGE CAPTURING UNIT AND ELECTRONIC DEVICE

(71) Applicant: LARGAN Precision Co., Ltd., Taichung (TW)

(72) Inventors: Hsiang-Chi Tang, Taichung (TW); Cheng-Chen Lin, Taichung (TW); Chun-Yen Chen, Taichung (TW); Hsin-Hsuan Huang, Taichung (TW)

(73) Assignee: LARGAN Precision Co., Ltd., Taichung (TW)

(*) Notice: Subject to any disclaimer, the term of this patent is extended or adjusted under 35 U.S.C. 154(b) by 179 days.

(21) Appl. No.: 15/861,375

(22) Filed: Jan. 3, 2018

(65) Prior Publication Data

US 2019/0033556 A1    Jan. 31, 2019

(30) Foreign Application Priority Data

Jul. 26, 2017   (TW) .............................. 106125155 A

(51) Int. Cl.
  *G02B 9/62* (2006.01)
  *G02B 13/00* (2006.01)
  *H04N 5/225* (2006.01)
  *G02B 27/00* (2006.01)

(52) U.S. Cl.
  CPC ........... *G02B 13/0045* (2013.01); *G02B 9/62* (2013.01); *G02B 27/0025* (2013.01); *H04N 5/2254* (2013.01)

(58) Field of Classification Search
  CPC .............................. G02B 13/0045; G02B 9/62
  USPC .......................................................... 359/713
  See application file for complete search history.

(56) References Cited

U.S. PATENT DOCUMENTS

| | | | |
|---|---|---|---|
| 8,390,940 B2 * | 3/2013 | Tsai | G02B 13/0045 359/713 |
| 8,854,745 B1 | 10/2014 | Chen | |
| 9,036,272 B2 | 5/2015 | Huang | |
| 9,063,271 B2 * | 6/2015 | Huang | G02B 3/04 |
| 9,389,397 B2 * | 7/2016 | Tang | G02B 13/0045 |
| 2016/0011401 A1 | 1/2016 | Chen et al. | |
| 2016/0103300 A1 | 4/2016 | Tang et al. | |
| 2017/0146776 A1 | 5/2017 | Kang et al. | |

FOREIGN PATENT DOCUMENTS

| | | |
|---|---|---|
| CN | 204556941 A | 8/2015 |
| CN | 107092082 A | 8/2017 |
| JP | 102272513 A | 11/1990 |
| JP | 2013210543 A | 10/2013 |
| TW | I574040 B | 3/2017 |

* cited by examiner

*Primary Examiner* — Zachary W Wilkes
(74) *Attorney, Agent, or Firm* — Hanley, Flight & Zimmerman, LLC

(57) ABSTRACT

An imaging lens system includes six lens elements, which are, in order from an object side to an image side: a first lens element, a second lens element, a third lens element, a fourth lens element, a fifth lens element and a sixth lens element. The sixth lens element has an image-side surface being concave in a paraxial region thereof. The image-side surface of the sixth lens element has at least one inflection point.

30 Claims, 32 Drawing Sheets

IMAGING LENS SYSTEM, IMAGE CAPTURING UNIT AND ELECTRONIC DEVICE

RELATED APPLICATIONS

This application claims priority under 35 U.S.C. § 119 to Taiwan Application 106125155, filed Jul. 26, 2017, which is incorporated by reference herein in its entirety.

BACKGROUND

Technical Field

The present disclosure relates to an imaging lens system, an image capturing unit and an electronic device, more particularly to an imaging lens system and an image capturing unit applicable to an electronic device.

Description of Related Art

In recent years, with the popularity of electronic devices having camera functionalities, the demand of miniaturized optical systems has been increasing. As advanced semiconductor manufacturing technologies have reduced the pixel size of sensors, and compact optical systems have gradually evolved toward the field of higher megapixels, there is an increasing demand for compact optical systems featuring better image quality.

For various applications, the optical systems have been widely applied to different kinds of electronic devices, such as vehicle devices, image recognition systems, entertainment devices, sport devices and intelligent home assistance systems. In particular, portable electronic devices equipped with the optical systems are now more demanding than ever. Furthermore, in order to provide better user experience, the electronic device equipped with one or more optical systems has become the mainstream product on the market, and the optical systems are developed with various optical characteristics according to different requirements.

Due to the size restrictions of conventional miniaturized optical systems, the amount of incident light entering the optical systems is small, which results in low image brightness, and thereby leading to poor image quality. Furthermore, conventional optical systems featuring high image quality and high image brightness are usually large in size, making them inconvenient for carrying, and their production cost is relatively high, such that it is difficult for the optical systems to be applicable to various kinds of electronic devices. However, with the development and the popularity of camera modules, optical systems capable of operating in different environmental conditions are becoming the leading product in the near future. Accordingly, the conventional optical systems have been unable to satisfy the demands of the current technology trends.

SUMMARY

According to one aspect of the present disclosure, an imaging lens system includes six lens elements. The six lens elements are, in order from an object side to an image side, a first lens element, a second lens element, a third lens element, a fourth lens element, a fifth lens element and a sixth lens element. The sixth lens element has an image-side surface being concave in a paraxial region thereof, and the image-side surface of the sixth lens element has at least one inflection point. When an axial distance between an object-side surface of the first lens element and an image surface is TL, a maximum image height of the imaging lens system is ImgH, an entrance pupil diameter of the imaging lens system is EPD, an Abbe number of the first lens element is V1, an Abbe number of the second lens element is V2, an Abbe number of the third lens element is V3, an Abbe number of the fourth lens element is V4, a focal length of the imaging lens system is f, and a focal length of the fifth lens element is f5, the following conditions are satisfied:

$1.0<(TL)^2/(ImgH\times EPD)<5.0;$ $3.50<[(V1-V3)\times(V1-V4)]/[(V3-V2)\times(V4-V2)]<220;$ $1.0<TL/EPD<2.50;$ and $-0.10<f/f5<2.50.$ According to another aspect of the present disclosure, an imaging lens system includes six lens elements. The six lens elements are, in order from an object side to an image side, a first lens element, a second lens element, a third lens element, a fourth lens element, a fifth lens element and a sixth lens element. The second lens element has negative refractive power. The sixth lens element has an image-side surface being concave in a paraxial region thereof, and the image-side surface of the sixth lens element has at least one inflection point. When an axial distance between an object-side surface of the first lens element and an image surface is TL, a maximum image height of the imaging lens system is ImgH, an entrance pupil diameter of the imaging lens system is EPD, an Abbe number of the third lens element is V3, an Abbe number of the fourth lens element is V4, a focal length of the imaging lens system is f, and a focal length of the third lens element is f3, the following conditions are satisfied:

$1.0<(TL)^2/(ImgH\times EPD)<3.40;$ $10.0<V3<35.0;$ $10.0<V4<35.0;$ and $-1.50<f/f3<0.90.$ According to still another aspect of the present disclosure, an image capturing unit includes the aforementioned imaging lens system, a driving device and an image sensor, wherein the driving device is disposed on the imaging lens system, and the image sensor is disposed on the image surface of the imaging lens system.

According to yet another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
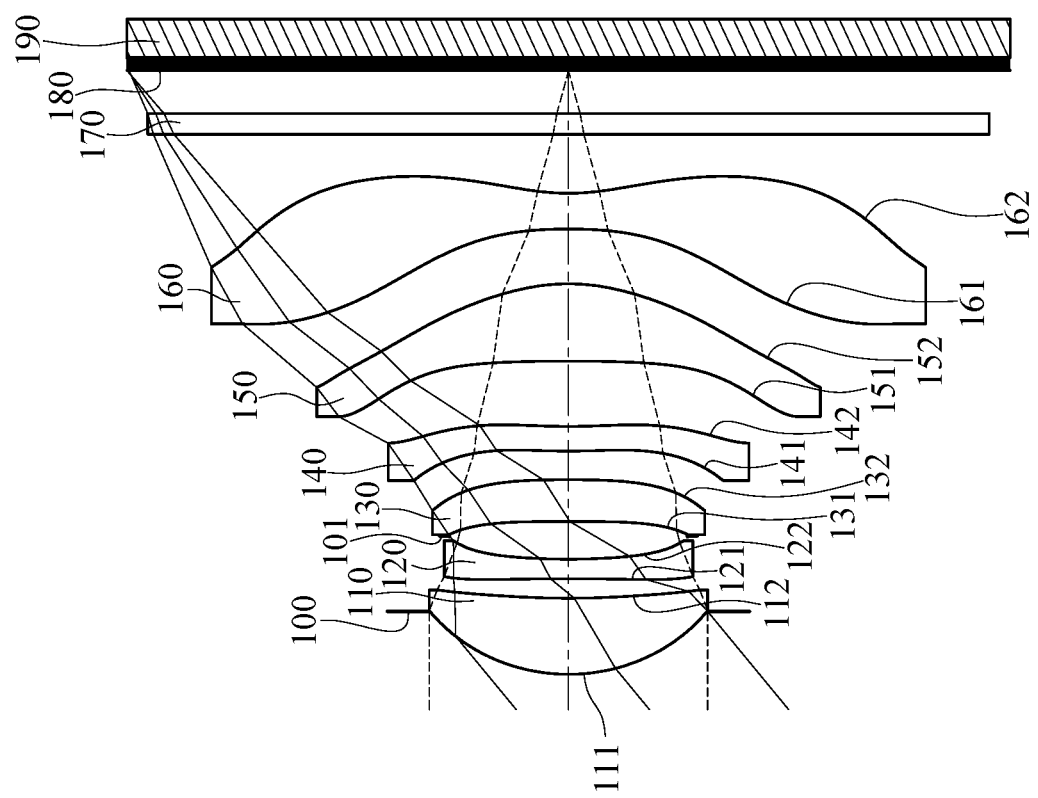
FIG. 1 is a schematic view of an image capturing unit according to the 1st embodiment of the present disclosure.

An imaging lens system includes six lens elements. The six lens elements are, in order from an object side to an image side, a first lens element, a second lens element, a third lens element, a fourth lens element, a fifth lens element and a sixth lens element.

The first lens element can have an object-side surface being convex in a paraxial region thereof and an image-side surface being concave in a paraxial region thereof. Therefore, it is favorable for correcting field curvature so as to provide high image quality.

The second lens element can have negative refractive power; therefore, it is favorable for correcting chromatic aberration so as to prevent image overlaps due to light rays with different wavelengths focusing on different positions. The second lens element can have an object-side surface being convex in a paraxial region thereof and an image-side surface being concave in a paraxial region thereof; therefore, it is favorable for light in both the tangential direction and the sagittal direction converging so as to correct astigmatism.

The third lens element can have an object-side surface being convex in a paraxial region thereof and an image-side surface being concave in a paraxial region thereof. Therefore, it is favorable for correcting aberrations generated by the second lens element so as to improve the image quality.

The fifth lens element can have positive refractive power. Therefore, it is favorable for balancing the refractive power distribution of the imaging lens system so as to reduce sensitivity.

The sixth lens element can have negative refractive power; therefore, it is favorable for effectively reducing a back focal length, such that the imaging lens system is able to be installed in compact electronic devices. The sixth lens element can have an object-side surface being convex in a paraxial region thereof; therefore, it is favorable for correcting field curvature so as to improve peripheral image quality. The sixth lens element has an image-side surface being concave in a paraxial region thereof; therefore, it is favorable for reducing the back focal length of the imaging lens system so as to achieve compactness. The image-side surface of the sixth lens element has at least one inflection point; therefore, it is favorable for correcting off-axis aberrations and improving the Petzval field curvature so as to reduce the size of the imaging lens system and provide high image quality. The image-side surface of the sixth lens element can have a concave-to-convex shape change and a convex-to-concave shape change in order from the paraxial region thereof to an off-axis region thereof; therefore, it is favorable for reducing distortion and preventing vignetting in the peripheral region of the image, and also favorable for correcting off-axis aberrations.

Each of the image-side surface of the third lens element, an image-side surface of the fourth lens element, an image-side surface of the fifth lens element, and the image-side surface of the sixth lens element can have at least one convex shape in an off-axis region thereof. Therefore, it is favorable for correcting off-axis aberrations and preventing total reflection due to an overly large incident angle on the surfaces of the lens elements.

When an axial distance between the object-side surface of the first lens element and an image surface is TL, a maximum image height of the imaging lens system (half of a diagonal length of an effective photosensitive area of an image sensor) is ImgH, and an entrance pupil diameter of the imaging lens system is EPD, the following condition is satisfied: $1.0<(TL)^2/(ImgH\times EPD)<5.0$. Therefore, it is favorable for the imaging lens system to have sufficient entrance pupil opening so as to increase image brightness; furthermore, it is favorable for reducing a total track length of the imaging lens system so as to be applicable to a wide range of applications. Preferably, the following condition can be satisfied: $1.0<(TL)^2/(ImgH\times EPD)<3.40$. More preferably, the following condition can also be satisfied: $1.70<(TL)^2/(ImgH\times EPD)<3.0$.

When an Abbe number of the first lens element is V1, an Abbe number of the second lens element is V2, an Abbe number of the third lens element is V3, and an Abbe number of the fourth lens element is V4, the following condition can be satisfied: $3.50<[(V1-V3)\times(V1-V4)]/[(V3-V2)\times(V4-V2)]<220$. Therefore, it is favorable for selecting proper materials of the first through the fourth lens elements so as to obtain a balance between high image quality and short total track length, thereby meeting the requirements of compactness and large aperture. Preferably, the following condition can be satisfied: $5.0<[(V1-V3)\times(V1-V4)]/[(V3-V2)\times(V4-V2)]<150$. More preferably, the following condition can be satisfied: $8.0<[(V1-V3)\times(V1-V4)]/[(V3-V2)\times(V4-V2)]<80$. Much more preferably, the following condition can also be satisfied: $10.0<[(V1-V3)\times(V1-V4)]/[(V3-V2)\times(V4-V2)]<50$.

When the axial distance between the object-side surface of the first lens element and the image surface is TL, and the entrance pupil diameter of the imaging lens system is EPD, the following condition can be satisfied: $1.0<TL/EPD<2.50$. Therefore, it is favorable for obtaining sufficient amount of incident light and proper total track length so as to provide high image quality with high-end specifications.

When a focal length of the imaging lens system is f, and a focal length of the fifth lens element is f5, the following condition can be satisfied: $-0.10<f/f5<2.50$. Therefore, it is favorable for balancing the refractive power distribution on the image side of the imaging lens system so as to prevent total reflection due to an overly large incident angle on the surfaces of the lens elements.

When the Abbe number of the third lens element is V3, the following condition can be satisfied: $10.0<V3<35.0$. Therefore, due to a larger density difference between a high-dispersion material (low Abbe number) and air, it is favorable for obtaining stronger refractive capability, such that light is properly refracted within a shorter distance for reducing the size of the imaging lens system. Preferably, the following condition can be satisfied: $15.0<V3<30.0$. More preferably, the following condition can also be satisfied: $24.0<V3<30.0$.

When the Abbe number of the fourth lens element is V4, the following condition can be satisfied: $10.0<V4<35.0$. Therefore, due to a larger density difference between a high-dispersion material (low Abbe number) and air, it is favorable for obtaining stronger refractive capability, such that light is properly refracted within a shorter distance for reducing the size of the imaging lens system. Preferably, the following condition can be satisfied: $15.0<V4<30.0$. More preferably, the following condition can also be satisfied: $24.0<V4<30.0$.

When the focal length of the imaging lens system is f, and a focal length of the third lens element is f3, the following condition can be satisfied: $-1.50<f/f3<0.90$. Therefore, it is favorable for configuring the refractive power of the third lens element in the imaging lens system to have better capability of correcting off-axis aberrations. Preferably, the following condition can be satisfied: $-0.7<f/f3<0.60$. More preferably, the following condition can also be satisfied: $-0.4<f/f3<0.30$.

When the Abbe number of the first lens element is V1, the Abbe number of the second lens element is V2, the Abbe number of the third lens element is V3, the Abbe number of the fourth lens element is V4, an Abbe number of the fifth lens element is V5, and an Abbe number of the sixth lens element is V6, the following condition can be satisfied: $V2<V3<V1$; $V2<V3<V5$; $V2<V3<V6$; $V2<V4<V1$; $V2<V4<V5$; and $V2<V4<V6$. Therefore, the materials for the lens elements are properly configured so that it is favorable for the imaging lens system to be applicable to a wide range of applications.

According to the present disclosure, the imaging lens system further includes an aperture stop, and the aperture stop can be located between an imaged object and the second lens element. When an axial distance between the aperture stop and the image-side surface of the sixth lens element is SD, and an axial distance between the object-side surface of the first lens element and the image-side surface of the sixth lens element is TD, the following condition can be satisfied: $0.73<SD/TD<1.10$. Therefore, by adjusting the position of the aperture stop, it is favorable for balancing between the field of view and the total track length of the imaging lens system so as to obtain compactness and become applicable to various applications.

When the focal length of the imaging lens system is f, the focal length of the third lens element is f3, and a focal length of the fourth lens element is f4, the following condition can be satisfied: $|f/f3|+|f/f4|<0.70$. Therefore, it is favorable for controlling the changes of the refractive power of the middle section of the imaging lens system so as to configure the third and the fourth lens elements as correction lenses for improving the capability of correcting aberrations in the off-axis region. Preferably, the following condition can be satisfied: $|f/f3|+|f/f4|<0.50$. More preferably, the following condition can also be satisfied: $|f/f3|+1f/f4|<0.30$.

When an axial distance between the second lens element and the third lens element is T23, an axial distance between the fourth lens element and the fifth lens element is T45, a central thickness of the second lens element is CT2, a central thickness of the third lens element is CT3, and a central thickness of the fourth lens element is CT4, the following condition can be satisfied: $0.80<(T23+T45)/(CT2+CT3+CT4)<1.80$. Therefore, it is favorable for obtaining a proper space arrangement of the imaging lens system with proper axial distances between the lens elements so as to correct aberrations.

According to the present disclosure, at least one lens element of the six lens elements of the imaging lens system can satisfy the following conditions: the focal length of the imaging lens system is f; a curvature radius of an object-side surface of the at least one lens element is Rf; a curvature radius of an image-side surface of the at least one lens element is Rr; and $|f/Rf|+|f/Rr|<0.80$. Therefore, it is favorable for controlling the refractive power of a single lens element so as to prevent total reflection due to overly curved surfaces of the lens element, thereby reducing unwanted spots on the image. Preferably, the following condition can be satisfied: $|f/Rf|+|f/Rr|<0.50$. More preferably, the following condition can also be satisfied: $|f/Rf|+|f/Rr|<0.30$.

When the axial distance between the object-side surface of the first lens element and the image surface is TL, and the maximum image height of the imaging lens system is ImgH, the following condition can be satisfied: $0.70<TL/$ ImgH<1.45. Therefore, it is favorable for miniaturizing the imaging lens system while obtaining a sufficient light receiving area with increased image brightness, thereby improving the image quality.

When the entrance pupil diameter of the imaging lens system is EPD, and the focal length of the imaging lens system is f, the following condition can be satisfied: 0.90<f/EPD<1.95. Therefore, it is favorable for providing sufficient amount of incident light so as to increase image resolution. Preferably, the following condition can also be satisfied: 1.0<f/EPD<1.87.

When the focal length of the imaging lens system is f, and a composite focal length of the first lens element and the second lens element is f12, the following condition can be satisfied: 0<f/f12<1.80. Therefore, it is favorable for providing sufficient light convergence capability from the first and the second lens elements so as to reduce the total track length of the imaging lens system for compactness.

When the Abbe number of the third lens element is V3, and a refractive index of the third lens element is N3, the following condition can be satisfied: 15.0<V3/N3<25.0. Therefore, it is favorable for increasing the density difference between the third lens element and air so as to enhance the capability of aberration corrections of the third lens element. Preferably, the following condition can also be satisfied: 15.0<V3/N3<20.0.

Figure 31:
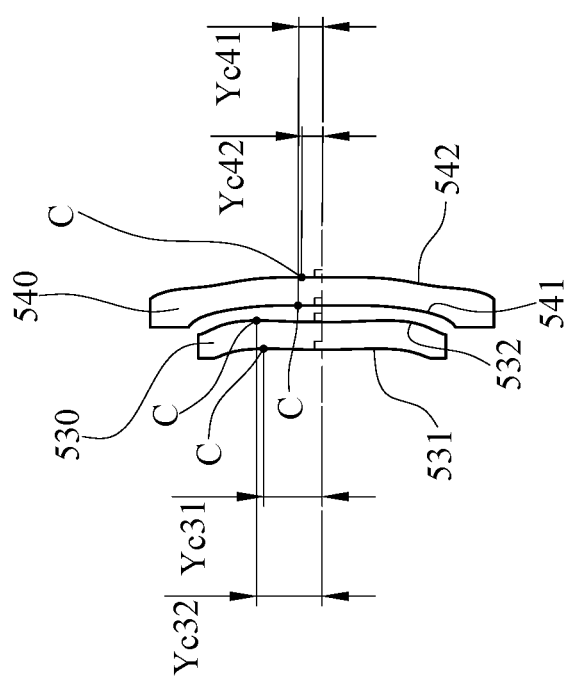
FIG. 31 shows a schematic view of Yc31, Yc32, Yc41 and Yc42 according to the 5th embodiment of the present disclosure.

When a vertical distance between a non-axial critical point on the object-side surface of the third lens element and an optical axis is Yc31, and a vertical distance between a non-axial critical point on the image-side surface of the third lens element and the optical axis is Yc32, the following condition can be satisfied: 0.50<Yc31/Yc32<1.80. Therefore, it is favorable for enhancing the curvature variation of the surfaces of the third lens element so as to correct off-axis aberrations. Please refer to FIG. 31, which shows a schematic view of Yc31 and Yc32 according to the 5th embodiment of the present disclosure.

When half of a maximum field of view of the imaging lens system is HFOV, the following condition can be satisfied: 0.75<tan(HFOV)<1.40. Therefore, it is favorable for adjusting the field of view, such that the imaging lens system is applicable to a wide range of applications.

When the Abbe number of the fourth lens element is V4, and a refractive index of the fourth lens element is N4, the following condition can be satisfied: 15.0<V4/N4<25.0. Therefore, it is favorable for enhancing the capability of aberration corrections of the fourth lens element by increasing the density difference between the fourth lens element and air. Preferably, the following condition can also be satisfied: 15.0<V4/N4<20.0.

When the Abbe number of the second lens element is V2, the Abbe number of the third lens element is V3, and the Abbe number of the fourth lens element is V4, the following condition can be satisfied: 30<V2+V3+V4<90. Therefore, the materials of the second, the third and the fourth lens elements are properly selected so as to increase the density difference between each lens element and air, thereby strengthening the refractive power of the lens elements; thus, light is properly refracted within a shorter distance, and therefore it is favorable for the imaging lens system to obtain compactness. Preferably, the following condition can also be satisfied: 68<V2+V3+V4<82.

When the entrance pupil diameter of the imaging lens system is EPD, the maximum image height of the imaging lens system is ImgH, and the axial distance between the object-side surface of the first lens element and the image surface is TL, the following condition can be satisfied: 0.50<TL/(EPD+ImgH)<0.90. Therefore, it is favorable for the imaging lens system to have proper aperture size and image size so as to obtain high image quality within a shorter traveling distance of light in the imaging lens system. Preferably, the following condition can also be satisfied: 0.55<TL/(EPD+ImgH)<0.85.

When a curvature radius of the object-side surface of the third lens element is R5, a curvature radius of the image-side surface of the third lens element is R6, a curvature radius of an object-side surface of the fourth lens element is R7, and a curvature radius of the image-side surface of the fourth lens element is R8, the following condition can be satisfied: |(R5−R6)/(R5+R6)|+|(R7−R8)/(R7+R8)|<1.20. Therefore, the curvatures of the surfaces of the third and the fourth lens elements are favorable for correcting astigmatism and balancing the shape distribution of the lens elements so as to improve the image quality. Preferably, the following condition can also be satisfied: |(R5−R6)/(R5+R6)|+|(R7−R8)/(R7+R8)|<0.60.

When a curvature radius of an object-side surface of the fifth lens element is R9, and a curvature radius of the image-side surface of the fifth lens element is R10, the following condition can be satisfied: −4.0<(R9−R10)/(R9+R10)<1.0. Therefore, it is favorable for controlling the refractive power and the surface shapes of the fifth lens element so as to increase the capability of aberration corrections, and thereby obtaining high image quality. Preferably, the following condition can also be satisfied: −1.0<(R9−R10)/(R9+R10)<1.0.

When the maximum image height of the imaging lens system is ImgH, and an f-number of the imaging lens system is Fno, the following condition can be satisfied: 1.80 [mm] <ImgH/Fno<3.50 [mm]. Therefore, it is favorable for increasing the light receiving area so as to increase image brightness, such that high resolution and brightness images can be captured. Preferably, the following condition can be satisfied: 2.10 [mm]<ImgH/Fno<3.5 [mm]. More preferably, the following condition can also be satisfied: 2.35 [mm] <ImgH/Fno<3.5 [mm].

When the central thickness of the second lens element is CT2, the central thickness of the third lens element is CT3, the central thickness of the fourth lens element is CT4, and the maximum image height of the imaging lens system is ImgH, the following condition can be satisfied: 0.05<(CT2+CT3+CT4)/ImgH<0.25. Therefore, the thicknesses of the second, the third and the fourth lens elements are favorable for reducing the total track length, such that the imaging lens system is applicable to compact devices while having a sufficient field of view.

Figure 32:
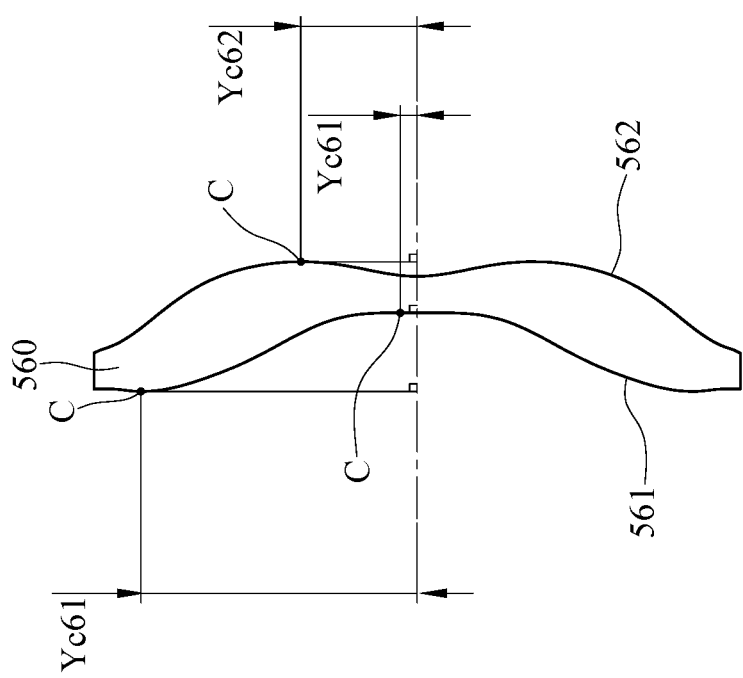
FIG. 32 shows a schematic view of Yc61 and Yc62 according to the 5th embodiment of the present disclosure.

When a vertical distance between a non-axial critical point on the object-side surface of the sixth lens element and the optical axis is Yc61, and a vertical distance between a non-axial critical point on the image-side surface of the sixth lens element and the optical axis is Yc62, the following condition can be satisfied: 0.10<Yc61/Yc62<4.0. Therefore, it is favorable for controlling the incident angle in the off-axis region for reducing vignetting at the image periphery, and correcting off-axis aberrations while obtaining sufficient image height and image capturing range. Please refer to FIG. 32, which shows a schematic view of Yc61 and Yc62 according to the 5th embodiment of the present disclosure.

When a vertical distance between a non-axial critical point on the object-side surface of the fourth lens element and the optical axis is Yc41, and a vertical distance between a non-axial critical point on the image-side surface of the fourth lens element and the optical axis is Yc42, the following condition can be satisfied: 0.50<Yc41/Yc42<2.0. Therefore, it is favorable for adjusting the surface shapes of the fourth lens element so as to correct aberrations, and thereby improving the image quality. Please refer to FIG. 31, which shows a schematic view of Yc41 and Yc42 according to the 5th embodiment of the present disclosure.

According to the present disclosure, the lens elements thereof can be made of glass or plastic material. When the lens elements are made of glass material, the distribution of the refractive power of the imaging lens system may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the imaging lens system can also be reduced.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, an image surface of the imaging lens system, based on the corresponding image sensor, can be flat or curved, especially a curved surface being concave facing towards the object side of the imaging lens system.

According to the present disclosure, an image correction unit, such as a field flattener, can be optionally disposed between the lens element closest to the image side of the imaging lens system and the image surface for correcting aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the imaging lens system can include at least one stop, such as an aperture stop, a glare stop or a field stop. Said glare stop or said field stop is set for eliminating the stray light and thereby improving the image quality thereof.

According to the present disclosure, an aperture stop can be configured as a front stop or a middle stop. A front stop disposed between an imaged object and the first lens element can provide a longer distance between an exit pupil of the imaging lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging lens system and thereby provides a wider field of view for the same.

According to the above description of the present disclosure, the following specific embodiments are provided for further explanation.

1st Embodiment

Figure 2:
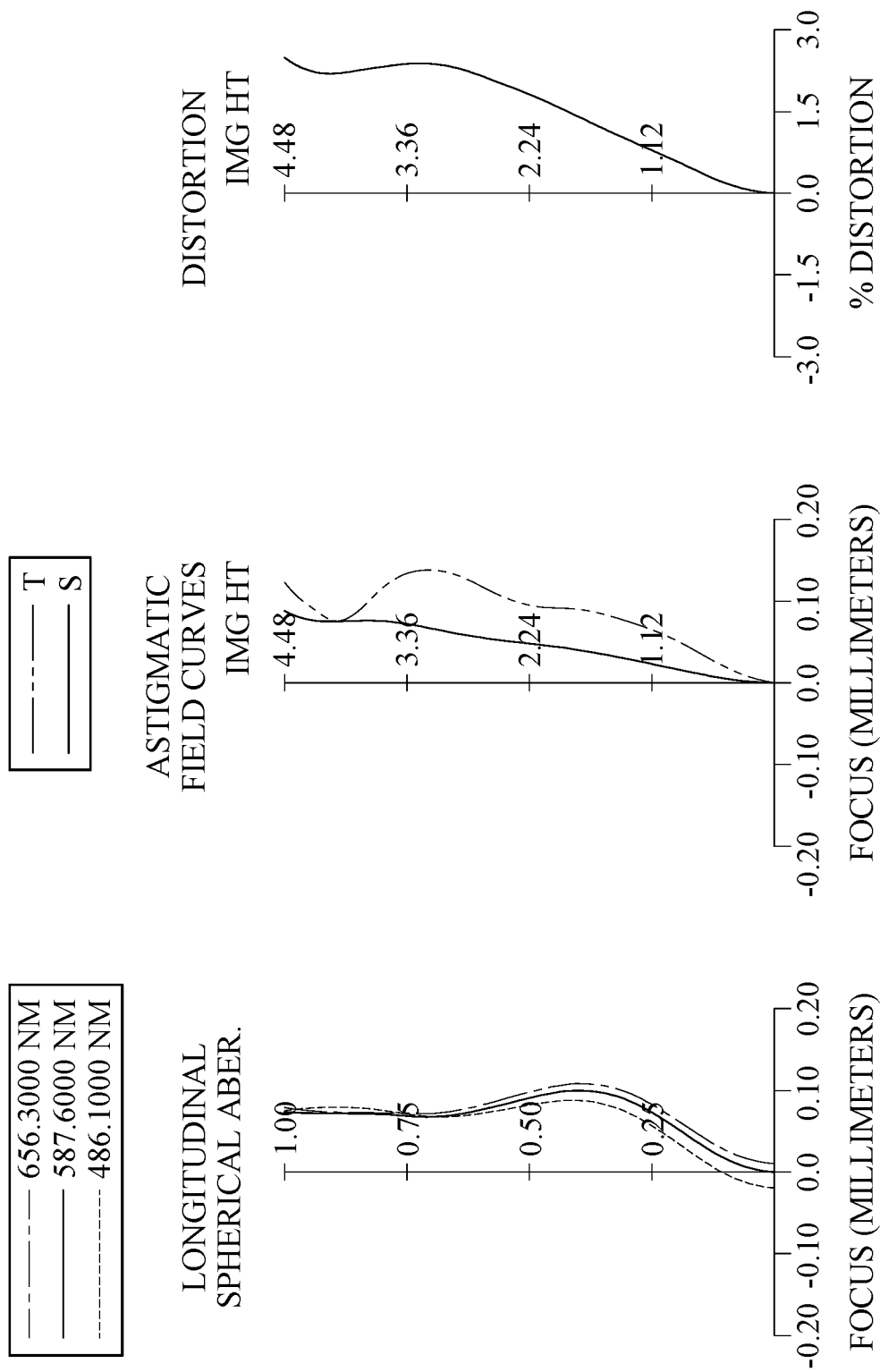
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the imaging lens system (its reference numeral is omitted) of the present disclosure and an image sensor 190. The imaging lens system includes, in order from an object side to an image side, an aperture stop 100, a first lens element 110, a second lens element 120, a stop 101, a third lens element 130, a fourth lens element 140, a fifth lens element 150, a sixth lens element 160, a filter 170 and an image surface 180. The imaging lens system includes six lens elements (110, 120, 130, 140, 150 and 160) with no additional lens element disposed between each of the adjacent six lens elements.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being concave in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being concave in a paraxial region thereof and an image-side surface 132 being convex in a paraxial region thereof. The third lens element 130 is made of plastic material and has the object-side surface 131 and the image-side surface 132 being both aspheric.

The fourth lens element 140 with negative refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. Each of the object-side surface 141 and the image-side surface 142 of the fourth lens element 140 has at least one critical point. The image-side surface 142 of the fourth lens element 140 has at least one convex shape in an off-axis region thereof.

The fifth lens element 150 with positive refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric. The image-side surface 152 of the fifth lens element 150 has at least one convex shape in an off-axis region thereof.

The sixth lens element 160 with negative refractive power has an object-side surface 161 being concave in a paraxial region thereof and an image-side surface 162 being concave in a paraxial region thereof. The sixth lens element 160 is made of plastic material and has the object-side surface 161 and the image-side surface 162 being both aspheric. Each of the object-side surface 161 and the image-side surface 162 of the sixth lens element 160 has at least one critical point. The image-side surface 162 of the sixth lens element 160 has at least one inflection point. The image-side surface 162 of the sixth lens element 160 has at least one convex shape in an off-axis region thereof. The image-side surface 162 of the sixth lens element 160 has a concave-to-convex shape change and then a convex-to-concave shape change in order from the paraxial region thereof to the off-axis region thereof.

The filter 170 is made of glass material and located between the sixth lens element 160 and the image surface 180, and will not affect the focal length of the imaging lens system. The image sensor 190 is disposed on or near the image surface 180 of the imaging lens system.

The equation of the aspheric surface profiles of the aforementioned lens elements of the 1st embodiment is expressed as follows:

$$X(Y) = (Y^2/R)/\left(1 + sqrt(1 - (1+k)\times(Y/R)^2)\right) + \sum_i (Ai)\times(Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the imaging lens system of the image capturing unit according to the 1st embodiment, when a focal length of the imaging lens system is f, an f-number of the imaging lens system is Fno, and half of a maximum field of view of the imaging lens system is HFOV, these parameters have the following values: f=5.24 millimeters (mm), Fno=1.85, HFOV=39.5 degrees (deg.).

When an Abbe number of the third lens element 130 is V3, the following condition is satisfied: V3=26.0.

When an Abbe number of the fourth lens element 140 is V4, the following condition is satisfied: V4=26.0.

When the Abbe number of the third lens element 130 is V3, and a refractive index of the third lens element 130 is N3, the following condition is satisfied: V3/N3=16.11.

When the Abbe number of the fourth lens element 140 is V4, and a refractive index of the fourth lens element 140 is N4, the following condition is satisfied: V4/N4=16.11.

When an Abbe number of the second lens element 120 is V2, the Abbe number of the third lens element 130 is V3, and the Abbe number of the fourth lens element 140 is V4, the following condition is satisfied: V2+V3+V4=71.3.

When an Abbe number of the first lens element 110 is V1, the Abbe number of the second lens element 120 is V2, the Abbe number of the third lens element 130 is V3, and the Abbe number of the fourth lens element 140 is V4, the following condition is satisfied: $[(V1-V3)\times(V1-V4)]/[(V3-V2)\times(V4-V2)]=20.18$.

When a central thickness of the second lens element 120 is CT2, a central thickness of the third lens element 130 is CT3, a central thickness of the fourth lens element 140 is CT4, and a maximum image height of the imaging lens system is ImgH, the following condition is satisfied: (CT2+CT3+CT4)/ImgH=0.20.

When an axial distance between the second lens element 120 and the third lens element 130 is T23, an axial distance between the fourth lens element 140 and the fifth lens element 150 is T45, the central thickness of the second lens element 120 is CT2, the central thickness of the third lens element 130 is CT3, and the central thickness of the fourth lens element 140 is CT4, the following condition is satisfied: (T23+T45)/(CT2+CT3+CT4)=1.19. In this embodiment, an axial distance between two adjacent lens elements is an air gap in a paraxial region between the two adjacent lens elements.

When a curvature radius of the object-side surface 151 of the fifth lens element 150 is R9, and a curvature radius of the image-side surface 152 of the fifth lens element 150 is R10, the following condition is satisfied: (R9−R10)/(R9+R10) =0.84.

When a curvature radius of the object-side surface 131 of the third lens element 130 is R5, a curvature radius of the image-side surface 132 of the third lens element 130 is R6, a curvature radius of the object-side surface 141 of the fourth lens element 140 is R7, and a curvature radius of the image-side surface 142 of the fourth lens element 140 is R8, the following condition is satisfied: |(R5−R6)/(R5+R6)|+|(R7−R8)/(R7+R8)|=1.01.

When the focal length of the imaging lens system is f, and a composite focal length of the first lens element 110 and the second lens element 120 is f12, the following condition is satisfied: f/f12=0.75.

When the focal length of the imaging lens system is f, and a focal length of the third lens element 130 is f3, the following condition is satisfied: f/f3=0.19.

When the focal length of the imaging lens system is f, the focal length of the third lens element 130 is f3, and a focal length of the fourth lens element 140 is f4, the following condition is satisfied: |f/f3|+|f/f4|=0.22.

When an axial distance between the object-side surface 111 of the first lens element 110 and the image surface 180 is TL, and an entrance pupil diameter of the imaging lens system is EPD, the following condition is satisfied: TL/EPD=2.17.

When the axial distance between the object-side surface 111 of the first lens element 110 and the image surface 180 is TL, the maximum image height of the imaging lens system is ImgH, and the entrance pupil diameter of the imaging lens system is EPD, the following condition is satisfied: $(TL)^2/(ImgH\times EPD)=2.98$.

When the axial distance between the object-side surface 111 of the first lens element 110 and the image surface 180 is TL, and the maximum image height of the imaging lens system is ImgH, the following condition is satisfied: TL/ImgH=1.37.

When the axial distance between the object-side surface 111 of the first lens element 110 and the image surface 180 is TL, the entrance pupil diameter of the imaging lens system is EPD, and the maximum image height of the imaging lens system is ImgH, the following condition is satisfied: TL/(EPD+ImgH)=0.84.

When the maximum image height of the imaging lens system is ImgH, and the f-number of the imaging lens system is Fno, the following condition is satisfied: ImgH/Fno=2.42 [mm].

When an axial distance between the aperture stop 100 and the image-side surface 162 of the sixth lens element 160 is SD, and an axial distance between the object-side surface 111 of the first lens element 110 and the image-side surface 162 of the sixth lens element 160 is TD, the following condition is satisfied: SD/TD=0.87.

When half of the maximum field of view of the imaging lens system is HFOV, the following condition is satisfied: tan(HFOV)=0.82.

When the focal length of the imaging lens system is f, and the entrance pupil diameter of the imaging lens system is EPD, the following condition is satisfied: f/EPD=1.85.

When a vertical distance between a non-axial critical point on the object-side surface 141 of the fourth lens element 140 and an optical axis is Yc41, and a vertical distance between a non-axial critical point on the image-side surface 142 of the fourth lens element 140 and the optical axis is Yc42, the following condition is satisfied: Yc41/Yc42=0.82.

When a vertical distance between a non-axial critical point on the object-side surface 161 of the sixth lens element 160 and the optical axis is Yc61, and a vertical distance between a non-axial critical point on the image-side surface 162 of the sixth lens element 160 and the optical axis is Yc62, the following condition is satisfied: Yc61/Yc62=1.99.

In this embodiment, there is one lens element (the third lens element 130) satisfying the following condition: the focal length of the imaging lens system is f; a curvature radius of an object-side surface of the one lens element is Rf; a curvature radius of an image-side surface of the one lens element is Rr; and |f/Rf|+|f/Rr|<0.80. The values of |f/Rf|+|f/Rr| of the six lens elements (110, 120, 130, 140, 150 and 160) are respectively presented in the following paragraph.

When the focal length of the imaging lens system is f, a curvature radius of the object-side surface 111 of the first lens element 110 is R1, and a curvature radius of the image-side surface 112 of the first lens element 110 is R2, the following condition is satisfied: |f/R1|−|f/R2|=3.36. When a curvature radius of the object-side surface 121 of the second lens element 120 is R3, and a curvature radius of the image-side surface 122 of the second lens element 120 is R4, the following condition is satisfied: |f/R3|+|f/R4|=0.85. When the curvature radius of the object-side surface 131 of the third lens element 130 is R5, and the curvature radius of the image-side surface 132 of the third lens element 130 is R6, the following condition is satisfied: |f/R5|+|f/R6|=0.32. When the curvature radius of the object-side surface 141 of the fourth lens element 140 is R7, and the curvature radius of the image-side surface 142 of the fourth lens element 140 is R8, the following condition is satisfied: |f/R7|+|f/R8|=1.72. When the curvature radius of the object-side surface 151 of the fifth lens element 150 is R9, and the curvature radius of the image-side surface 152 of the fifth lens element 150 is R10, the following condition is satisfied: |f/R9|+|f/R10|=2.86. When a curvature radius of the object-side surface 161 of the sixth lens element 160 is R11, and a curvature radius of the image-side surface 162 of the sixth lens element 160 is R12, the following condition is satisfied: |f/R11|+|f/R12|=3.41.

The detailed optical data of the 1st embodiment are shown in Table 1 and the aspheric surface data are shown in Table 2 below.

TABLE 1

1st Embodiment
f = 5.24 mm, Fno = 1.85, HFOV = 39.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.640 | | | | |
| 2 | Lens 1 | 1.917 | (ASP) | 0.774 | Plastic | 1.545 | 56.1 | 4.38 |
| 3 | | 8.318 | (ASP) | 0.197 | | | | |
| 4 | Lens 2 | −298.832 | (ASP) | 0.200 | Plastic | 1.671 | 19.3 | −9.22 |
| 5 | | 6.315 | (ASP) | 0.239 | | | | |
| 6 | Stop | Plano | | 0.144 | | | | |
| 7 | Lens 3 | −1587.302 | (ASP) | 0.426 | Plastic | 1.614 | 26.0 | 27.12 |
| 8 | | −16.477 | (ASP) | 0.291 | | | | |
| 9 | Lens 4 | 6.269 | (ASP) | 0.251 | Plastic | 1.614 | 26.0 | −224.78 |
| 10 | | 5.905 | (ASP) | 0.665 | | | | |
| 11 | Lens 5 | −22.703 | (ASP) | 0.787 | Plastic | 1.544 | 56.0 | 3.97 |
| 12 | | −1.994 | (ASP) | 0.558 | | | | |
| 13 | Lens 6 | −4.839 | (ASP) | 0.363 | Plastic | 1.534 | 55.9 | −2.83 |
| 14 | | 2.248 | (ASP) | 0.600 | | | | |
| 15 | Filter | Plano | | 0.210 | Glass | 1.517 | 64.2 | — |
| 16 | | Plano | | 0.441 | | | | |
| 17 | Image | Plano | | — | | | | |

Note:

Reference wavelength is 587.6 nm (d-line).

An effective radius of the stop 101 (Surface 6) is 1.210 mm.

TABLE 2

Aspheric Coefficients

| | Surface # | | | | | |
|---|---|---|---|---|---|---|
| | 2 | 3 | 4 | 5 | 7 | 8 |
| k = | 1.3834E−02 | 2.7299E+01 | 9.0000E+01 | 2.0207E+01 | 9.0000E+01 | 1.0405E+01 |
| A4 = | −7.0820E−03 | −2.9514E−02 | −6.0894E−02 | −4.9489E−02 | −7.6513E−02 | −9.5353E−02 |
| A6 = | 2.2943E−02 | 2.1862E−02 | 1.0269E−01 | 9.5154E−02 | 5.6741E−02 | 5.9391E−02 |
| A8 = | −2.6469E−02 | −2.6674E−02 | −6.4026E−02 | −3.9838E−02 | −6.9925E−02 | −2.0392E−02 |
| A10 = | 1.8465E−02 | 2.2871E−02 | 2.2385E−02 | −3.8378E−04 | 4.7425E−02 | −4.1798E−02 |
| A12 = | −6.8389E−03 | −1.0399E−02 | −3.2516E−03 | 5.6348E−03 | −1.9578E−02 | 5.4818E−02 |
| A14 = | 1.0762E−03 | 1.8399E−03 | 8.1507E−05 | — | 3.5141E−03 | −2.7326E−02 |
| A16 = | — | — | — | — | — | 5.0325E−03 |

| | Surface # | | | | | |
|---|---|---|---|---|---|---|
| | 9 | 10 | 11 | 12 | 13 | 14 |
| k = | −8.1493E+01 | −9.9123E−01 | −9.3998E+01 | −3.3208E+00 | −1.3749E+00 | −8.7544E+00 |
| A4 = | −1.3454E−01 | −1.2636E−01 | −1.2050E−02 | 1.7066E−02 | −6.3415E−02 | −6.2146E−02 |
| A6 = | 6.0219E−02 | 5.7041E−02 | −2.8039E−03 | −2.2645E−02 | 2.3144E−02 | 2.6537E−02 |
| A8 = | −2.6800E−02 | −2.2902E−02 | −5.1937E−03 | 1.4304E−02 | −5.8402E−03 | −8.5510E−03 |
| A10 = | 4.9892E−03 | 8.5017E−03 | 4.3933E−03 | −7.6972E−03 | 1.5290E−03 | 1.9439E−03 |
| A12 = | 1.7586E−03 | −2.5636E−03 | −1.6825E−03 | 3.1120E−03 | −3.1494E−04 | −3.0477E−04 |
| A14 = | −1.4207E−03 | 5.2744E−04 | 3.5987E−04 | −7.9282E−04 | 4.1762E−05 | 3.1805E−05 |
| A16 = | 2.4815E−04 | −4.7740E−05 | −4.1148E−05 | 1.1911E−04 | −3.3167E−06 | −2.0976E−06 |
| A18 = | — | — | 2.2325E−06 | −9.7213E−06 | 1.4417E−07 | 7.8842E−08 |
| A20 = | — | — | −4.0873E−08 | 3.3436E−07 | −2.6453E−09 | −1.2819E−09 |

In Table 1, the curvature radius, the thickness and the focal length are shown in millimeters (mm). Surface numbers 0-17 represent the surfaces sequentially arranged from the object side to the image side along the optical axis. In Table 2, k represents the conic coefficient of the equation of the aspheric surface profiles. A4-A20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
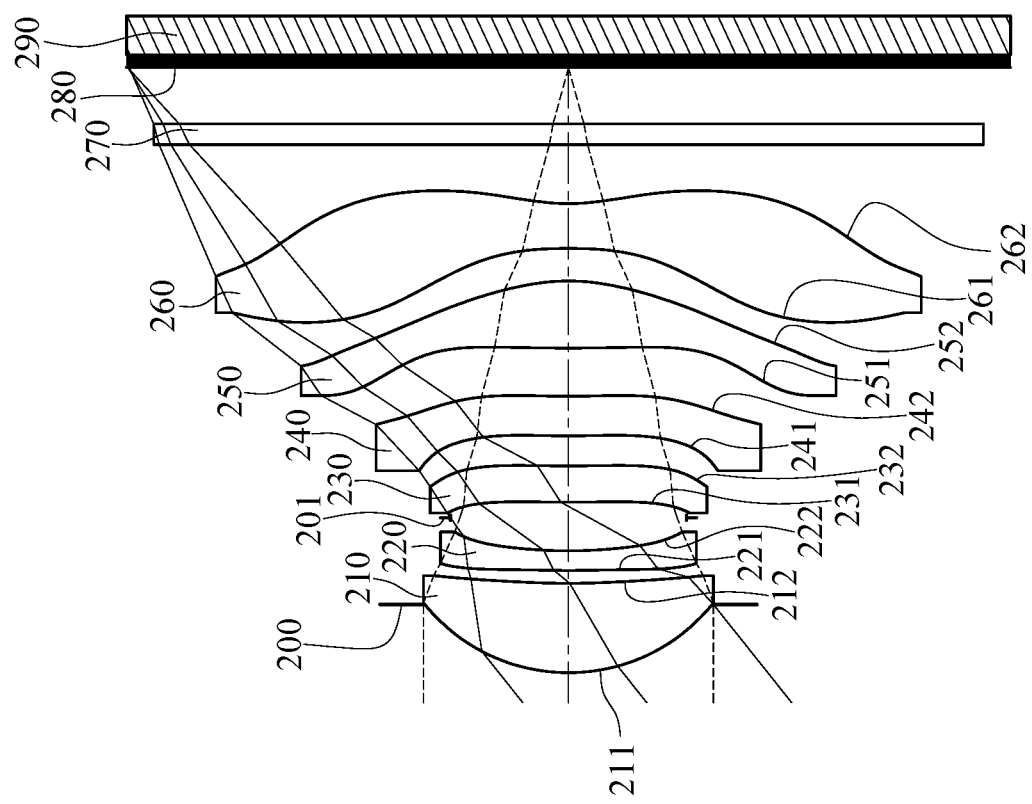
FIG. 3 is a schematic view of an image capturing unit according to the 2nd embodiment of the present disclosure.
Figure 4:
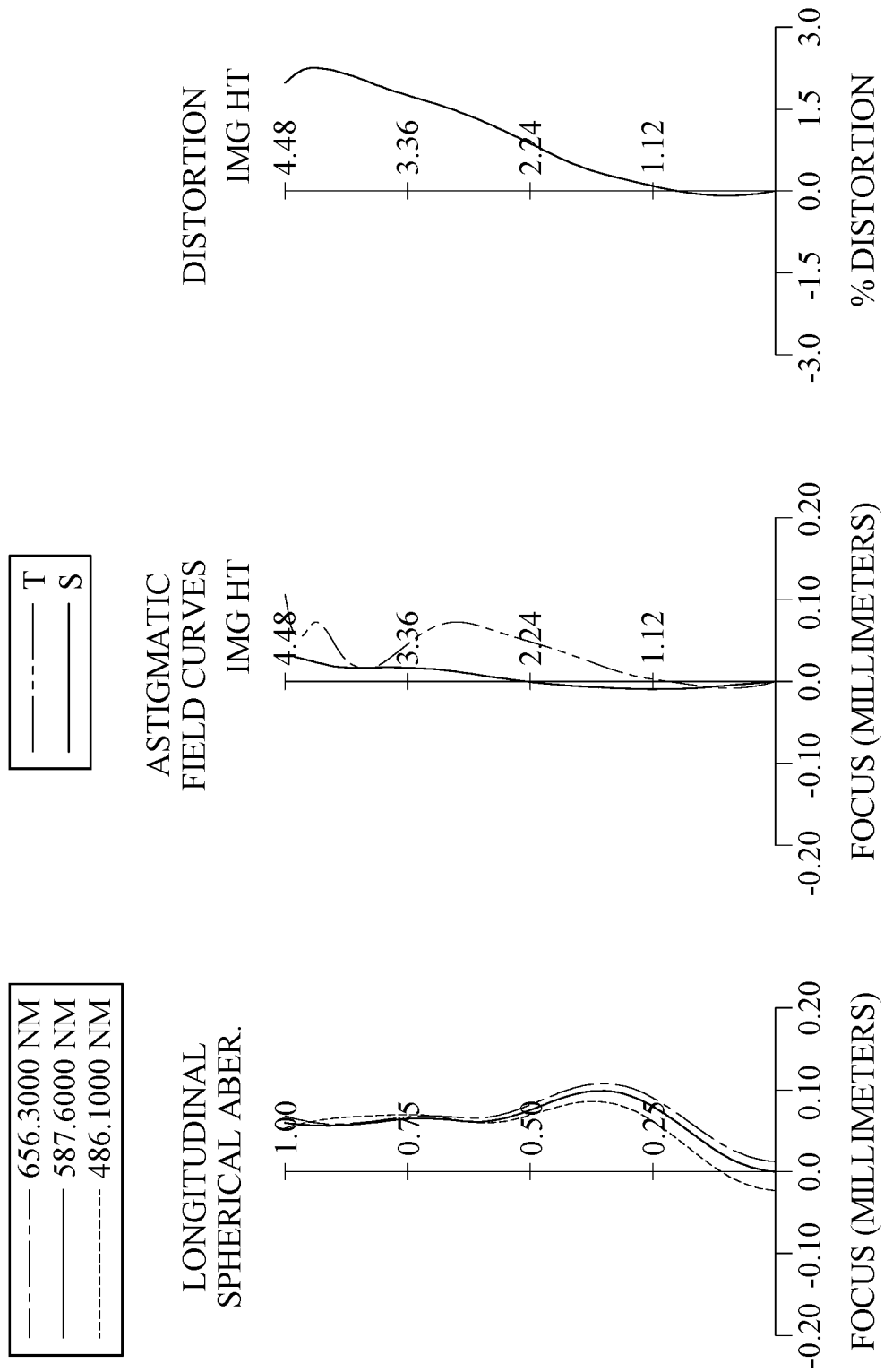
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the imaging lens system (its reference numeral is omitted) of the present disclosure and an image sensor 290. The imaging lens system includes, in order from an object side to an image side, an aperture stop 200, a first lens element 210, a second lens element 220, a stop 201, a third lens element 230, a fourth lens element 240, a fifth lens element 250, a sixth lens element 260, a filter 270 and an image surface 280. The imaging lens system includes six lens elements (210, 220, 230, 240, 250 and 260) with no additional lens element disposed between each of the adjacent six lens elements.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. Each of the object-side surface 231 and the image-side surface 232 of the third lens element 230 has at least one critical point. The image-side surface 232 of the third lens element 230 has at least one convex shape in an off-axis region thereof.

The fourth lens element 240 with negative refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. Each of the object-side surface 241 and the image-side surface 242 of the fourth lens element 240 has at least one critical point. The image-side surface 242 of the fourth lens element 240 has at least one convex shape in an off-axis region thereof.

The fifth lens element 250 with positive refractive power has an object-side surface 251 being convex in a paraxial region thereof and an image-side surface 252 being convex in a paraxial region thereof. The fifth lens element 250 is made of plastic material and has the object-side surface 251 and the image-side surface 252 being both aspheric.

The sixth lens element 260 with negative refractive power has an object-side surface 261 being concave in a paraxial region thereof and an image-side surface 262 being concave in a paraxial region thereof. The sixth lens element 260 is made of plastic material and has the object-side surface 261 and the image-side surface 262 being both aspheric. Each of the object-side surface 261 and the image-side surface 262 of the sixth lens element 260 has at least one critical point. The image-side surface 262 of the sixth lens element 260 has at least one inflection point. The image-side surface 262 of the sixth lens element 260 has at least one convex shape in an off-axis region thereof. The image-side surface 262 of the sixth lens element 260 has a concave-to-convex shape change and then a convex-to-concave shape change in order from the paraxial region thereof to the off-axis region thereof.

The filter 270 is made of glass material and located between the sixth lens element 260 and the image surface 280, and will not affect the focal length of the imaging lens system. The image sensor 290 is disposed on or near the image surface 280 of the imaging lens system.

In this embodiment, there is one lens element (the third lens element 230) satisfying the following condition: $|f/Rf|+|f/Rr|<0.80$. When a focal length of the imaging lens system is f, a curvature radius of the object-side surface 231 of the third lens element 230 is R5, and a curvature radius of the image-side surface 232 of the third lens element 230 is R6, the following condition is satisfied: $|f/R5|+|f/R6|=0.78$.

The detailed optical data of the 2nd embodiment are shown in Table 3 and the aspheric surface data are shown in Table 4 below.

TABLE 3

2nd Embodiment
f = 5.45 mm, Fno = 1.85, HFOV = 38.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.695 | | | | |
| 2 | Lens 1 | 1.897 | (ASP) | 0.909 | Plastic | 1.545 | 56.1 | 4.41 |
| 3 | | 7.462 | (ASP) | 0.131 | | | | |
| 4 | Lens 2 | 10.489 | (ASP) | 0.200 | Plastic | 1.671 | 19.3 | −11.98 |
| 5 | | 4.515 | (ASP) | 0.337 | | | | |
| 6 | Stop | Plano | | 0.158 | | | | |
| 7 | Lens 3 | 15.703 | (ASP) | 0.369 | Plastic | 1.614 | 26.0 | −109.50 |
| 8 | | 12.615 | (ASP) | 0.306 | | | | |
| 9 | Lens 4 | 9.984 | (ASP) | 0.403 | Plastic | 1.607 | 26.6 | −230.30 |
| 10 | | 9.176 | (ASP) | 0.490 | | | | |
| 11 | Lens 5 | 22.072 | (ASP) | 0.683 | Plastic | 1.544 | 56.0 | 3.46 |
| 12 | | −2.037 | (ASP) | 0.332 | | | | |
| 13 | Lens 6 | −4.932 | (ASP) | 0.455 | Plastic | 1.534 | 55.9 | −2.65 |
| 14 | | 2.043 | (ASP) | 0.600 | | | | |
| 15 | Filter | Plano | | 0.210 | Glass | 1.517 | 64.2 | — |
| 16 | | Plano | | 0.578 | | | | |
| 17 | Image | Plano | | — | | | | |

Note:
Reference wavelength is 587.6 nm (d-line).
An effective radius of the stop 201 (Surface 6) is 1.200 mm.

TABLE 4

Aspheric Coefficients

| | Surface # | | | | | |
|---|---|---|---|---|---|---|
| | 2 | 3 | 4 | 5 | 7 | 8 |
| k = | −2.4993E−02 | 1.7623E+01 | 4.5181E+01 | 6.1054E+00 | −6.5993E+01 | 3.4429E+01 |
| A4 = | −3.9718E−03 | −4.2427E−02 | −1.0867E−01 | −6.8062E−02 | −7.7120E−02 | −9.9868E−02 |
| A6 = | 1.2075E−02 | −2.1055E−03 | 1.1862E−01 | 9.3591E−02 | 5.8070E−02 | 5.7940E−02 |
| A8 = | −1.0264E−02 | 4.8299E−02 | −4.0954E−02 | −2.5080E−02 | −7.3146E−02 | −2.1849E−02 |
| A10 = | 4.0559E−03 | −5.0679E−02 | −1.4760E−02 | −1.3831E−02 | 4.7520E−02 | −4.1952E−02 |
| A12 = | −1.0676E−04 | 2.2009E−02 | 1.6326E−02 | 1.0253E−02 | −1.8856E−02 | 5.4847E−02 |
| A14 = | −2.1422E−04 | −3.6060E−03 | −3.5173E−03 | — | 2.9777E−03 | −2.7289E−02 |
| A16 = | — | — | — | — | — | 5.0562E−03 |

| | Surface # | | | | | |
|---|---|---|---|---|---|---|
| | 9 | 10 | 11 | 12 | 13 | 14 |
| k = | −5.9030E+00 | −1.0671E+01 | 4.5281E+01 | −5.9073E+00 | −3.2001E+00 | −1.2560E+01 |
| A4 = | −1.2463E−01 | −1.0347E−01 | 2.8818E−03 | 1.9962E−01 | −1.0585E−01 | −7.3112E−02 |
| A6 = | 5.9295E−02 | 3.6231E−02 | −2.8012E−02 | −2.7583E−02 | 4.1257E−02 | 3.1577E−02 |
| A8 = | −2.6985E−02 | −1.4482E−02 | 9.6762E−03 | 1.4069E−02 | −6.1809E−03 | −9.5385E−03 |
| A10 = | 4.7629E−03 | 6.5773E−03 | −1.5745E−03 | −4.0048E−03 | 2.7194E−04 | 1.9491E−03 |
| A12 = | 1.6534E−03 | −1.8098E−03 | −2.8573E−04 | 7.5039E−04 | 4.1515E−05 | −2.7237E−04 |
| A14 = | −1.4552E−03 | 2.6477E−04 | 2.4537E−04 | −9.5578E−05 | −7.0362E−06 | 2.5253E−05 |
| A16 = | 2.4072E−04 | −1.7035E−05 | −5.5781E−05 | 7.5288E−06 | 4.4634E−07 | −1.4611E−06 |
| A18 = | — | — | 5.5494E−06 | −2.9182E−07 | −1.3066E−08 | 4.7437E−08 |
| A20 = | — | — | −2.0819E−07 | 2.8827E−09 | 1.3654E−10 | −6.6040E−10 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 5.45 | (TL)²/(ImgH × EPD) | 2.87 |
| Fno | 1.85 | TL/ImgH | 1.38 |
| HFOV [deg.] | 38.5 | TL/(EPD + ImgH) | 0.83 |
| V3 | 26.0 | ImgH/Fno [mm] | 2.42 |
| V4 | 26.6 | SD/TD | 0.85 |
| V3/N3 | 16.11 | tan(HFOV) | 0.80 |
| V4/N4 | 16.55 | f/EPD | 1.85 |
| V2 + V3 + V4 | 71.9 | Yc31/Yc32 | 0.98 |
| [(V1 − V3) × (V1 − V4)]/[(V3 − V2) × (V4 − V2)] | 18.15 | Yc41/Yc42 | 0.89 |
| (CT2 + CT3 + CT4)/ImgH | 0.22 | Yc61/Yc62 | 2.02 |
| (T23 + T45)/(CT2 + CT3 + CT4) | 1.01 | |f/R1| + |f/R2| | 3.60 |
| (R9 − R10)/(R9 + R10) | 1.20 | |f/R3| + |f/R4| | 1.73 |
| |(R5 − R6)/(R5 + R6)| + |(R7 − R8)/(R7 + R8)| | 0.15 | |f/R5| + |f/R6| | 0.78 |
| f/f12 | 0.89 | |f/R7| + |f/R8| | 1.14 |
| f/f3 | −0.05 | |f/R9| + |f/R10| | 2.92 |
| |f/f3| + |f/f4| | 0.07 | |f/R11| + |f/R12| | 3.77 |
| TL/EPD | 2.09 | — | — |

3rd Embodiment

Figure 5:
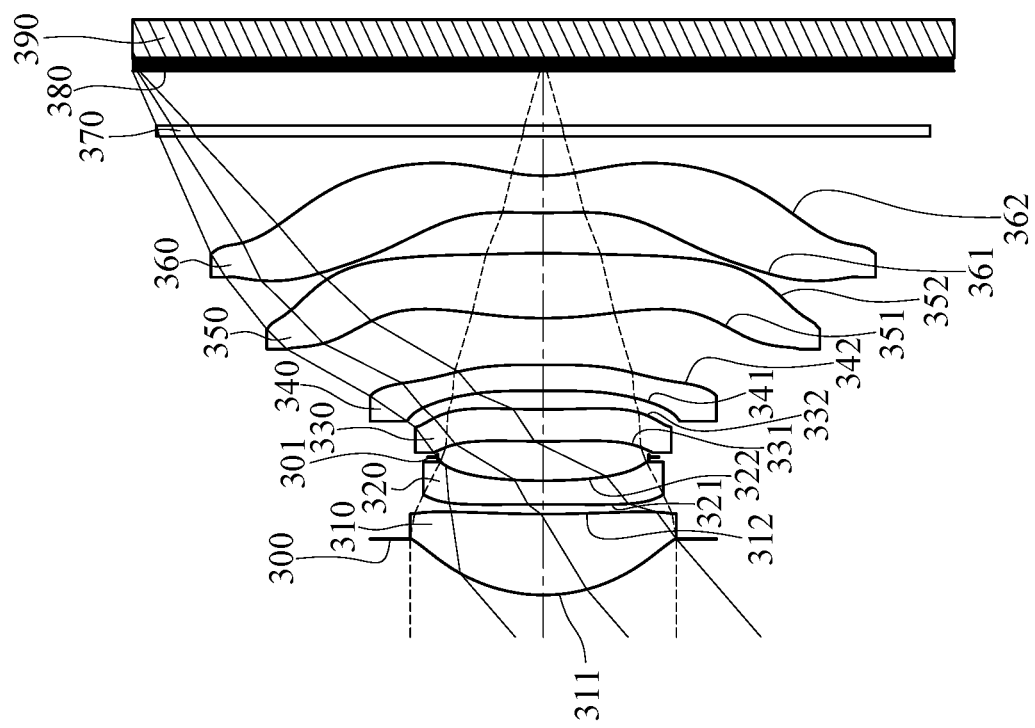
FIG. 5 is a schematic view of an image capturing unit according to the 3rd embodiment of the present disclosure.
Figure 6:
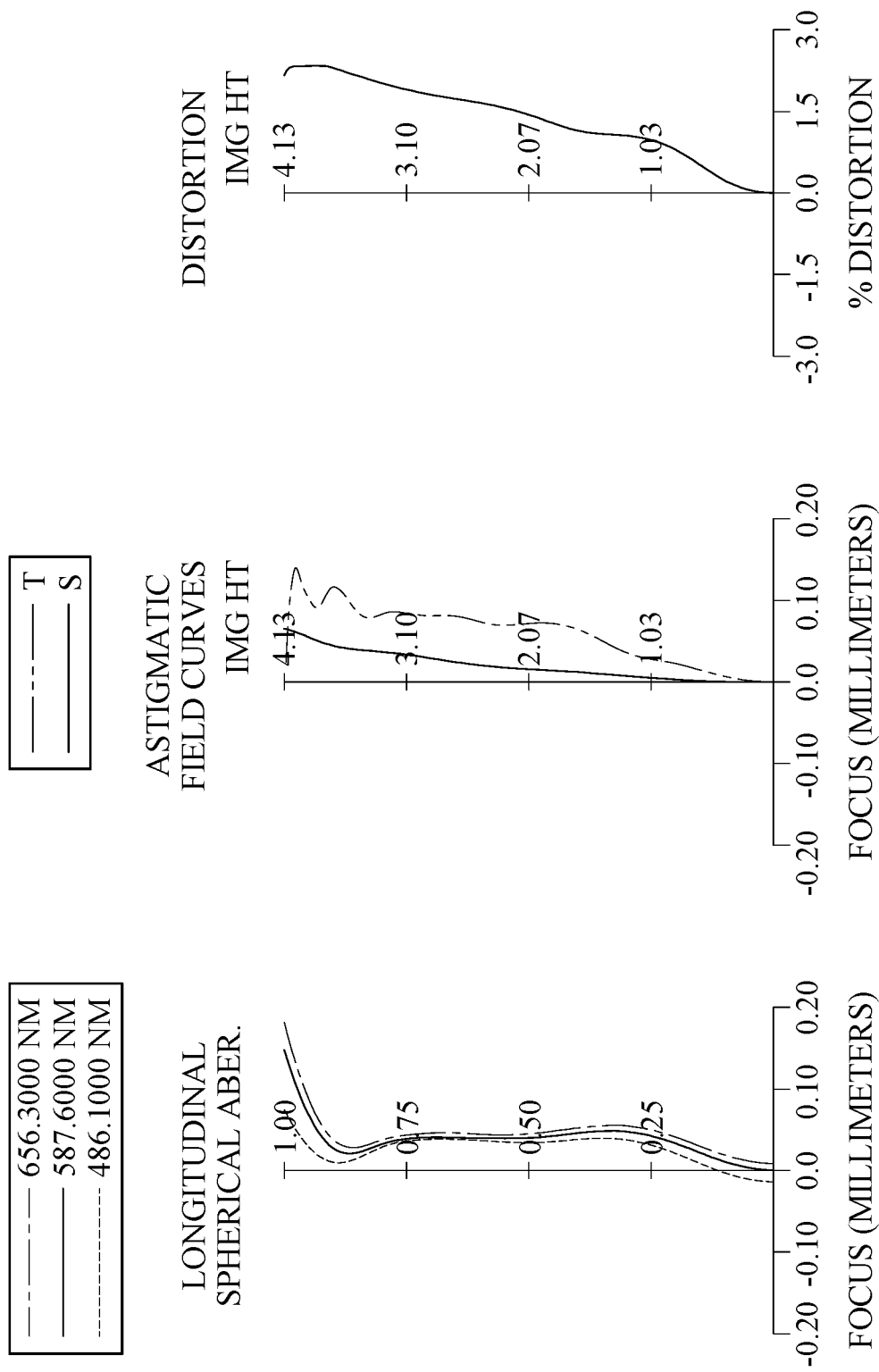
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the imaging lens system (its reference numeral is omitted) of the present disclosure and an image sensor 390. The imaging lens system includes, in order from an object side to an image side, an aperture stop 300, a first lens element 310, a second lens element 320, a stop 301, a third lens element 330, a fourth lens element 340, a fifth lens element 350, a sixth lens element 360, a filter 370 and an image surface 380. The imaging lens system includes six lens elements (310, 320, 330, 340, 350 and 360) with no additional lens element disposed between each of the adjacent six lens elements.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. Each of the object-side surface 331 and the image-side surface 332 of the third lens element 330 has at least one critical point. The image-side surface 332 of the third lens element 330 has at least one convex shape in an off-axis region thereof.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric. The image-side surface 342 of the fourth lens element 340 has at least one convex shape in an off-axis region thereof.

The fifth lens element 350 with positive refractive power has an object-side surface 351 being convex in a paraxial region thereof and an image-side surface 352 being convex in a paraxial region thereof. The fifth lens element 350 is made of plastic material and has the object-side surface 351 and the image-side surface 352 being both aspheric. The image-side surface 352 of the fifth lens element 350 has at least one convex shape in an off-axis region thereof.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. Each of the object-side surface 361 and the image-side surface 362 of the sixth lens element 360 has at least one critical point. The image-side surface 362 of the sixth lens element 360 has at least one inflection point. The image-side surface 362 of the sixth lens element 360 has at least one convex shape in an off-axis region thereof. The image-side surface 362 of the sixth lens element 360 has a concave-to-convex shape change and then a convex-to-concave shape change in order from the paraxial region thereof to the off-axis region thereof.

The filter 370 is made of glass material and located between the sixth lens element 360 and the image surface 380, and will not affect the focal length of the imaging lens system. The image sensor 390 is disposed on or near the image surface 380 of the imaging lens system.

In this embodiment, there is one lens element (the fourth lens element 340) satisfying the following condition: |f/Rf|+|f/Rr|<0.80. When a focal length of the imaging lens system is f, a curvature radius of the object-side surface 341 of the fourth lens element 340 is R7, and a curvature radius of the image-side surface 342 of the fourth lens element 340 is R8, the following condition is satisfied: |f/R7|+|f/R8|=0.16.

The detailed optical data of the 3rd embodiment are shown in Table 5 and the aspheric surface data are shown in Table 6 below.

TABLE 5

3rd Embodiment
f = 4.65 mm, Fno = 1.72, HFOV = 40.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.570 | | | | |
| 2 | Lens 1 | 1.709 | (ASP) | 0.823 | Plastic | 1.545 | 56.1 | 3.65 |
| 3 | | 10.136 | (ASP) | 0.097 | | | | |
| 4 | Lens 2 | 133.814 | (ASP) | 0.243 | Plastic | 1.660 | 20.4 | −8.48 |
| 5 | | 5.365 | (ASP) | 0.241 | | | | |
| 6 | Stop | Plano | | 0.159 | | | | |
| 7 | Lens 3 | 9.656 | (ASP) | 0.324 | Plastic | 1.614 | 26.0 | −34.18 |
| 8 | | 6.528 | (ASP) | 0.190 | | | | |
| 9 | Lens 4 | 58.971 | (ASP) | 0.265 | Plastic | 1.614 | 26.0 | 47.76 |
| 10 | | −58.176 | (ASP) | 0.475 | | | | |
| 11 | Lens 5 | 4.196 | (ASP) | 0.661 | Plastic | 1.544 | 56.0 | 5.45 |
| 12 | | −9.519 | (ASP) | 0.411 | | | | |
| 13 | Lens 6 | 7.774 | (ASP) | 0.377 | Plastic | 1.534 | 55.9 | −3.81 |
| 14 | | 1.584 | (ASP) | 0.400 | | | | |
| 15 | Filter | Plano | | 0.110 | Glass | 1.517 | 64.2 | — |
| 16 | | Plano | | 0.559 | | | | |
| 17 | Image | Plano | | — | | | | |

Note:

Reference wavelength is 587.6 nm (d-line).

An effective radius of the stop 301 (Surface 6) is 1.073 mm.

TABLE 6

Aspheric Coefficients

| | Surface # | | | | | |
|---|---|---|---|---|---|---|
| | 2 | 3 | 4 | 5 | 7 | 8 |
| k = | −4.1641E−01 | 0.0000E+00 | 2.7712E+01 | 6.5756E+00 | 4.8086E+01 | 9.0631E+00 |
| A4 = | −4.4888E−03 | −5.2877E−02 | −5.3337E−02 | −1.6821E−02 | −1.4028E−01 | −1.6269E−01 |
| A6 = | 4.7031E−02 | 5.9565E−02 | 1.4076E−01 | 1.2598E−01 | 1.2888E−01 | 1.4324E−01 |
| A8 = | −7.2644E−02 | −4.6739E−02 | −1.0352E−01 | −1.3086E−01 | −2.7529E−01 | −1.7124E−01 |
| A10 = | 6.0189E−02 | 1.8085E−02 | 3.4256E−02 | 1.4060E−01 | 2.9901E−01 | 9.8495E−02 |
| A12 = | −2.4473E−02 | −3.6047E−03 | 4.5176E−03 | −1.0546E−01 | −1.9404E−01 | −4.1195E−02 |
| A14 = | 2.9938E−03 | — | −2.4229E−03 | 4.3727E−02 | 5.6410E−02 | 1.1353E−02 |

| | Surface # | | | | | |
|---|---|---|---|---|---|---|
| | 9 | 10 | 11 | 12 | 13 | 14 |
| k = | 6.0000E+01 | −3.2317E+01 | −3.4038E−01 | −7.1308E+01 | −1.8363E+01 | −7.0975E+00 |
| A4 = | −1.7583E−01 | −1.7032E−01 | −1.0584E−02 | 7.7969E−02 | −2.3864E−01 | −1.4081E−01 |
| A6 = | 3.7559E−02 | 6.6567E−02 | −5.3928E−02 | −9.8597E−02 | 1.0005E−01 | 6.2793E−02 |
| A8 = | 1.8449E−01 | 1.9387E−02 | 4.4015E−02 | 6.4646E−02 | −1.6435E−02 | −1.7855E−02 |
| A10 = | −2.4866E−01 | −3.7782E−03 | −2.0163E−02 | −2.5920E−02 | 3.9421E−05 | 3.3430E−03 |
| A12 = | 1.2818E−01 | −9.6822E−03 | 4.9902E−03 | 6.4803E−03 | 3.8069E−04 | −4.3543E−04 |
| A14 = | −2.4761E−02 | 4.2810E−03 | −5.8486E−04 | −1.0067E−03 | −5.5434E−05 | 3.9745E−05 |
| A16 = | — | −5.3139E−04 | 1.3689E−05 | 9.2524E−05 | 3.2113E−06 | −2.3939E−06 |
| A18 = | — | — | 3.0324E−06 | −4.4534E−06 | −5.5618E−08 | 8.4449E−08 |
| A20 = | — | — | −1.9732E−07 | 8.1349E−08 | −8.7213E−10 | −1.3288E−09 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 4.65 | (TL)²/(ImgH × EPD) | 2.55 |
| Fno | 1.72 | TL/ImgH | 1.29 |
| HFOV [deg.] | 40.8 | TL/(EPD + ImgH) | 0.78 |
| V3 | 26.0 | ImgH/Fno [mm] | 2.40 |
| V4 | 26.0 | SD/TD | 0.87 |
| V3/N3 | 16.11 | tan(HFOV) | 0.86 |
| V4/N4 | 16.11 | f/EPD | 1.72 |
| V2 + V3 + V4 | 72.4 | Yc31/Yc32 | 0.86 |
| [(V1 − V3) × (V1 − V4)]/[(V3 − V2) × (V4 − V2)] | 28.89 | Yc41/Yc42 | — |
| (CT2 + CT3 + CT4)/ImgH | 0.20 | Yc61/Yc62 | 0.35, 2.53, 2.92 |
| (T23 + T45)/(CT2 + CT3 + CT4) | 1.05 | |f/R1| + |f/R2| | 3.18 |
| (R9 − R10)/(R9 + R10) | −2.58 | |f/R3| + |f/R4| | 0.90 |
| |(R5 − R6)/(R5 + R6)| + |(R7 − R8)/(R7 + R8)| | 147.46 | |f/R5| + |f/R6| | 1.19 |
| f/f12 | 0.86 | |f/R7| + |f/R8| | 0.16 |
| f/f3 | −0.14 | |f/R9| + |f/R10| | 1.60 |
| |f/f3| + |f/f4| | 0.23 | |f/R11| + |f/R12| | 3.54 |
| TL/EPD | 1.97 | — | — |

4th Embodiment

Figure 7:
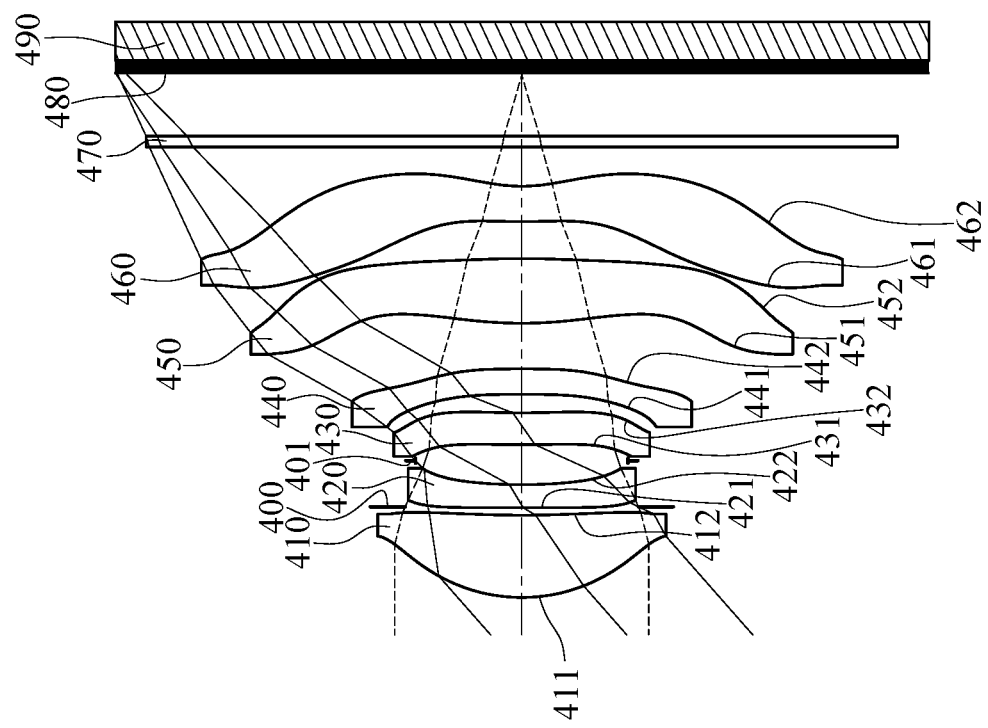
FIG. 7 is a schematic view of an image capturing unit according to the 4th embodiment of the present disclosure.
Figure 8:
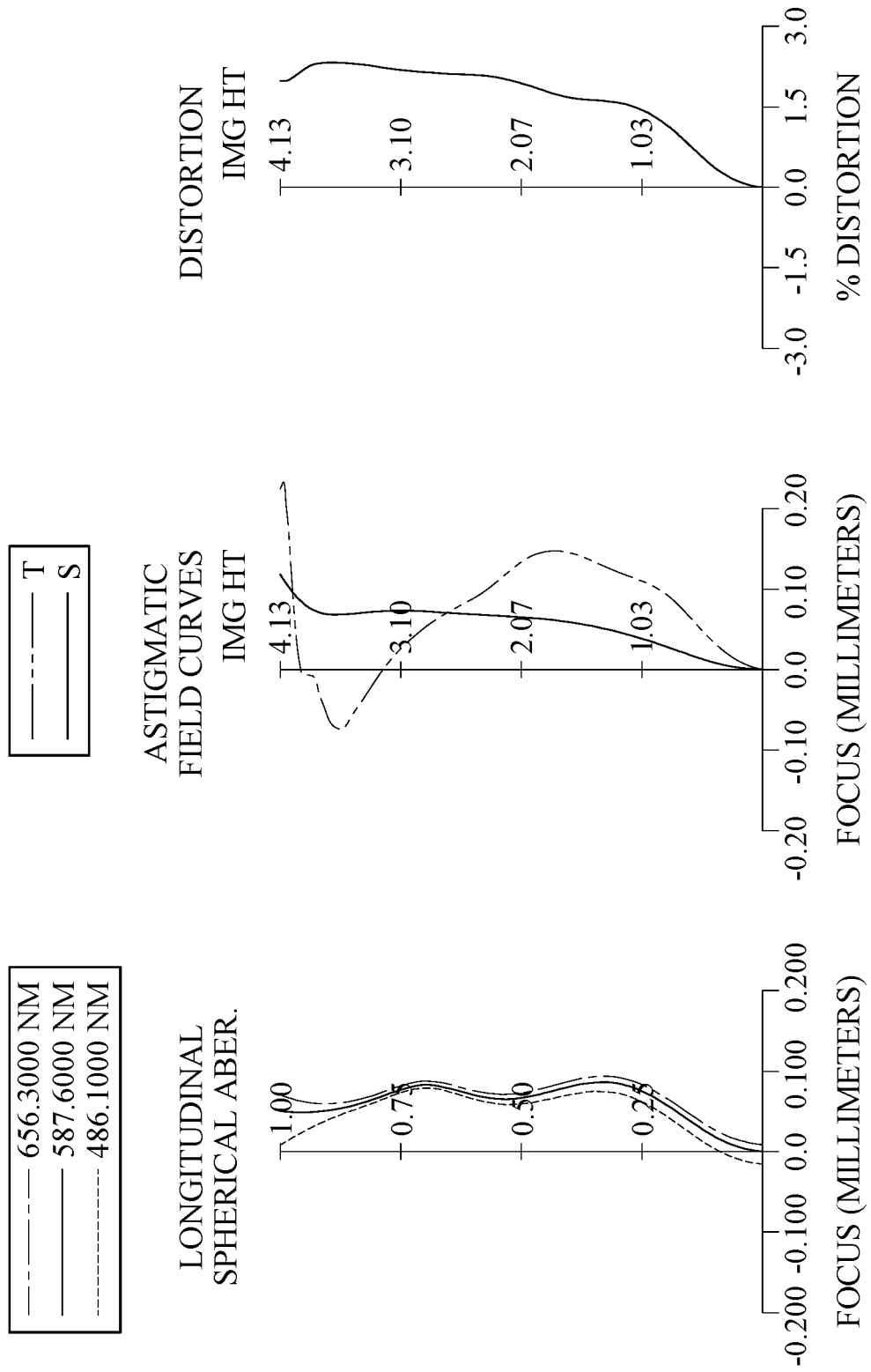
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the imaging lens system (its reference numeral is omitted) of the present disclosure and an image sensor 490. The imaging lens system includes, in order from an object side to an image side, a first lens element 410, an aperture stop 400, a second lens element 420, a stop 401, a third lens element 430, a fourth lens element 440, a fifth lens element 450, a sixth lens element 460, a filter 470 and an image surface 480. The imaging lens system includes six lens elements (410, 420, 430, 440, 450 and 460) with no additional lens element disposed between each of the adjacent six lens elements.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. Each of the object-side surface 431 and the image-side surface 432 of the third lens element 430 has at least one critical point. The image-side surface 432 of the third lens element 430 has at least one convex shape in an off-axis region thereof.

The fourth lens element 440 with positive refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric. The image-side surface 442 of the fourth lens element 440 has at least one convex shape in an off-axis region thereof.

The fifth lens element 450 with positive refractive power has an object-side surface 451 being convex in a paraxial region thereof and an image-side surface 452 being convex in a paraxial region thereof. The fifth lens element 450 is made of plastic material and has the object-side surface 451 and the image-side surface 452 being both aspheric. The image-side surface 452 of the fifth lens element 450 has at least one convex shape in an off-axis region thereof.

The sixth lens element 460 with negative refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. Each of the object-side surface 461 and the image-side surface 462 of the sixth lens element 460 has at least one critical point. The image-side surface 462 of the sixth lens element 460 has at least one inflection point. The image-side surface 462 of the sixth lens element 460 has at least one convex shape in an off-axis region thereof. The image-side surface 462 of the sixth lens element 460 has a concave-to-convex shape change and then a convex-to-concave shape change in order from the paraxial region thereof to the off-axis region thereof.

The filter 470 is made of glass material and located between the sixth lens element 460 and the image surface 480, and will not affect the focal length of the imaging lens system. The image sensor 490 is disposed on or near the image surface 480 of the imaging lens system.

In this embodiment, there is one lens element (the fourth lens element 440) satisfying the following condition: |f/Rf|+|f/Rr|<0.80. When a focal length of the imaging lens system is f, a curvature radius of the object-side surface 441 of the fourth lens element 440 is R7, and a curvature radius of the image-side surface 442 of the fourth lens element 440 is R8, the following condition is satisfied: |f/R7|+|f/R8|=0.25.

The detailed optical data of the 4th embodiment are shown in Table 7 and the aspheric surface data are shown in Table 8 below.

TABLE 7

4th Embodiment
f = 4.54 mm, Fno = 1.76, HFOV = 41.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.709 | (ASP) | 0.837 | Plastic | 1.545 | 56.1 | 3.71 |
| 2 | | 9.163 | (ASP) | 0.086 | | | | |
| 3 | Ape. Stop | Plano | | −0.009 | | | | |
| 4 | Lens 2 | 53.006 | (ASP) | 0.234 | Plastic | 1.660 | 20.4 | −8.92 |
| 5 | | 5.290 | (ASP) | 0.244 | | | | |
| 6 | Stop | Plano | | 0.162 | | | | |
| 7 | Lens 3 | 11.142 | (ASP) | 0.325 | Plastic | 1.614 | 26.0 | −40.12 |
| 8 | | 7.586 | (ASP) | 0.187 | | | | |
| 9 | Lens 4 | −80.000 | (ASP) | 0.260 | Plastic | 1.614 | 26.0 | 53.91 |
| 10 | | −23.435 | (ASP) | 0.465 | | | | |
| 11 | Lens 5 | 4.325 | (ASP) | 0.658 | Plastic | 1.544 | 56.0 | 5.16 |
| 12 | | −7.563 | (ASP) | 0.376 | | | | |
| 13 | Lens 6 | 6.854 | (ASP) | 0.360 | Plastic | 1.534 | 55.9 | −4.03 |
| 14 | | 1.608 | (ASP) | 0.400 | | | | |
| 15 | Filter | Plano | | 0.110 | Glass | 1.517 | 64.2 | — |
| 16 | | Plano | | 0.640 | | | | |
| 17 | Image | Plano | | — | | | | |

Note:
Reference wavelength is 587.6 nm (d-line).
An effective radius of the stop 401 (Surface 6) is 1.079 mm.

TABLE 8

Aspheric Coefficients

| | \multicolumn{6}{c}{Surface #} |
|---|---|---|---|---|---|---|
| | 1 | 2 | 4 | 5 | 7 | 8 |
| k = | −4.1527E−01 | 0.0000E+00 | −4.0083E+01 | 6.8320E+00 | 5.2186E+01 | 1.1380E+01 |
| A4 = | −2.0322E−02 | −4.4893E−02 | −4.9200E−02 | −2.7142E−02 | −1.3213E−01 | −1.5423E−01 |
| A6 = | 1.0859E−01 | 2.3277E−02 | 1.3202E−01 | 2.1177E−01 | 1.2770E−01 | 1.2403E−01 |
| A8 = | −1.7879E−01 | 3.3532E−03 | −1.2912E−01 | −3.9773E−01 | −2.7272E−01 | −1.2806E−01 |
| A10 = | 1.5237E−01 | −1.0735E−02 | 1.0472E−01 | 5.3670E−01 | 2.9005E−01 | 4.3461E−02 |
| A12 = | −6.3707E−02 | 2.6474E−03 | −5.1269E−02 | −3.8711E−01 | −1.8385E−01 | −8.7854E−03 |
| A14 = | 9.5816E−03 | — | 1.2438E−02 | 1.2109E−01 | 5.3180E−02 | 4.2552E−03 |

| | \multicolumn{6}{c}{Surface #} |
|---|---|---|---|---|---|---|
| | 9 | 10 | 11 | 12 | 13 | 14 |
| k = | −4.9316E+01 | −5.3268E+00 | −3.3884E−01 | −6.9278E+01 | −1.8445E+01 | −6.8408E+00 |
| A4 = | −1.8083E−01 | −1.7380E−01 | −1.2452E−02 | 7.2481E−02 | −2.4709E−01 | −1.4906E−01 |
| A6 = | 4.5201E−02 | 8.0143E−02 | −4.4651E−02 | −9.6199E−02 | 1.0707E−01 | 6.9513E−02 |
| A8 = | 1.7956E−01 | −1.2070E−02 | 3.5812E−02 | 6.6194E−02 | −1.8969E−02 | −2.0107E−02 |
| A10 = | −2.5466E−01 | 3.0748E−02 | −1.6500E−02 | −2.7702E−02 | 5.5482E−04 | 3.6571E−03 |
| A12 = | 1.3673E−01 | −2.8237E−02 | 4.0686E−03 | 7.2214E−03 | 3.1058E−04 | −4.2845E−04 |
| A14 = | −2.7508E−02 | 9.0660E−03 | −4.5959E−04 | −1.1760E−03 | −4.7817E−05 | 3.1215E−05 |
| A16 = | — | −1.0073E−03 | 6.4216E−06 | 1.1486E−04 | 2.5246E−06 | −1.2089E−06 |
| A18 = | — | — | 2.9513E−06 | −6.0486E−06 | −1.4128E−08 | 1.3034E−08 |
| A20 = | — | — | −1.7786E−07 | 1.2894E−07 | −2.0017E−09 | 3.1465E−10 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| \multicolumn{4}{c}{4th Embodiment} | | | |
|---|---|---|---|
| f [mm] | 4.54 | (TL)$^2$/(ImgH × EPD) | 2.67 |
| Fno | 1.76 | TL/ImgH | 1.29 |
| HFOV [deg.] | 41.3 | TL/(EPD + ImgH) | 0.79 |
| V3 | 26.0 | ImgH/Fno [mm] | 2.35 |
| V4 | 26.0 | SD/TD | 0.78 |
| V3/N3 | 16.11 | tan(HFOV) | 0.88 |
| V4/N4 | 16.11 | f/EPD | 1.76 |
| V2 + V3 + V4 | 72.4 | Yc31/Yc32 | 0.87 |
| [(V1 − V3) × (V1 − V4)]/[(V3 − V2) × (V4 − V2)] | 28.89 | Yc41/Yc42 | — |
| (CT2 + CT3 + CT4)/ImgH | 0.20 | Yc61/Yc62 | 0.37, 2.54, |

-continued

| 4th Embodiment | | |
|---|---|---|
| | | 2.87 |
| (T23 + T45)/(CT2 + CT3 + CT4) | 1.06 | \|f/R1\| + \|f/R2\| | 3.15 |
| (R9 − R10)/(R9 + R10) | −3.67 | \|f/R3\| + \|f/R4\| | 0.94 |
| \|(R5 − R6)/(R5 + R6)\| + \|(R7 − R8)/(R7 + R8)\| | 0.74 | \|f/R5\| + \|f/R6\| | 1.01 |
| f/f12 | 0.84 | \|f/R7\| + \|f/R8\| | 0.25 |
| f/f3 | −0.11 | \|f/R9\| + \|f/R10\| | 1.65 |
| \|f/f3\| + \|f/f4\| | 0.20 | \|f/R11\| + \|f/R12\| | 3.49 |
| TL/EPD | 2.07 | — | — |

5th Embodiment

Figure 9:
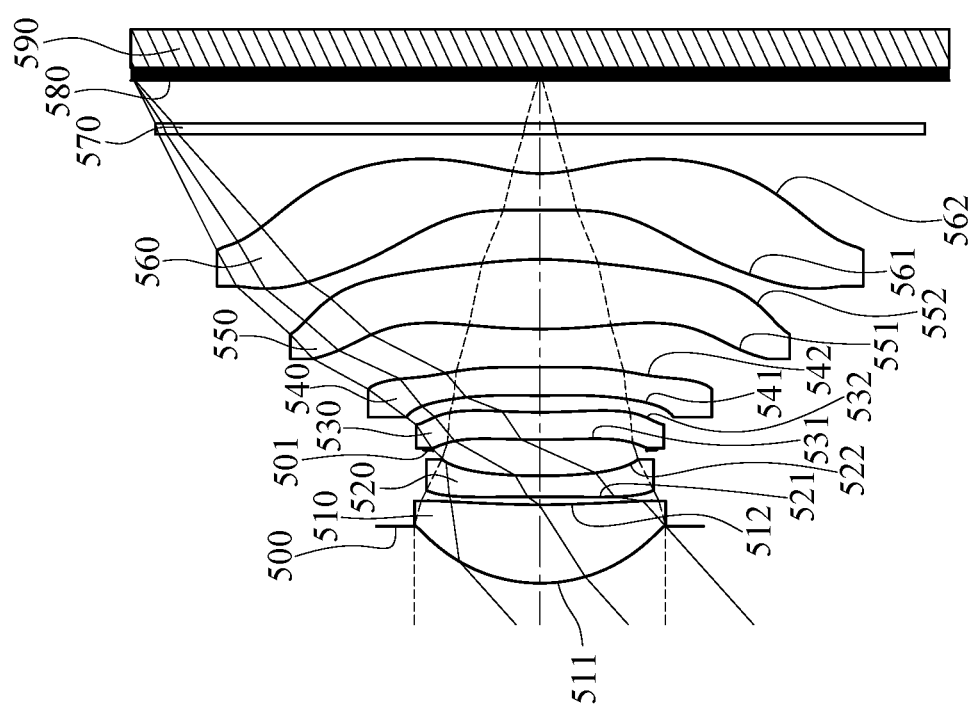
FIG. 9 is a schematic view of an image capturing unit according to the 5th embodiment of the present disclosure.
Figure 10:
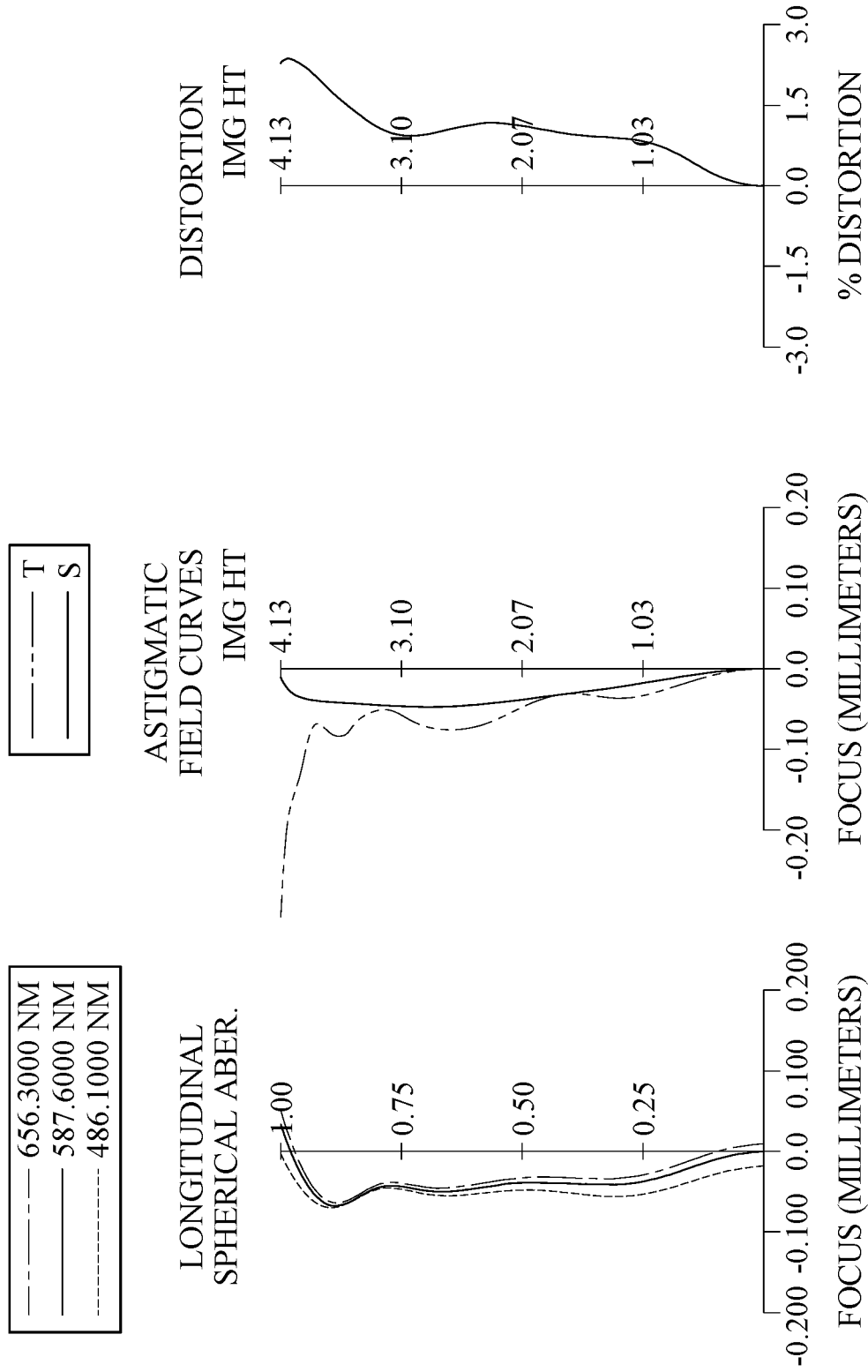
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the imaging lens system (its reference numeral is omitted) of the present disclosure and an image sensor 590. The imaging lens system includes, in order from an object side to an image side, an aperture stop 500, a first lens element 510, a second lens element 520, a stop 501, a third lens element 530, a fourth lens element 540, a fifth lens element 550, a sixth lens element 560, a filter 570 and an image surface 580. The imaging lens system includes six lens elements (510, 520, 530, 540, 550 and 560) with no additional lens element disposed between each of the adjacent six lens elements.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. Each of the object-side surface 531 and the image-side surface 532 of the third lens element 530 has at least one critical point. The image-side surface 532 of the third lens element 530 has at least one convex shape in an off-axis region thereof.

The fourth lens element 540 with positive refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. Each of the object-side surface 541 and the image-side surface 542 of the fourth lens element 540 has at least one critical point. The image-side surface 542 of the fourth lens element 540 has at least one convex shape in an off-axis region thereof.

The fifth lens element 550 with positive refractive power has an object-side surface 551 being convex in a paraxial region thereof and an image-side surface 552 being convex in a paraxial region thereof. The fifth lens element 550 is made of plastic material and has the object-side surface 551 and the image-side surface 552 being both aspheric.

The sixth lens element 560 with negative refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. Each of the object-side surface 561 and the image-side surface 562 of the sixth lens element 560 has at least one critical point. The image-side surface 562 of the sixth lens element 560 has at least one inflection point. The image-side surface 562 of the sixth lens element 560 has at least one convex shape in an off-axis region thereof. The image-side surface 562 of the sixth lens element 560 has a concave-to-convex shape change and then a convex-to-concave shape change in order from the paraxial region thereof to the off-axis region thereof.

The filter 570 is made of glass material and located between the sixth lens element 560 and the image surface 580, and will not affect the focal length of the imaging lens system. The image sensor 590 is disposed on or near the image surface 580 of the imaging lens system.

In this embodiment, there is one lens element (the fourth lens element 540) satisfying the following condition: |f/Rf|+|f/Rr|<0.80. When a focal length of the imaging lens system is f, a curvature radius of the object-side surface 541 of the fourth lens element 540 is R7, and a curvature radius of the image-side surface 542 of the fourth lens element 540 is R8, the following condition is satisfied: |f/R7|+|f/R8|=0.49.

The detailed optical data of the 5th embodiment are shown in Table 9 and the aspheric surface data are shown in Table 10 below.

TABLE 9

5th Embodiment
f = 4.54 mm, Fno = 1.78, HFOV = 41.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.580 | | | | |
| 2 | Lens 1 | 1.636 | (ASP) | 0.798 | Plastic | 1.535 | 56.3 | 3.70 |
| 3 | | 7.820 | (ASP) | 0.079 | | | | |
| 4 | Lens 2 | 47.814 | (ASP) | 0.215 | Plastic | 1.656 | 21.3 | −9.08 |
| 5 | | 5.290 | (ASP) | 0.268 | | | | |
| 6 | Stop | Plano | | 0.100 | | | | |

TABLE 9-continued

5th Embodiment
f = 4.54 mm, Fno = 1.78, HFOV = 41.8 deg.

| Surface # | | Curvature Radius | | Thickness | Material | Index | Abbe # | Focal Length |
|---|---|---|---|---|---|---|---|---|
| 7 | Lens 3 | 7.468 | (ASP) | 0.279 | Plastic | 1.607 | 26.6 | −36.73 |
| 8 | | 5.516 | (ASP) | 0.170 | | | | |
| 9 | Lens 4 | 16.074 | (ASP) | 0.287 | Plastic | 1.584 | 28.2 | 99.07 |
| 10 | | 22.108 | (ASP) | 0.390 | | | | |
| 11 | Lens 5 | 6.000 | (ASP) | 0.709 | Plastic | 1.534 | 55.9 | 4.35 |
| 12 | | −3.630 | (ASP) | 0.502 | | | | |
| 13 | Lens 6 | 18.638 | (ASP) | 0.372 | Plastic | 1.534 | 55.9 | −3.09 |
| 14 | | 1.507 | (ASP) | 0.400 | | | | |
| 15 | Filter | Plano | | 0.110 | Glass | 1.517 | 64.2 | — |
| 16 | | Plano | | 0.437 | | | | |
| 17 | Image | Plano | | — | | | | |

Note:
Reference wavelength is 587.6 nm (d-line).
An effective radius of the stop 501 (Surface 6) is 1.086 mm.

TABLE 10

Aspheric Coefficients

| | Surface # | | | | | |
|---|---|---|---|---|---|---|
| | 2 | 3 | 4 | 5 | 7 | 8 |
| k = | −2.5020E−01 | 0.0000E+00 | −9.0000E+01 | 1.0348E+01 | 4.0191E+01 | 9.8028E+00 |
| A4 = | 1.0300E−02 | −7.6834E−02 | −9.1279E−02 | −6.5902E−02 | −1.4666E−01 | −1.5007E−01 |
| A6 = | −1.2126E−02 | 1.0288E−01 | 2.3156E−01 | 3.8622E−01 | 1.5987E−01 | 9.8558E−02 |
| A8 = | 4.5479E−02 | −7.5484E−02 | −2.2088E−01 | −8.2699E−01 | −4.0606E−01 | −1.0049E−01 |
| A10 = | −5.8717E−02 | 2.5658E−02 | 1.2292E−01 | 1.1755E+00 | 5.1347E−01 | 4.0813E−02 |
| A12 = | 3.8579E−02 | −4.0267E−03 | −3.7330E−02 | −9.0337E−01 | −3.7576E−01 | −2.5648E−02 |
| A14 = | −1.0573E−02 | — | 7.7739E−03 | 2.9732E−01 | 1.1588E−01 | 1.2645E−02 |

| | Surface # | | | | | |
|---|---|---|---|---|---|---|
| | 9 | 10 | 11 | 12 | 13 | 14 |
| k = | 5.4942E+01 | −4.3592E+01 | 2.2080E−01 | −2.4841E+01 | 5.6277E+00 | −6.8436E+00 |
| A4 = | −1.2843E−01 | −1.3195E−01 | 1.7865E−02 | 5.2746E−02 | −2.3303E−01 | −1.3799E−01 |
| A6 = | −8.8742E−02 | −4.2173E−03 | −8.2840E−02 | −5.9630E−02 | 1.0761E−01 | 7.1182E−02 |
| A8 = | 3.7711E−01 | 7.6027E−02 | 6.3968E−02 | 3.2276E−02 | −2.6789E−02 | −2.5914E−02 |
| A10 = | −4.0443E−01 | −2.3258E−02 | −2.9323E−02 | −8.4864E−03 | 4.9242E−03 | 6.7396E−03 |
| A12 = | 1.9242E−01 | −8.7382E−03 | 7.9033E−03 | 3.2128E−04 | −8.4189E−04 | −1.2417E−03 |
| A14 = | −3.5763E−02 | 5.1552E−03 | −1.1980E−03 | 3.9709E−04 | 1.2475E−04 | 1.5423E−04 |
| A16 = | — | −6.6783E−04 | 9.3451E−05 | −1.0588E−04 | −1.2586E−05 | −1.2075E−05 |
| A18 = | — | — | −2.7564E−06 | 1.1300E−05 | 7.1129E−07 | 5.3492E−07 |
| A20 = | — | — | −1.7344E−08 | −4.5256E−07 | −1.6816E−08 | −1.0211E−08 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 4.54 | (TL)$^2$/(ImgH × EPD) | 2.48 |
| Fno | 1.78 | TL/ImgH | 1.24 |
| HFOV [deg.] | 41.8 | TL/(EPD + ImgH) | 0.77 |
| V3 | 26.6 | ImgH/Fno [mm] | 2.32 |
| V4 | 28.2 | SD/TD | 0.86 |

-continued

| 5th Embodiment | | | |
|---|---|---|---|
| V3/N3 | 16.55 | tan(HFOV) | 0.89 |
| V4/N4 | 17.80 | f/EPD | 1.78 |
| V2 + V3 + V4 | 76.1 | Yc31/Yc32 | 0.86 |
| [(V1 − V3) × (V1 − V4)]/[(V3 − V2) × (V4 − V2)] | 22.82 | Yc41/Yc42 | 1.17 |
| (CT2 + CT3 + CT4)/ImgH | 0.19 | Yc61/Yc62 | 0.20, 2.37 |
| (T23 + T45)/(CT2 + CT3 + CT4) | 0.97 | |f/R1| + |f/R2| | 3.36 |
| (R9 − R10)/(R9 + R10) | 4.06 | |f/R3| + |f/R4| | 0.95 |
| |(R5 − R6)/(R5 + R6)| + |(R7 − R8)/(R7 + R8)| | 0.31 | |f/R5| + |f/R6| | 1.43 |
| f/f12 | 0.84 | |f/R7| + |f/R8| | 0.49 |
| f/f3 | −0.12 | |f/R9| + |f/R10| | 2.01 |
| |f/f3| + |f/f4| | 0.17 | |f/R11| + |f/R12| | 3.26 |
| TL/EPD | 2.00 | — | — |

6th Embodiment

Figure 11:
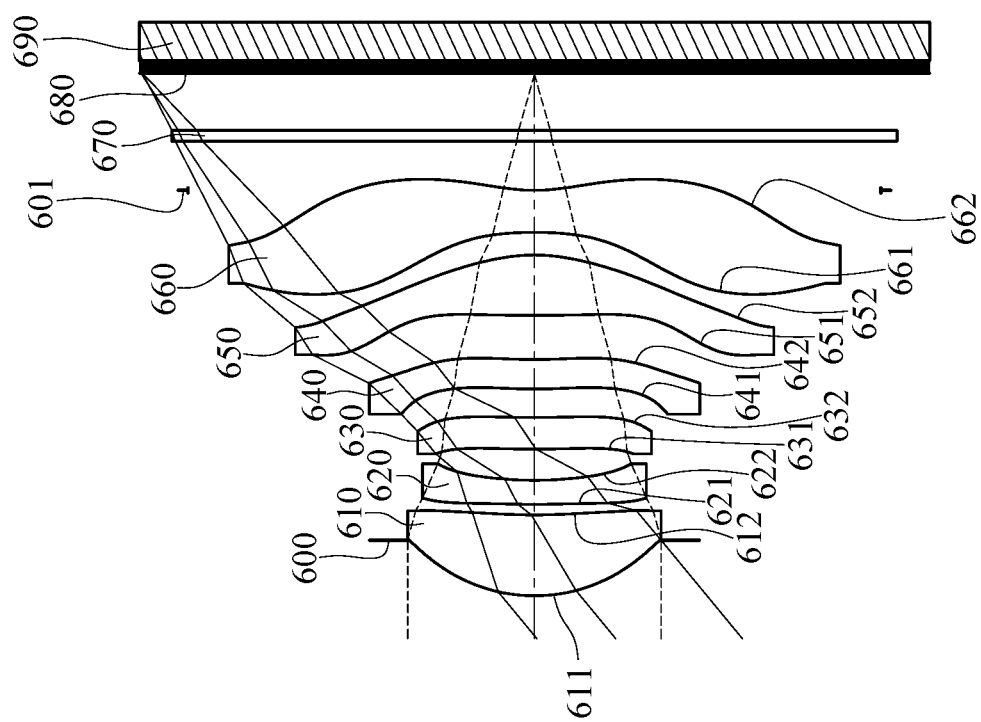
FIG. 11 is a schematic view of an image capturing unit according to the 6th embodiment of the present disclosure.
Figure 12:
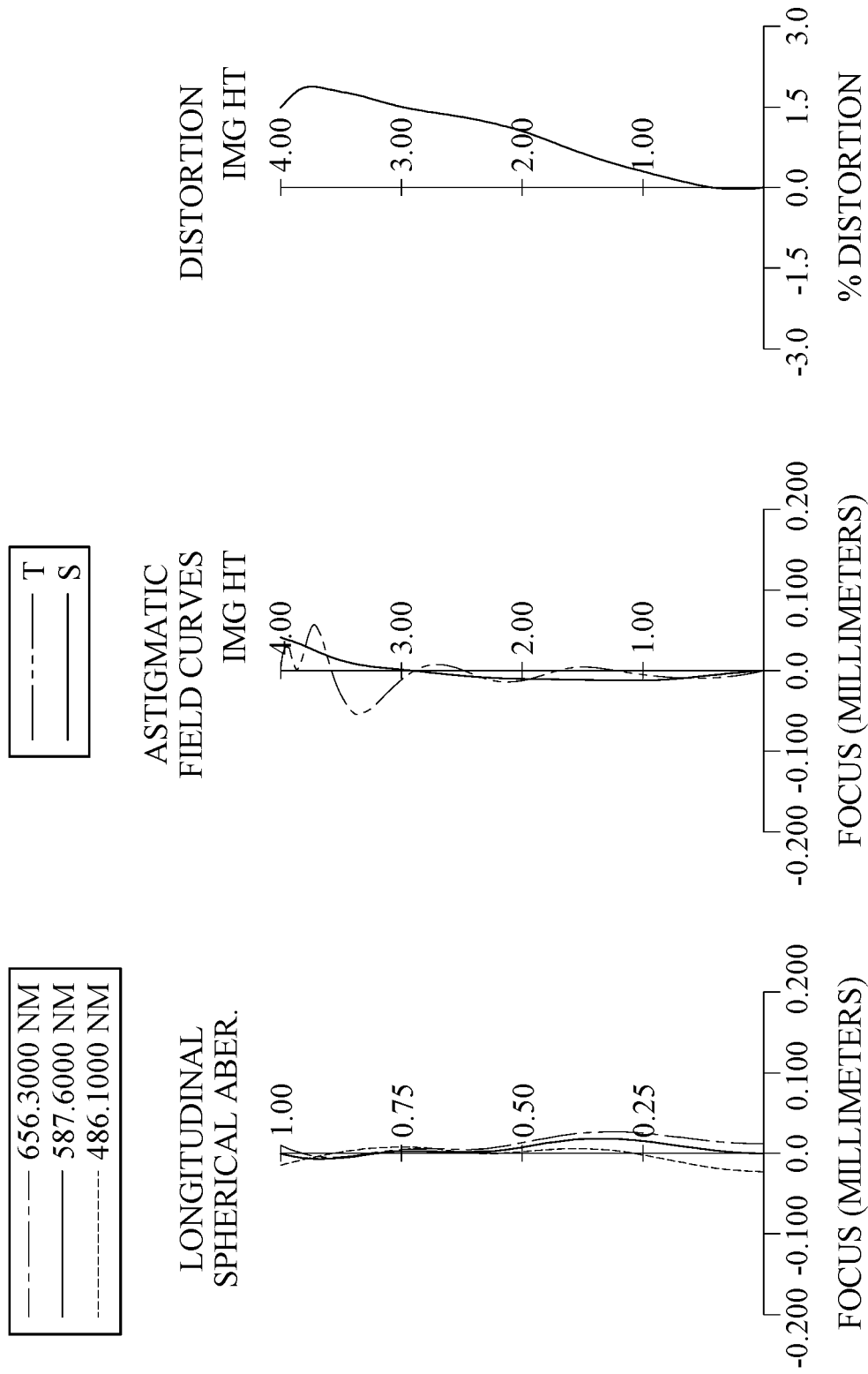
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the imaging lens system (its reference numeral is omitted) of the present disclosure and an image sensor 690. The imaging lens system includes, in order from an object side to an image side, an aperture stop 600, a first lens element 610, a second lens element 620, a third lens element 630, a fourth lens element 640, a fifth lens element 650, a sixth lens element 660, a stop 601, a filter 670 and an image surface 680. The imaging lens system includes six lens elements (610, 620, 630, 640, 650 and 660) with no additional lens element disposed between each of the adjacent six lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. Each of the object-side surface 631 and the image-side surface 632 of the third lens element 630 has at least one critical point. The image-side surface 632 of the third lens element 630 has at least one convex shape in an off-axis region thereof.

The fourth lens element 640 with positive refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric. Each of the object-side surface 641 and the image-side surface 642 of the fourth lens element 640 has at least one critical point. The image-side surface 642 of the fourth lens element 640 has at least one convex shape in an off-axis region thereof.

The fifth lens element 650 with positive refractive power has an object-side surface 651 being convex in a paraxial region thereof and an image-side surface 652 being convex in a paraxial region thereof. The fifth lens element 650 is made of plastic material and has the object-side surface 651 and the image-side surface 652 being both aspheric. The image-side surface 652 of the fifth lens element 650 has at least one convex shape in an off-axis region thereof.

The sixth lens element 660 with negative refractive power has an object-side surface 661 being concave in a paraxial region thereof and an image-side surface 662 being concave in a paraxial region thereof. The sixth lens element 660 is made of plastic material and has the object-side surface 661 and the image-side surface 662 being both aspheric. Each of the object-side surface 661 and the image-side surface 662 of the sixth lens element 660 has at least one critical point. The image-side surface 662 of the sixth lens element 660 has at least one inflection point. The image-side surface 662 of the sixth lens element 660 has at least one convex shape in an off-axis region thereof. The image-side surface 662 of the sixth lens element 660 has a concave-to-convex shape change and then a convex-to-concave shape change in order from the paraxial region thereof to the off-axis region thereof.

The filter 670 is made of glass material and located between the sixth lens element 660 and the image surface 680, and will not affect the focal length of the imaging lens system. The image sensor 690 is disposed on or near the image surface 680 of the imaging lens system.

The detailed optical data of the 6th embodiment are shown in Table 11 and the aspheric surface data are shown in Table 12 below.

TABLE 11

6th Embodiment
f = 4.76 mm, Fno = 1.85, HFOV = 39.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.565 | | | | |
| 2 | Lens 1 | 1.665 | (ASP) | 0.823 | Plastic | 1.545 | 56.1 | 4.05 |
| 3 | | 5.611 | (ASP) | 0.107 | | | | |
| 4 | Lens 2 | 7.704 | (ASP) | 0.245 | Plastic | 1.671 | 19.3 | −9.61 |
| 5 | | 3.464 | (ASP) | 0.317 | | | | |
| 6 | Lens 3 | 8.048 | (ASP) | 0.322 | Plastic | 1.584 | 28.2 | 202.17 |
| 7 | | 8.510 | (ASP) | 0.290 | | | | |
| 8 | Lens 4 | 4.942 | (ASP) | 0.300 | Plastic | 1.614 | 26.0 | 151.44 |
| 9 | | 5.099 | (ASP) | 0.449 | | | | |
| 10 | Lens 5 | 17.387 | (ASP) | 0.615 | Plastic | 1.544 | 56.0 | 2.95 |
| 11 | | −1.746 | (ASP) | 0.230 | | | | |
| 12 | Lens 6 | −4.297 | (ASP) | 0.428 | Plastic | 1.534 | 55.9 | −2.29 |
| 13 | | 1.771 | (ASP) | 0.000 | | | | |

TABLE 11-continued

6th Embodiment
f = 4.76 mm, Fno = 1.85, HFOV = 39.5 deg.

| Surface # | | Curvature Radius | Thickness | Material | Index | Abbe # | Focal Length |
|---|---|---|---|---|---|---|---|
| 14 | Stop | Plano | 0.500 | | | | |
| 15 | Filter | Plano | 0.110 | Glass | 1.517 | 64.2 | — |
| 16 | | Plano | 0.581 | | | | |
| 17 | Image | Plano | — | | | | |

Note:
Reference wavelength is 587.6 nm (d-line).
An effective radius of the stop 601 (Surface 14) is 3.521 mm.

TABLE 12

Aspheric Coefficients

| Surface # | 2 | 3 | 4 | 5 | 6 | 7 |
|---|---|---|---|---|---|---|
| k = | −7.7859E−02 | 1.1939E+01 | 1.8463E+01 | 3.8762E+00 | −9.0988E+01 | 3.0276E+01 |
| A4 = | 2.0814E−03 | −1.1127E−01 | −1.8948E−01 | −1.2557E−01 | −1.0213E−01 | −1.3361E−01 |
| A6 = | −9.1913E−03 | 9.9045E−02 | 3.1406E−01 | 2.5992E−01 | 7.6166E−02 | 4.4085E−02 |
| A8 = | 3.1694E−02 | −6.0356E−02 | −2.7902E−01 | −1.9375E−01 | −9.6712E−02 | 1.1786E−01 |
| A10 = | −4.4165E−02 | 1.7046E−02 | 1.6793E−01 | 7.2899E−02 | 1.9961E−02 | −4.1392E−01 |
| A12 = | 2.8319E−02 | −2.3061E−03 | −6.2044E−02 | 2.7440E−03 | 3.2090E−02 | 4.9571E−01 |
| A14 = | −7.4865E−03 | −4.5917E−04 | 1.1639E−02 | — | −2.4330E−02 | −2.8750E−01 |
| A16 = | — | — | — | — | — | 6.6022E−02 |

| Surface # | 8 | 9 | 10 | 11 | 12 | 13 |
|---|---|---|---|---|---|---|
| k = | −2.3713E+00 | −8.6845E+00 | 3.7204E+01 | −5.9961E+00 | −3.4531E+00 | −1.2250E+01 |
| A4 = | −1.9413E−01 | −1.7879E−01 | 1.1364E−02 | 3.8430E−02 | −1.6670E−01 | −1.1670E−01 |
| A6 = | 8.6382E−02 | 9.0716E−02 | −8.0974E−02 | −7.8403E−02 | 8.1519E−02 | 6.8884E−02 |
| A8 = | 3.7774E−02 | −5.6342E−02 | 6.5965E−02 | 6.7412E−02 | −1.1922E−02 | −2.8697E−02 |
| A10 = | −1.4784E−01 | 3.3122E−02 | −4.5381E−02 | −3.5253E−02 | −1.2660E−03 | 8.0923E−03 |
| A12 = | 1.4279E−01 | −1.0556E−02 | 2.0965E−02 | 1.2307E−02 | 7.3252E−04 | −1.5569E−03 |
| A14 = | −6.6130E−02 | 1.5827E−03 | −5.6090E−03 | −2.8181E−03 | −1.1887E−04 | 1.9811E−04 |
| A16 = | 1.1765E−02 | −9.1899E−05 | 8.4164E−04 | 3.9746E−04 | 9.8870E−06 | −1.5640E−05 |
| A18 = | — | — | −6.5839E−05 | −3.0867E−05 | −4.2681E−07 | 6.8640E−07 |
| A20 = | — | — | 2.0786E−06 | 1.0016E−06 | 7.5659E−09 | −1.2739E−08 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.76 | (TL)²/(ImgH × EPD) | 2.75 |
| Fno | 1.85 | TL/ImgH | 1.33 |
| HFOV [deg.] | 39.5 | TL/(EPD + ImgH) | 0.81 |
| V3 | 28.2 | ImgH/Fno [mm] | 2.16 |
| V4 | 26.0 | SD/TD | 0.86 |
| V3/N3 | 17.80 | tan(HFOV) | 0.83 |
| V4/N4 | 16.11 | f/EPD | 1.85 |
| V2 + V3 + V4 | 73.5 | Yc31/Yc32 | 1.06 |
| [(V1 − V3) × (V1 − V4)]/ [(V3 − V2) × (V4 − V2)] | 14.08 | Yc41/Yc42 | 1.00 |
| (CT2 + CT3 + CT4)/ImgH | 0.22 | Yc61/Yc62 | 1.98 |
| (T23 + T45)/(CT2 + CT3 + CT4) | 0.88 | \|f/R1\| + \|f/R2\| | 3.71 |
| (R9 − R10)/(R9 + R10) | 1.22 | \|f/R3\| + \|f/R4\| | 1.99 |
| \|(R5 − R6)/(R5 + R6)\| + | 0.04 | \|f/R5\| + \|f/R6\| | 1.15 |

-continued

| 6th Embodiment | | | |
|---|---|---|---|
| \|(R7 − R8)/(R7 + R8)\| | | | |
| f/f12 | 0.81 | \|f/R7\| + \|f/R8\| | 1.90 |
| f/f3 | 0.02 | \|f/R9\| + \|f/R10\| | 3.00 |
| \|f/f3\| + \|f/f4\| | 0.06 | \|f/R11\| + \|f/R12\| | 3.80 |
| TL/EPD | 2.07 | — | — |

7th Embodiment

Figure 13:
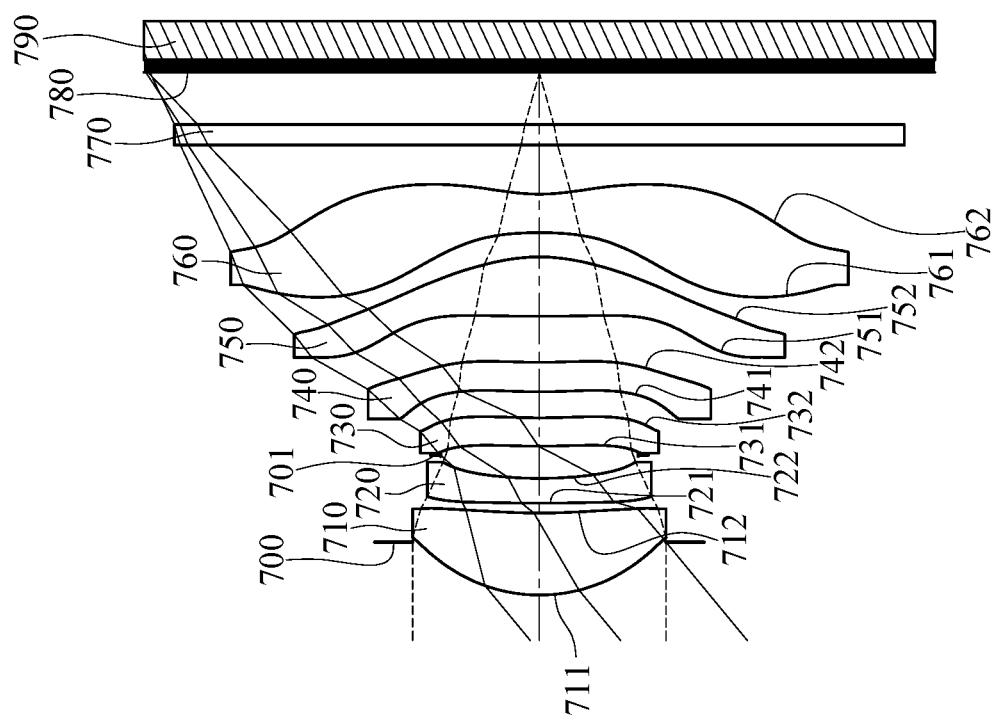
FIG. 13 is a schematic view of an image capturing unit according to the 7th embodiment of the present disclosure.
Figure 14:
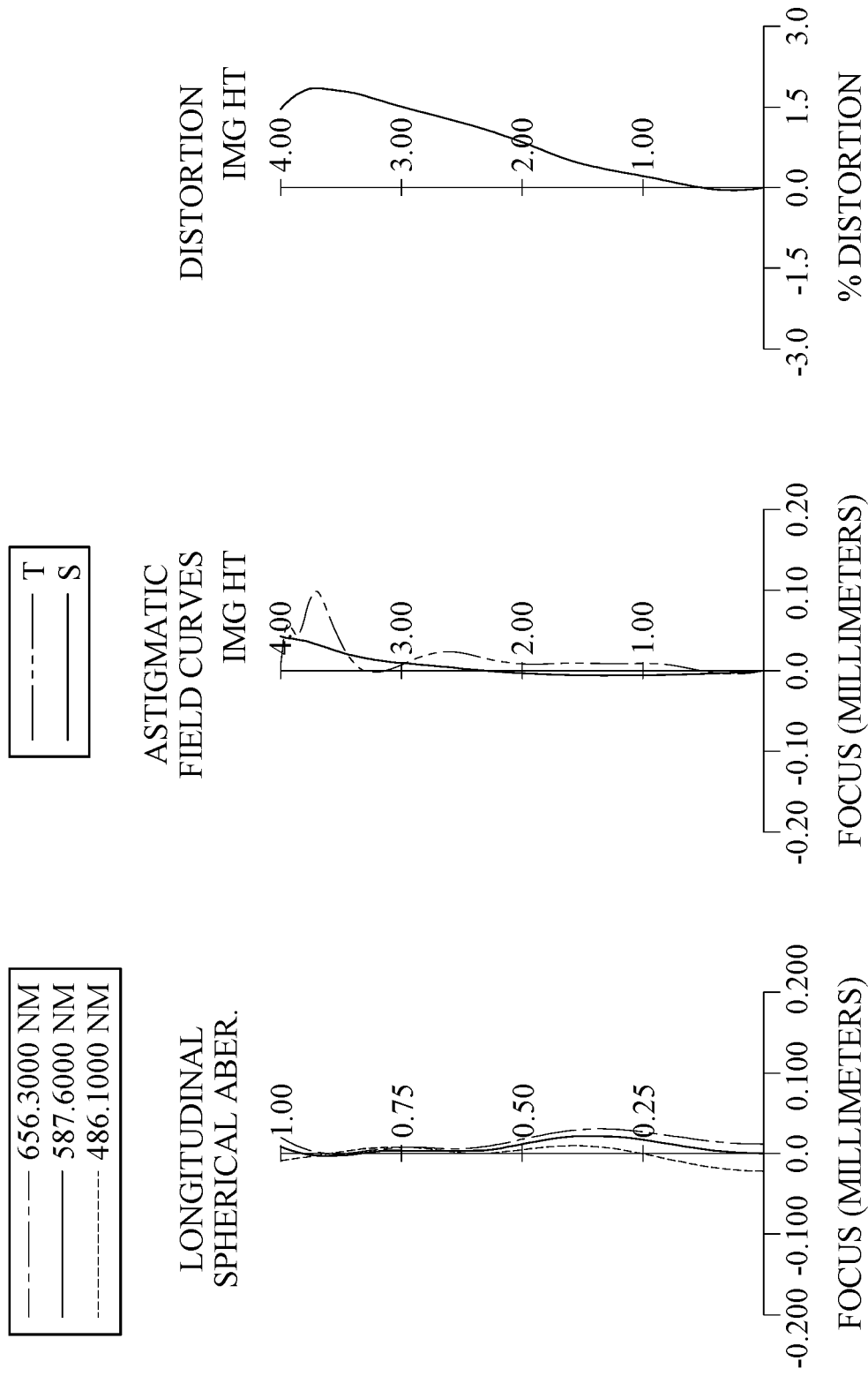
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the imaging lens system (its reference numeral is omitted) of the present disclosure and an image sensor 790. The imaging lens system includes, in order from an object side to an image side, an aperture stop 700, a first lens element 710, a second lens element 720, a stop 701, a third lens element 730, a fourth lens element 740, a fifth lens element 750, a sixth lens element 760, a filter 770 and an image surface 780. The imaging lens system includes six lens elements (710, 720, 730, 740, 750 and 760) with no additional lens element disposed between each of the adjacent six lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric. Each of the object-side surface 731 and the image-side surface 732 of the third lens element 730 has at least one critical point. The image-side surface 732 of the third lens element 730 has at least one convex shape in an off-axis region thereof.

The fourth lens element 740 with positive refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric. Each of the object-side surface 741 and the image-side surface 742 of the fourth lens element 740 has at least one critical point. The image-side surface 742 of the fourth lens element 740 has at least one convex shape in an off-axis region thereof.

The fifth lens element 750 with positive refractive power has an object-side surface 751 being convex in a paraxial region thereof and an image-side surface 752 being convex in a paraxial region thereof. The fifth lens element 750 is made of plastic material and has the object-side surface 751 and the image-side surface 752 being both aspheric. The image-side surface 752 of the fifth lens element 750 has at least one convex shape in an off-axis region thereof.

The sixth lens element 760 with negative refractive power has an object-side surface 761 being concave in a paraxial region thereof and an image-side surface 762 being concave in a paraxial region thereof. The sixth lens element 760 is made of plastic material and has the object-side surface 761 and the image-side surface 762 being both aspheric. Each of the object-side surface 761 and the image-side surface 762 of the sixth lens element 760 has at least one critical point. The image-side surface 762 of the sixth lens element 760 has at least one inflection point. The image-side surface 762 of the sixth lens element 760 has at least one convex shape in an off-axis region thereof. The image-side surface 762 of the sixth lens element 760 has a concave-to-convex shape change and then a convex-to-concave shape change in order from the paraxial region thereof to the off-axis region thereof.

The filter 770 is made of glass material and located between the sixth lens element 760 and the image surface 780, and will not affect the focal length of the imaging lens system. The image sensor 790 is disposed on or near the image surface 780 of the imaging lens system.

The detailed optical data of the 7th embodiment are shown in Table 13 and the aspheric surface data are shown in Table 14 below.

TABLE 13

7th Embodiment
f = 4.77 mm, Fno = 1.85, HFOV = 39.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.538 | | | | |
| 2 | Lens 1 | 1.649 | (ASP) | 0.834 | Plastic | 1.545 | 56.1 | 3.95 |
| 3 | | 5.802 | (ASP) | 0.100 | | | | |
| 4 | Lens 2 | 10.265 | (ASP) | 0.253 | Plastic | 1.671 | 19.3 | −9.63 |
| 5 | | 3.927 | (ASP) | 0.237 | | | | |
| 6 | Stop | Plano | | 0.091 | | | | |
| 7 | Lens 3 | 7.599 | (ASP) | 0.288 | Plastic | 1.584 | 28.2 | −75.36 |
| 8 | | 6.390 | (ASP) | 0.265 | | | | |
| 9 | Lens 4 | 5.241 | (ASP) | 0.300 | Plastic | 1.614 | 26.0 | 47.45 |
| 10 | | 6.253 | (ASP) | 0.468 | | | | |
| 11 | Lens 5 | 18.771 | (ASP) | 0.605 | Plastic | 1.544 | 56.0 | 2.94 |
| 12 | | −1.725 | (ASP) | 0.247 | | | | |
| 13 | Lens 6 | −3.712 | (ASP) | 0.391 | Plastic | 1.534 | 55.9 | −2.26 |
| 14 | | 1.853 | (ASP) | 0.500 | | | | |
| 15 | Filter | Plano | | 0.210 | Glass | 1.517 | 64.2 | — |
| 16 | | Plano | | 0.528 | | | | |
| 17 | Image | Plano | | — | | | | |

Note:
Reference wavelength is 587.6 nm (d-line).
An effective radius of the stop 701 (Surface 6) is 1.005 mm.

TABLE 14

Aspheric Coefficients

| Surface # | 2 | 3 | 4 | 5 | 7 | 8 |
|---|---|---|---|---|---|---|
| k = | −9.7066E−02 | 1.0391E+01 | 6.6125E+01 | 1.1553E+01 | −8.9521E+01 | 2.2837E+01 |
| A4 = | 3.8359E−03 | −9.7672E−02 | −1.4379E−01 | −9.3406E−02 | −1.2873E−01 | −1.7185E−01 |
| A6 = | −1.2537E−02 | 1.0412E−01 | 2.4896E−01 | 1.9258E−01 | 1.7612E−01 | 1.1360E−01 |
| A8 = | 4.0049E−02 | −1.0418E−01 | −2.3462E−01 | −1.5981E−01 | −4.0418E−01 | −2.0517E−02 |
| A10 = | −5.3986E−02 | 7.9624E−02 | 1.5482E−01 | 7.6428E−02 | 5.0072E−01 | −2.7583E−01 |
| A12 = | 3.4168E−02 | −3.9262E−02 | −6.1858E−02 | −1.3304E−02 | −3.5262E−01 | 4.2956E−01 |
| A14 = | −8.8509E−03 | 7.5055E−03 | 1.1119E−02 | — | 9.9896E−02 | −2.8232E−01 |
| A16 = | — | — | — | — | — | 7.0972E−02 |

| Surface # | 9 | 10 | 11 | 12 | 13 | 14 |
|---|---|---|---|---|---|---|
| k = | −1.3389E−01 | −8.2386E+00 | 4.4690E+01 | −6.0212E+00 | −4.7218E+00 | −1.4050E+01 |
| A4 = | −2.0060E−01 | −1.7146E−01 | 5.5663E−03 | 3.1851E−02 | −1.7073E−01 | −1.1956E−01 |
| A6 = | 1.3464E−01 | 8.6270E−02 | −6.3147E−02 | −6.6409E−02 | 8.8736E−02 | 7.1795E−02 |
| A8 = | −9.4951E−02 | −5.8252E−02 | 3.9160E−02 | 5.0720E−02 | −1.6378E−02 | −2.9487E−02 |
| A10 = | 3.7167E−02 | 3.8828E−02 | −2.3742E−02 | −2.3269E−02 | 1.4527E−04 | 8.0423E−03 |
| A12 = | 2.4787E−03 | −1.3420E−02 | 1.1079E−02 | 7.4605E−03 | 4.7030E−04 | −1.4814E−03 |
| A14 = | −1.1779E−02 | 2.0603E−03 | −2.9451E−03 | −1.6514E−03 | −8.9233E−05 | 1.8004E−04 |
| A16 = | 3.6543E−03 | −1.0810E−04 | 4.1914E−04 | 2.3139E−04 | 7.8928E−06 | −1.3591E−05 |
| A18 = | — | — | −2.9195E−05 | −1.7968E−05 | −3.5374E−07 | 5.7114E−07 |
| A20 = | — | — | 7.3271E−07 | 5.8016E−07 | 6.4483E−09 | −1.0160E−08 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 4.77 | $(TL)^2/(ImgH \times EPD)$ | 2.74 |
| Fno | 1.85 | TL/ImgH | 1.33 |
| HFOV [deg.] | 39.5 | TL/(EPD + ImgH) | 0.81 |
| V3 | 28.2 | ImgH/Fno [mm] | 2.16 |
| V4 | 26.0 | SD/TD | 0.87 |
| V3/N3 | 17.80 | tan(HFOV) | 0.82 |
| V4/N4 | 16.11 | f/EPD | 1.85 |
| V2 + V3 + V4 | 73.5 | Yc31/Yc32 | 0.93 |
| [(V1 − V3) × (V1 − V4)]/[(V3 − V2) × (V4 − V2)] | 14.08 | Yc41/Yc42 | 1.08 |
| (CT2 + CT3 + CT4)/ImgH | 0.21 | Yc61/Yc62 | 2.06 |
| (T23 + T45)/(CT2 + CT3 + CT4) | 0.95 | \|f/R1\| + \|f/R2\| | 3.71 |
| (R9 − R10)/(R9 + R10) | 1.20 | \|f/R3\| + \|f/R4\| | 1.68 |
| \|(R5 − R6)/(R5 + R6)\| + \|(R7 − R8)/(R7 + R8)\| | 0.17 | \|f/R5\| + \|f/R6\| | 1.37 |
| f/f12 | 0.84 | \|f/R7\| + \|f/R8\| | 1.67 |
| f/f3 | −0.06 | \|f/R9\| + \|f/R10\| | 3.02 |
| \|f/f3\| + \|f/f4\| | 0.16 | \|f/R11\| + \|f/R12\| | 3.86 |
| TL/EPD | 2.06 | — | — |

8th Embodiment

Figure 15:
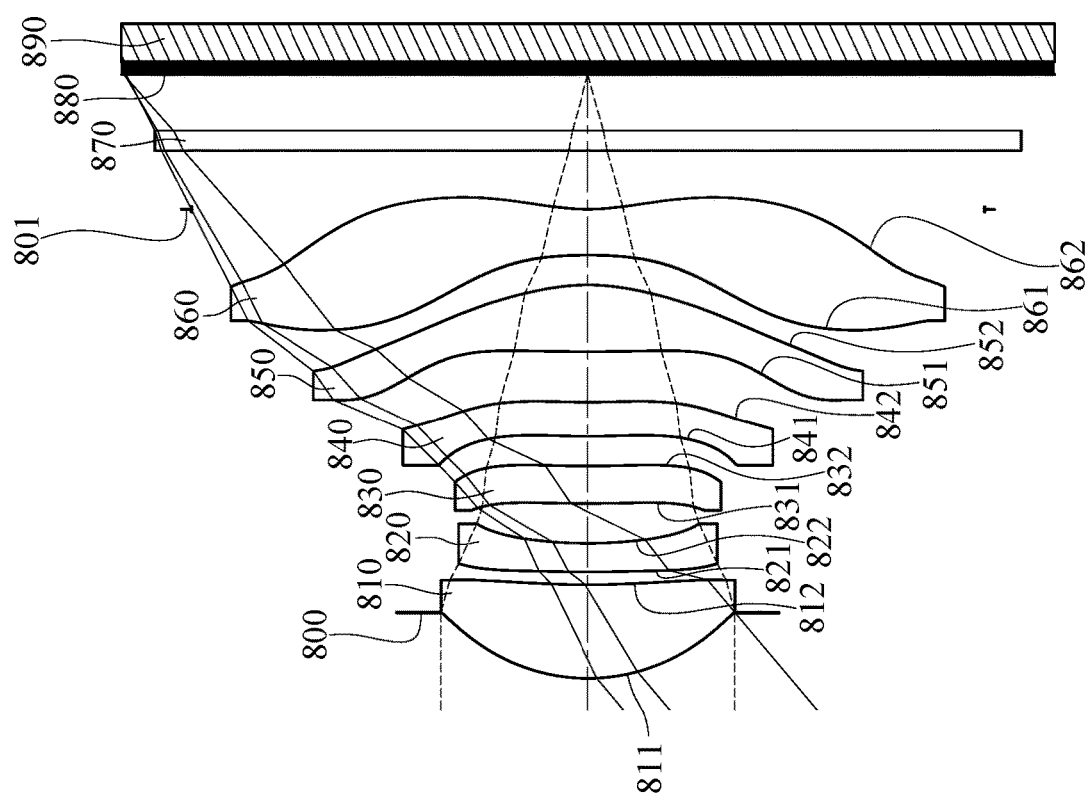
FIG. 15 is a schematic view of an image capturing unit according to the 8th embodiment of the present disclosure.
Figure 16:
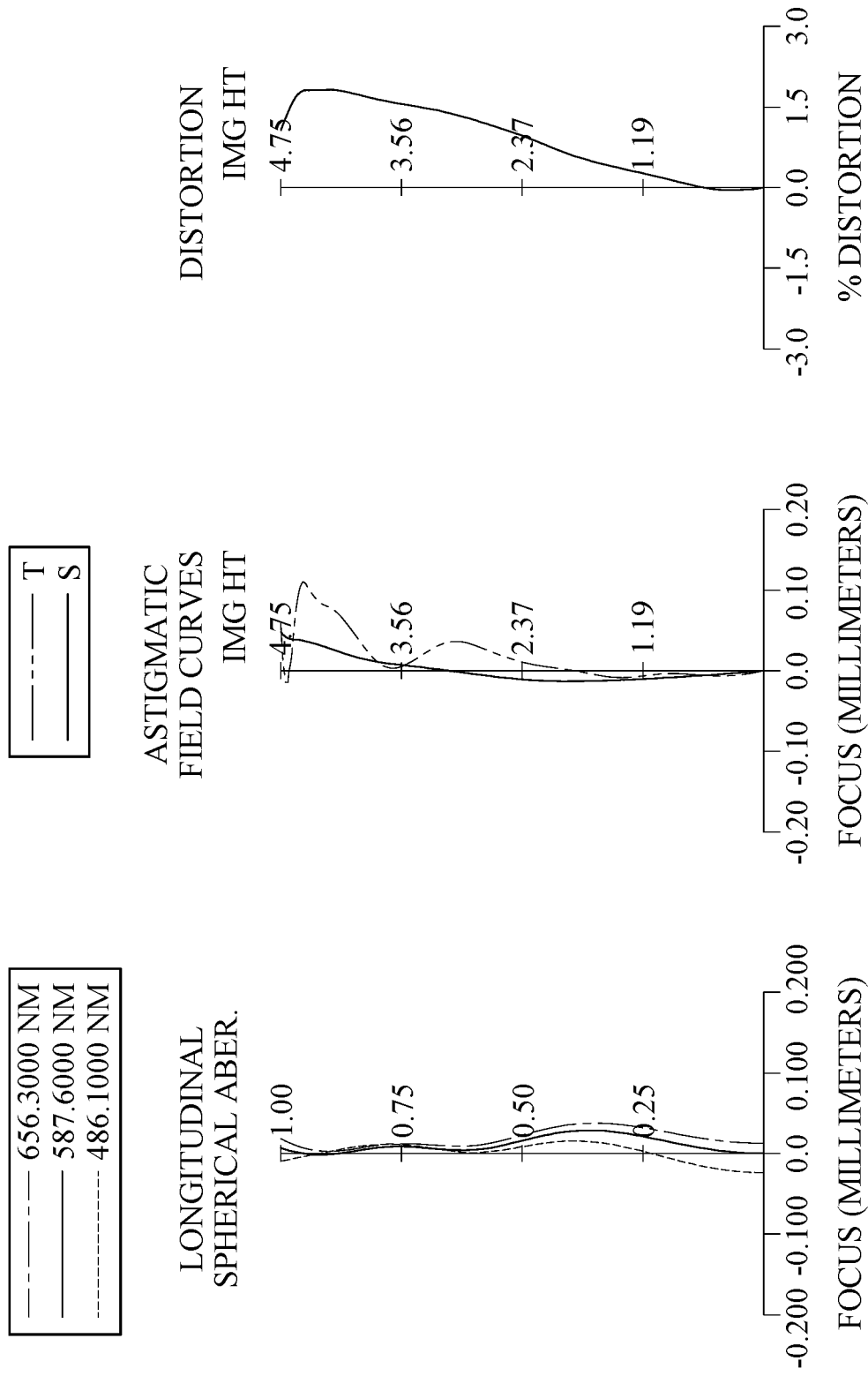
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the imaging lens system (its reference numeral is omitted) of the present disclosure and an image sensor 890. The imaging lens system includes, in order from an object side to an image side, an aperture stop 800, a first lens element 810, a second lens element 820, a third lens element 830, a fourth lens element 840, a fifth lens element 850, a sixth lens element 860, a stop 801, a filter 870 and an image surface 880. The imaging lens system includes six lens elements (810, 820, 830, 840, 850 and 860) with no additional lens element disposed between each of the adjacent six lens elements.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric. Each of the object-side surface 831 and the image-side surface 832 of the third lens element 830 has at least one critical point. The image-side surface 832 of the third lens element 830 has at least one convex shape in an off-axis region thereof.

The fourth lens element 840 with positive refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric. Each of the object-side surface 841 and the image-side surface 842 of the fourth lens element 840 has at least one critical point. The image-side surface 842 of the fourth lens element 840 has at least one convex shape in an off-axis region thereof.

The fifth lens element 850 with positive refractive power has an object-side surface 851 being convex in a paraxial region thereof and an image-side surface 852 being convex in a paraxial region thereof. The fifth lens element 850 is made of plastic material and has the object-side surface 851 and the image-side surface 852 being both aspheric. The image-side surface 852 of the fifth lens element 850 has at least one convex shape in an off-axis region thereof.

The sixth lens element 860 with negative refractive power has an object-side surface 861 being concave in a paraxial region thereof and an image-side surface 862 being concave in a paraxial region thereof. The sixth lens element 860 is made of plastic material and has the object-side surface 861 and the image-side surface 862 being both aspheric. Each of the object-side surface 861 and the image-side surface 862 of the sixth lens element 860 has at least one critical point. The image-side surface 862 of the sixth lens element 860 has at least one inflection point. The image-side surface 862 of the sixth lens element 860 has at least one convex shape in an off-axis region thereof. The image-side surface 862 of the sixth lens element 860 has a concave-to-convex shape change and then a convex-to-concave shape change in order from the paraxial region thereof to the off-axis region thereof.

The filter 870 is made of glass material and located between the sixth lens element 860 and the image surface 880, and will not affect the focal length of the imaging lens system. The image sensor 890 is disposed on or near the image surface 880 of the imaging lens system.

The detailed optical data of the 8th embodiment are shown in Table 15 and the aspheric surface data are shown in Table 16 below.

TABLE 15

8th Embodiment
f = 5.57 mm, Fno = 1.85, HFOV = 40.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.674 | | | | |
| 2 | Lens 1 | 1.933 | (ASP) | 0.959 | Plastic | 1.545 | 56.1 | 4.51 |
| 3 | | 7.506 | (ASP) | 0.130 | | | | |
| 4 | Lens 2 | 10.884 | (ASP) | 0.292 | Plastic | 1.671 | 19.3 | −10.81 |
| 5 | | 4.304 | (ASP) | 0.410 | | | | |
| 6 | Lens 3 | 10.068 | (ASP) | 0.382 | Plastic | 1.584 | 28.2 | −89.79 |
| 7 | | 8.329 | (ASP) | 0.304 | | | | |
| 8 | Lens 4 | 7.259 | (ASP) | 0.356 | Plastic | 1.614 | 26.0 | 67.43 |
| 9 | | 8.639 | (ASP) | 0.518 | | | | |
| 10 | Lens 5 | 22.105 | (ASP) | 0.682 | Plastic | 1.544 | 56.0 | 3.60 |
| 11 | | −2.125 | (ASP) | 0.307 | | | | |
| 12 | Lens 6 | −4.845 | (ASP) | 0.467 | Plastic | 1.534 | 55.9 | −2.72 |
| 13 | | 2.142 | (ASP) | 0.000 | | | | |
| 14 | Stop | Plano | | 0.600 | | | | |
| 15 | Filter | Plano | | 0.210 | Glass | 1.517 | 64.2 | — |
| 16 | | Plano | | 0.577 | | | | |
| 17 | Image | Plano | | — | | | | |

Note:
Reference wavelength is 587.6 nm (d-line).
An effective radius of the stop 801 (Surface 14) is 4.06 mm.

TABLE 16

Aspheric Coefficients

| Surface # | 2 | 3 | 4 | 5 | 6 | 7 |
|---|---|---|---|---|---|---|
| k = | −1.2144E−01 | 1.4988E+01 | 4.1079E+01 | 8.1569E+00 | −6.9300E+01 | 2.8218E+01 |
| A4 = | 3.1039E−03 | −5.4785E−02 | −8.6476E−02 | −5.1698E−02 | −7.2808E−02 | −1.0461E−01 |
| A6 = | −7.3393E−03 | 3.7492E−02 | 1.0885E−01 | 6.8429E−02 | 4.6954E−02 | 5.7030E−02 |
| A8 = | 1.5449E−02 | −1.7757E−02 | −6.7129E−02 | −1.4711E−02 | −5.8242E−02 | −3.7120E−02 |
| A10 = | −1.4499E−02 | 4.0917E−03 | 2.6973E−02 | −1.2070E−02 | 3.7306E−02 | −1.1595E−02 |
| A12 = | 6.5029E−03 | −6.6789E−04 | −6.6833E−03 | 7.6807E−03 | −1.4307E−02 | 2.7537E−02 |
| A14 = | −1.2028E−03 | — | 9.1229E−04 | — | 1.7886E−03 | −1.5306E−02 |
| A16 = | — | — | — | — | — | 2.9200E−03 |

| Surface # | 8 | 9 | 10 | 11 | 12 | 13 |
|---|---|---|---|---|---|---|
| k = | −9.3810E+00 | −1.3265E+00 | 4.5693E+01 | −5.9828E+00 | −3.2097E+00 | −1.3706E+01 |
| A4 = | −1.2813E−01 | −1.1365E−01 | 3.8270E−03 | 3.0113E−02 | −1.0563E−01 | −7.2134E−02 |
| A6 = | 6.9861E−02 | 4.3143E−02 | −3.4139E−02 | −4.3573E−02 | 3.9422E−02 | 3.0790E−02 |
| A8 = | −5.0606E−02 | −2.3931E−02 | 1.6044E−02 | 2.5978E−02 | −4.6536E−03 | −9.1266E−03 |
| A10 = | 2.7736E−02 | 1.2949E−02 | −5.6726E−03 | −9.2633E−03 | −2.8931E−04 | 1.7961E−03 |
| A12 = | −9.2557E−03 | −3.6019E−03 | 1.4436E−03 | 2.1903E−03 | 1.5537E−04 | −2.3645E−04 |
| A14 = | 1.0535E−03 | 4.5951E−04 | −2.0165E−04 | −3.4195E−04 | −2.0782E−05 | 2.0232E−05 |
| A16 = | 5.0355E−05 | −2.1368E−05 | 1.1268E−05 | 3.3171E−05 | 1.4342E−06 | −1.0576E−06 |
| A18 = | — | — | 2.0540E−07 | −1.7766E−06 | −5.2181E−08 | 3.0234E−08 |
| A20 = | — | — | −3.3169E−08 | 3.9510E−08 | 7.9413E−10 | −3.5861E−10 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 5.57 | (TL)²/(ImgH × EPD) | 2.69 |
| Fno | 1.85 | TL/ImgH | 1.31 |
| HFOV [deg.] | 40.1 | TL/(EPD + ImgH) | 0.80 |
| V3 | 28.2 | ImgH/Fno [mm] | 2.56 |
| V4 | 26.0 | SD/TD | 0.86 |
| V3/N3 | 17.80 | tan(HFOV) | 0.84 |
| V4/N4 | 16.11 | f/EPD | 1.85 |
| V2 + V3 + V4 | 73.5 | Yc31/Yc32 | 0.97 |
| [(V1 − V3) × (V1 − V4)]/[(V3 − V2) × (V4 − V2)] | 14.08 | Yc41/Yc42 | 1.06 |
| (CT2 + CT3 + CT4)/ImgH | 0.22 | Yc61/Yc62 | 2.12 |
| (T23 + T45)/(CT2 + CT3 + CT4) | 0.90 | \|f/R1\| + \|f/R2\| | 3.62 |
| (R9 − R10)/(R9 + R10) | 1.21 | \|f/R3\| + \|f/R4\| | 1.81 |
| \|(R5 − R6)/(R5 + R6)\| + \|(R7 − R8)/(R7 + R8)\| | 0.18 | \|f/R5\| + \|f/R6\| | 1.22 |
| f/f12 | 0.86 | \|f/R7\| + \|f/R8\| | 1.41 |
| f/f3 | −0.06 | \|f/R9\| + \|f/R10\| | 2.87 |
| \|f/f3\| + \|f/f4\| | 0.14 | \|f/R11\| + \|f/R12\| | 3.75 |
| TL/EPD | 2.06 | — | — |

9th Embodiment

Figure 17:
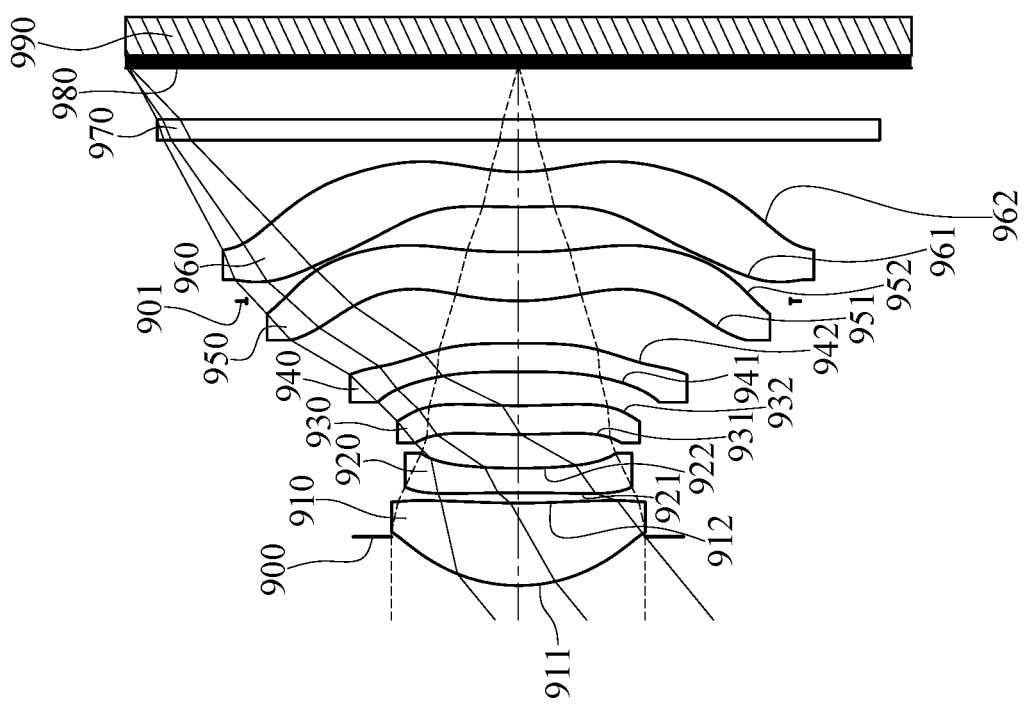
FIG. 17 is a schematic view of an image capturing unit according to the 9th embodiment of the present disclosure.
Figure 18:
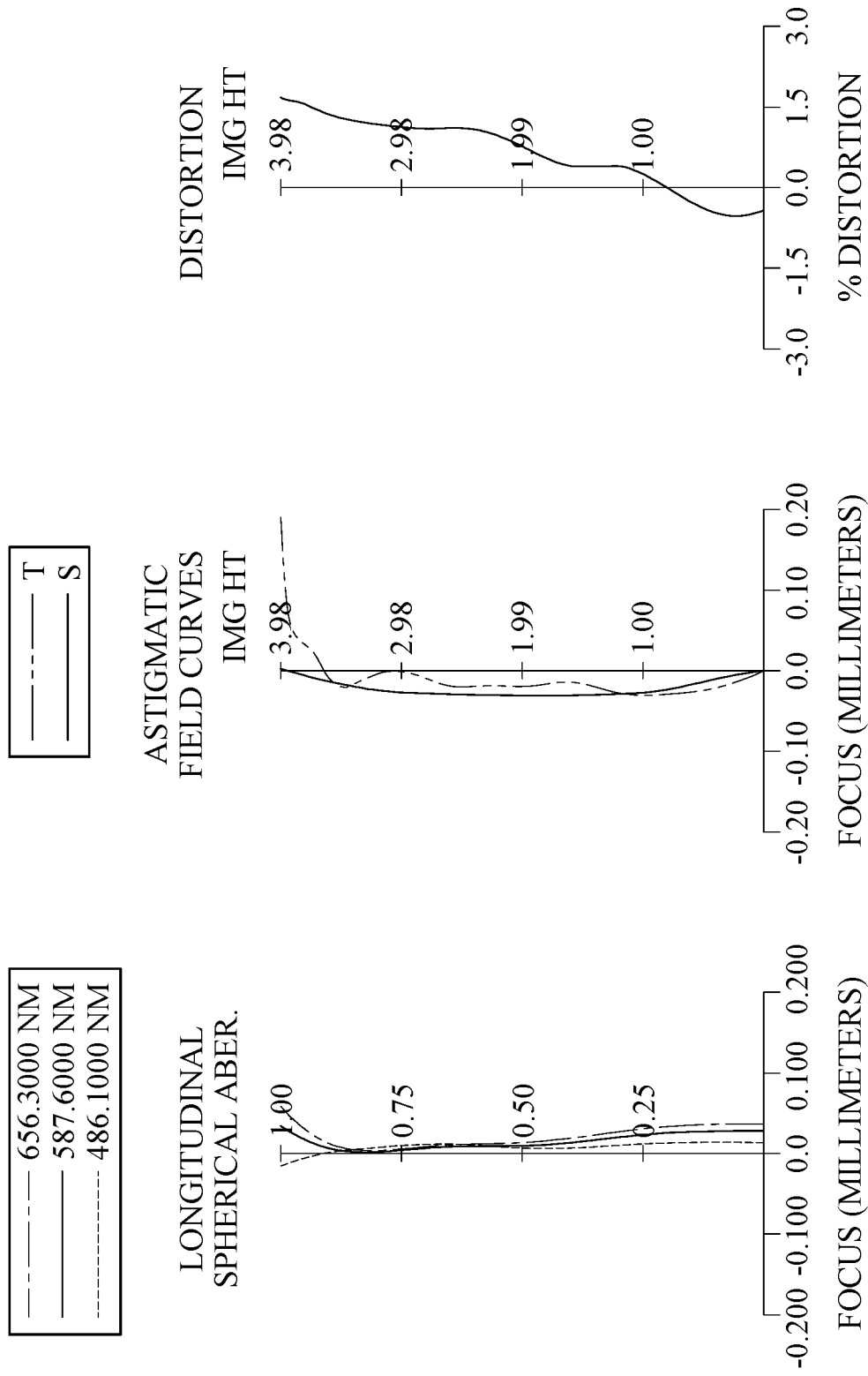
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the imaging lens system (its reference numeral is omitted) of the present disclosure and an image sensor 990. The imaging lens system includes, in order from an object side to an image side, an aperture stop 900, a first lens element 910, a second lens element 920, a third lens element 930, a fourth lens element 940, a fifth lens element 950, a stop 901, a sixth lens element 960, a filter 970 and an image surface 980. The imaging lens system includes six lens elements (910, 920, 930, 940, 950 and 960) with no additional lens element disposed between each of the adjacent six lens elements.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric.

The second lens element 920 with negative refractive power has an object-side surface 921 being concave in a paraxial region thereof and an image-side surface 922 being concave in a paraxial region thereof. The second lens element 920 is made of plastic material and has the object-side surface 921 and the image-side surface 922 being both aspheric.

The third lens element 930 with positive refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric. Each of the object-side surface 931 and the image-side surface 932 of the third lens element 930 has at least one critical point. The image-side surface 932 of the third lens element 930 has at least one convex shape in an off-axis region thereof.

The fourth lens element 940 with negative refractive power has an object-side surface 941 being concave in a paraxial region thereof and an image-side surface 942 being convex in a paraxial region thereof. The fourth lens element 940 is made of plastic material and has the object-side surface 941 and the image-side surface 942 being both aspheric. The image-side surface 942 of the fourth lens element 940 has at least one convex shape in an off-axis region thereof.

The fifth lens element 950 with positive refractive power has an object-side surface 951 being convex in a paraxial region thereof and an image-side surface 952 being concave in a paraxial region thereof. The fifth lens element 950 is made of plastic material and has the object-side surface 951 and the image-side surface 952 being both aspheric. The image-side surface 952 of the fifth lens element 950 has at least one convex shape in an off-axis region thereof.

The sixth lens element 960 with negative refractive power has an object-side surface 961 being convex in a paraxial region thereof and an image-side surface 962 being concave in a paraxial region thereof. The sixth lens element 960 is made of plastic material and has the object-side surface 961 and the image-side surface 962 being both aspheric. Each of the object-side surface 961 and the image-side surface 962 of the sixth lens element 960 has at least one critical point. The image-side surface 962 of the sixth lens element 960 has at least one inflection point. The image-side surface 962 of the sixth lens element 960 has at least one convex shape in an off-axis region thereof. The image-side surface 962 of the sixth lens element 960 has a concave-to-convex shape change and then a convex-to-concave shape change in order from the paraxial region thereof to the off-axis region thereof.

The filter 970 is made of glass material and located between the sixth lens element 960 and the image surface 980, and will not affect the focal length of the imaging lens system. The image sensor 990 is disposed on or near the image surface 980 of the imaging lens system.

In this embodiment, there is one lens element (the fourth lens element 940) satisfying the following condition: |f/Rf|+|f/Rr|<0.80. When a focal length of the imaging lens system is f, a curvature radius of the object-side surface 941 of the fourth lens element 940 is R7, and a curvature radius of the image-side surface 942 of the fourth lens element 940 is R8, the following condition is satisfied: |f/R7|+|f/R8|=0.25.

The detailed optical data of the 9th embodiment are shown in Table 17 and the aspheric surface data are shown in Table 18 below.

TABLE 17

9th Embodiment
f = 4.77 mm, Fno = 1.85, HFOV = 39.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.497 | | | | |
| 2 | Lens 1 | 1.668 (ASP) | 0.839 | Plastic | 1.545 | 56.1 | 3.75 |
| 3 | | 7.494 (ASP) | 0.105 | | | | |
| 4 | Lens 2 | −48.987 (ASP) | 0.250 | Plastic | 1.669 | 19.5 | −8.46 |
| 5 | | 6.414 (ASP) | 0.343 | | | | |
| 6 | Lens 3 | 6.263 (ASP) | 0.293 | Plastic | 1.614 | 26.0 | 357.52 |
| 7 | | 6.332 (ASP) | 0.345 | | | | |
| 8 | Lens 4 | −37.379 (ASP) | 0.290 | Plastic | 1.584 | 28.2 | −1870.67 |
| 9 | | −38.813 (ASP) | 0.432 | | | | |
| 10 | Lens 5 | 2.715 (ASP) | 0.497 | Plastic | 1.534 | 55.9 | 7.06 |
| 11 | | 9.076 (ASP) | −0.500 | | | | |
| 12 | Stop | Plano | 0.958 | | | | |
| 13 | Lens 6 | 7.270 (ASP) | 0.357 | Plastic | 1.544 | 56.0 | −4.51 |
| 14 | | 1.802 (ASP) | 0.324 | | | | |
| 15 | Filter | Plano | 0.210 | Glass | 1.517 | 64.2 | — |
| 16 | | Plano | 0.522 | | | | |
| 17 | Image | Plano | — | | | | |

Note:
Reference wavelength is 587.6 nm (d-line).
An effective radius of the stop 901 (Surface 12) is 2.765 mm.

TABLE 18

Aspheric Coefficients

| Surface # | 2 | 3 | 4 | 5 | 6 | 7 |
|---|---|---|---|---|---|---|
| k = | −4.4812E−01 | −1.1985E+01 | 0.0000E+00 | 1.6218E+01 | 1.3631E+01 | 0.0000E+00 |
| A4 = | 7.0876E−03 | −6.6945E−02 | −8.0385E−02 | −4.1047E−02 | −1.3558E−01 | −1.2477E−01 |
| A6 = | 1.7635E−02 | 5.1063E−02 | 1.9258E−01 | 1.9905E−01 | 1.0920E−02 | 6.5740E−02 |
| A8 = | −2.7383E−02 | −2.8547E−02 | −1.4823E−01 | −1.9571E−01 | −6.5726E−03 | −1.0476E−01 |
| A10 = | 2.2684E−02 | 1.0449E−02 | 6.1367E−02 | 1.6709E−01 | −1.7270E−02 | 8.7754E−02 |
| A12 = | −8.5954E−03 | −3.3957E−03 | −8.3163E−04 | −1.0176E−01 | −1.5769E−02 | −5.8647E−02 |
| A14 = | — | — | −3.4316E−03 | 4.3023E−02 | 1.5352E−02 | 1.8421E−02 |

| Surface # | 8 | 9 | 10 | 11 | 13 | 14 |
|---|---|---|---|---|---|---|
| k = | −9.0000E+01 | 0.0000E+00 | −1.0000E+00 | 1.0140E+01 | −9.0000E+01 | −1.1389E+01 |
| A4 = | −1.3625E−01 | −1.8829E−01 | −1.5013E−02 | 1.0147E−01 | −1.6528E−01 | −7.4670E−02 |
| A6 = | 3.9642E−02 | 9.3424E−02 | −8.8168E−02 | −1.4711E−01 | 3.1371E−04 | −2.9177E−02 |
| A8 = | 7.0178E−02 | −3.8786E−02 | 4.3154E−02 | 6.4701E−02 | 4.6849E−02 | 4.0615E−02 |
| A10 = | −8.9176E−02 | 4.2605E−02 | −4.6367E−03 | −1.0060E−02 | −2.2523E−02 | −1.7762E−02 |
| A12 = | 3.9858E−02 | −2.4922E−02 | −3.5808E−03 | −1.7872E−03 | 5.1829E−03 | 4.2529E−03 |
| A14 = | −6.7309E−03 | 6.1545E−03 | 1.7457E−03 | 1.0707E−03 | −6.7567E−04 | −6.1590E−04 |
| A16 = | — | −5.5172E−04 | −3.4979E−04 | −2.0051E−04 | 5.0640E−05 | 5.3912E−05 |
| A18 = | — | — | 3.4332E−05 | 1.7966E−05 | −2.0146E−06 | −2.6245E−06 |
| A20 = | — | — | −1.3550E−06 | −6.4679E−07 | 3.2330E−08 | 5.4454E−08 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 4.77 | (TL)$^2$/(ImgH × EPD) | 2.70 |
| Fno | 1.85 | TL/ImgH | 1.32 |

-continued

| 9th Embodiment | | | |
|---|---|---|---|
| HFOV [deg.] | 39.3 | TL/(EPD + ImgH) | 0.80 |
| V3 | 26.0 | ImgH/Fno [mm] | 2.15 |
| V4 | 28.2 | SD/TD | 0.88 |
| V3/N3 | 16.11 | tan(HFOV) | 0.82 |
| V4/N4 | 17.80 | f/EPD | 1.85 |
| V2 + V3 + V4 | 73.7 | Yc31/Yc32 | 0.93 |
| [(V1 − V3) × (V1 − V4)]/ [(V3 − V2) × (V4 − V2)] | 14.85 | Yc41/Yc42 | — |
| (CT2 + CT3 + CT4)/ImgH | 0.21 | Yc61/Yc62 | 0.44, 2.71 |
| (T23 + T45)/(CT2 + CT3 + CT4) | 0.93 | \|f/R1\| + \|f/R2\| | 3.50 |
| (R9 − R10)/(R9 + R10) | −0.54 | \|f/R3\| + \|f/R4\| | 0.84 |
| \|(R5 − R6)/(R5 + R6)\| + \|(R7 − R8)/(R7 + R8)\| | 0.02 | \|f/R5\| + \|f/R6\| | 1.52 |

-continued

9th Embodiment

| f/f12 | 0.85 | \|f/R7\| + \|f/R8\| | 0.25 |
|---|---|---|---|
| f/f3 | 0.01 | \|f/R9\| + \|f/R10\| | 2.28 |
| \|f/f3\| + \|f/f4\| | 0.02 | \|f/R11\| + \|f/R12\| | 3.30 |
| TL/EPD | 2.04 | — | — |

10th Embodiment

Figure 19:
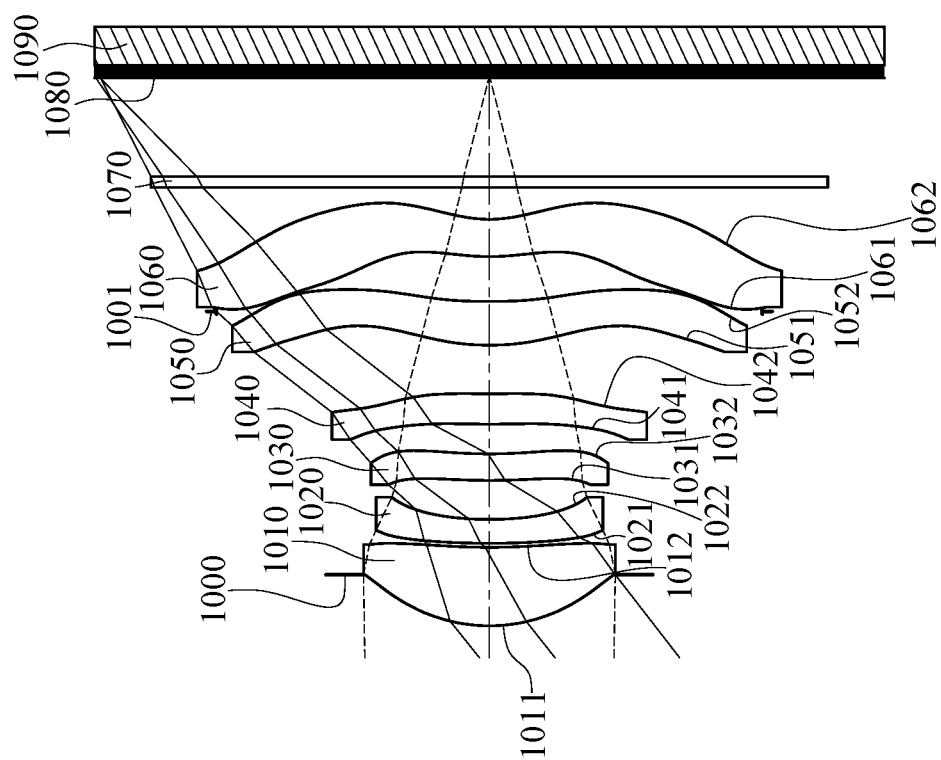
FIG. 19 is a schematic view of an image capturing unit according to the 10th embodiment of the present disclosure.
Figure 20:
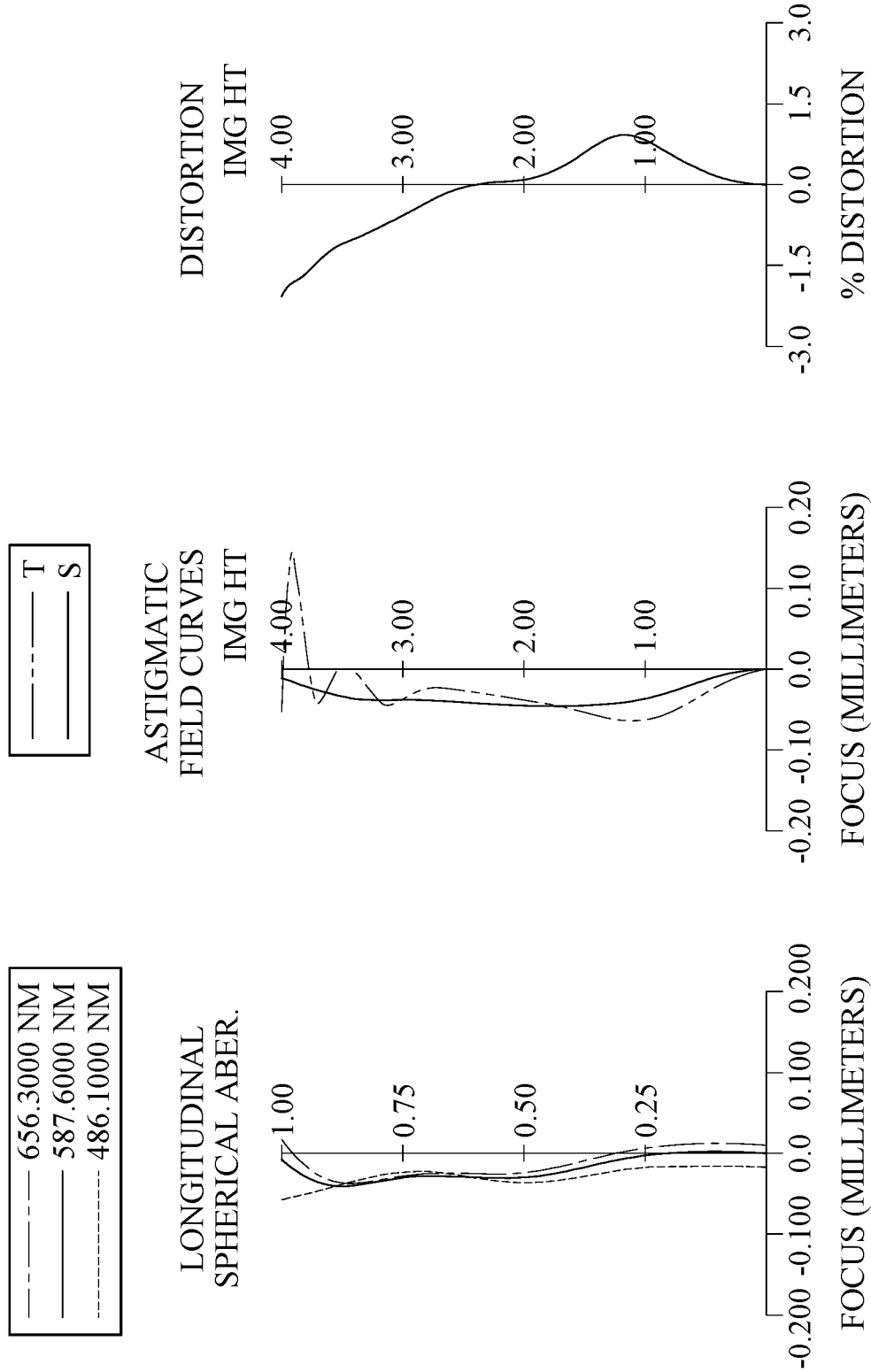
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the imaging lens system (its reference numeral is omitted) of the present disclosure and an image sensor 1090. The imaging lens system includes, in order from an object side to an image side, an aperture stop 1000, a first lens element 1010, a second lens element 1020, a third lens element 1030, a fourth lens element 1040, a fifth lens element 1050, a stop 1001, a sixth lens element 1060, a filter 1070 and an image surface 1080. The imaging lens system includes six lens elements (1010, 1020, 1030, 1040, 1050 and 1060) with no additional lens element disposed between each of the adjacent six lens elements.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric.

The second lens element 1020 with negative refractive power has an object-side surface 1021 being convex in a paraxial region thereof and an image-side surface 1022 being concave in a paraxial region thereof. The second lens element 1020 is made of plastic material and has the object-side surface 1021 and the image-side surface 1022 being both aspheric.

The third lens element 1030 with negative refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric. Each of the object-side surface 1031 and the image-side surface 1032 of the third lens element 1030 has at least one critical point. The image-side surface 1032 of the third lens element 1030 has at least one convex shape in an off-axis region thereof.

The fourth lens element 1040 with positive refractive power has an object-side surface 1041 being convex in a paraxial region thereof and an image-side surface 1042 being concave in a paraxial region thereof. The fourth lens element 1040 is made of plastic material and has the object-side surface 1041 and the image-side surface 1042 being both aspheric. Each of the object-side surface 1041 and the image-side surface 1042 of the fourth lens element 1040 has at least one critical point. The image-side surface 1042 of the fourth lens element 1040 has at least one convex shape in an off-axis region thereof.

The fifth lens element 1050 with positive refractive power has an object-side surface 1051 being convex in a paraxial region thereof and an image-side surface 1052 being concave in a paraxial region thereof. The fifth lens element 1050 is made of plastic material and has the object-side surface 1051 and the image-side surface 1052 being both aspheric. The image-side surface 1052 of the fifth lens element 1050 has at least one convex shape in an off-axis region thereof.

The sixth lens element 1060 with negative refractive power has an object-side surface 1061 being convex in a paraxial region thereof and an image-side surface 1062 being concave in a paraxial region thereof. The sixth lens element 1060 is made of plastic material and has the object-side surface 1061 and the image-side surface 1062 being both aspheric. Each of the object-side surface 1061 and the image-side surface 1062 of the sixth lens element 1060 has at least one critical point. The image-side surface 1062 of the sixth lens element 1060 has at least one inflection point. The image-side surface 1062 of the sixth lens element 1060 has at least one convex shape in an off-axis region thereof. The image-side surface 1062 of the sixth lens element 1060 has a concave-to-convex shape change and then a convex-to-concave shape change in order from the paraxial region thereof to the off-axis region thereof.

The filter 1070 is made of glass material and located between the sixth lens element 1060 and the image surface 1080, and will not affect the focal length of the imaging lens system. The image sensor 1090 is disposed on or near the image surface 1080 of the imaging lens system.

In this embodiment, there is one lens element (the fourth lens element 1040) satisfying the following condition: |f/Rf|+|f/Rr|<0.80. When a focal length of the imaging lens system is f, a curvature radius of the object-side surface 1041 of the fourth lens element 1040 is R7, and a curvature radius of the image-side surface 1042 of the fourth lens element 1040 is R8, the following condition is satisfied: |f/R7|+|f/R8|=0.70.

The detailed optical data of the 10th embodiment are shown in Table 19 and the aspheric surface data are shown in Table 20 below.

TABLE 19

10th embodiment
f = 4.78 mm, Fno = 2.04, HFOV = 38.2 deg.

| Surface # | | Curvature Radius | | Thickness | Material | Index | Abbe # | Focal Length |
|---|---|---|---|---|---|---|---|---|
| 0 | Object | Plano | | 90.000 | | | | |
| 1 | Ape. Stop | Plano | | −0.520 | | | | |
| 2 | Lens 1 | 1.688 | (ASP) | 0.798 | Plastic | 1.545 | 56.1 | 3.97 |
| 3 | | 6.437 | (ASP) | 0.041 | | | | |
| 4 | Lens 2 | 8.113 | (ASP) | 0.243 | Plastic | 1.669 | 19.5 | −9.13 |
| 5 | | 3.442 | (ASP) | 0.397 | | | | |
| 6 | Lens 3 | 5.866 | (ASP) | 0.270 | Plastic | 1.614 | 26.0 | −30.13 |

TABLE 19-continued

10th embodiment
f = 4.78 mm, Fno = 2.04, HFOV = 38.2 deg.

| Surface # | | Curvature Radius | Thickness | Material | Index | Abbe # | Focal Length |
|---|---|---|---|---|---|---|---|
| 7 | | 4.375 (ASP) | 0.303 | | | | |
| 8 | Lens 4 | 10.486 (ASP) | 0.309 | Plastic | 1.584 | 28.2 | 38.76 |
| 9 | | 19.317 (ASP) | 0.494 | | | | |
| 10 | Lens 5 | 2.571 (ASP) | 0.445 | Plastic | 1.534 | 55.9 | 7.71 |
| 11 | | 6.428 (ASP) | −0.100 | | | | |
| 12 | Stop | Plano | 0.557 | | | | |
| 13 | Lens 6 | 2.314 (ASP) | 0.379 | Plastic | 1.544 | 56.0 | −6.19 |
| 14 | | 1.292 (ASP) | 0.324 | | | | |
| 15 | Filter | Plano | 0.110 | Glass | 1.517 | 64.2 | — |
| 16 | | Plano | 1.008 | | | | |
| 17 | Image | Plano | — | | | | |

Note:
Reference wavelength is 587.6 nm (d-line).
An effective radius of the stop 1001 (Surface 12) is 2.775 mm.

TABLE 20

Aspheric Coefficients

| Surface # | 2 | 3 | 4 | 5 | 6 | 7 |
|---|---|---|---|---|---|---|
| k = | −4.7865E−01 | −1.0221E+01 | 0.0000E+00 | 5.6074E+00 | 1.6010E+01 | 0.0000E+00 |
| A4 = | 7.2716E−03 | −2.0041E−02 | 9.1013E−03 | 3.2877E−02 | −1.1116E−01 | −1.3472E−01 |
| A6 = | 1.7581E−02 | −3.8098E−02 | −3.6578E−02 | −2.8582E−02 | 6.3649E−02 | 1.5494E−01 |
| A8 = | −2.5683E−02 | 3.9804E−02 | 8.3124E−02 | 1.2391E−01 | −1.6631E−01 | −2.5624E−01 |
| A10 = | 2.0245E−02 | −1.5238E−02 | −7.3355E−02 | −1.5598E−01 | 1.5379E−01 | 2.1653E−01 |
| A12 = | −7.8171E−03 | 5.5350E−04 | 4.3449E−02 | 9.7535E−02 | −9.7332E−02 | −1.1622E−01 |
| A14 = | — | — | −9.8369E−03 | −1.2008E−02 | 2.6242E−02 | 2.7689E−02 |

| Surface # | 8 | 9 | 10 | 11 | 13 | 14 |
|---|---|---|---|---|---|---|
| k = | −9.0000E+01 | 0.0000E+00 | −1.0000E+00 | 3.7406E+00 | −1.5601E+01 | −4.9242E+00 |
| A4 = | −1.4024E−01 | −1.7891E−01 | 5.7622E−02 | 1.2823E−01 | −1.3065E−01 | −1.3268E−01 |
| A6 = | 3.4354E−02 | 5.3637E−02 | −1.7927E−01 | −2.0023E−01 | −9.1769E−02 | 1.3723E−02 |
| A8 = | 9.5620E−02 | 1.0120E−02 | 1.3858E−01 | 1.2266E−01 | 1.1724E−01 | 1.8133E−02 |
| A10 = | −9.6993E−02 | 1.6723E−02 | −6.5152E−02 | −4.3112E−02 | −4.9421E−02 | −9.3924E−03 |
| A12 = | 3.2148E−02 | −1.8842E−02 | 1.9667E−02 | 9.4469E−03 | 1.1157E−02 | 2.1861E−03 |
| A14 = | −3.3372E−03 | 5.5779E−03 | −3.7360E−03 | −1.3253E−03 | −1.4873E−03 | −2.8997E−04 |
| A16 = | — | −5.2672E−04 | 4.2720E−04 | 1.1629E−04 | 1.1759E−04 | 2.2636E−05 |
| A18 = | — | — | −2.6674E−05 | −5.8018E−06 | −5.1133E−06 | −9.7186E−07 |
| A20 = | — | — | 6.9422E−07 | 1.2464E−07 | 9.4431E−08 | 1.7741E−08 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 4.78 | (TL)²/(ImgH × EPD) | 3.32 |
| Fno | 2.04 | TL/ImgH | 1.39 |
| HFOV [deg.] | 38.2 | TL/(EPD + ImgH) | 0.88 |
| V3 | 26.0 | ImgH/Fno [mm] | 1.96 |
| V4 | 28.2 | SD/TD | 0.87 |
| V3/N3 | 16.11 | tan(HFOV) | 0.79 |
| V4/N4 | 17.80 | f/EPD | 2.04 |
| V2 + V3 + V4 | 73.7 | Yc31/Yc32 | 0.87 |
| [(V1 − V3) × (V1 − V4)]/ [(V3 − V2) × (V4 − V2)] (CT2 + CT3 + CT4)/ImgH | 14.85 0.21 | Yc41/Yc42 Yc61/Yc62 | 1.56 0.64, 2.44 |
| (T23 + T45)/(CT2 + CT3 + CT4) | 1.08 | \|f/R1\| + \|f/R2\| | 3.58 |
| (R9 − R10)/(R9 + R10) | −0.43 | \|f/R3\| + \|f/R4\| | 1.98 |
| \|(R5 − R6)/(R5 + R6)\| + \|(R7 − R8)/(R7 + R8)\| | 0.44 | \|f/R5\| + \|f/R6\| | 1.91 |
| f/f12 | 0.81 | \|f/R7\| + \|f/R8\| | 0.70 |
| f/f3 | −0.16 | \|f/R9\| + \|f/R10\| | 2.61 |
| \|f/f3\| + \|f/f4\| | 0.28 | \|f/R11\| + \|f/R12\| | 5.77 |
| TL/EPD | 2.38 | — | — |

11th Embodiment

Figure 21:
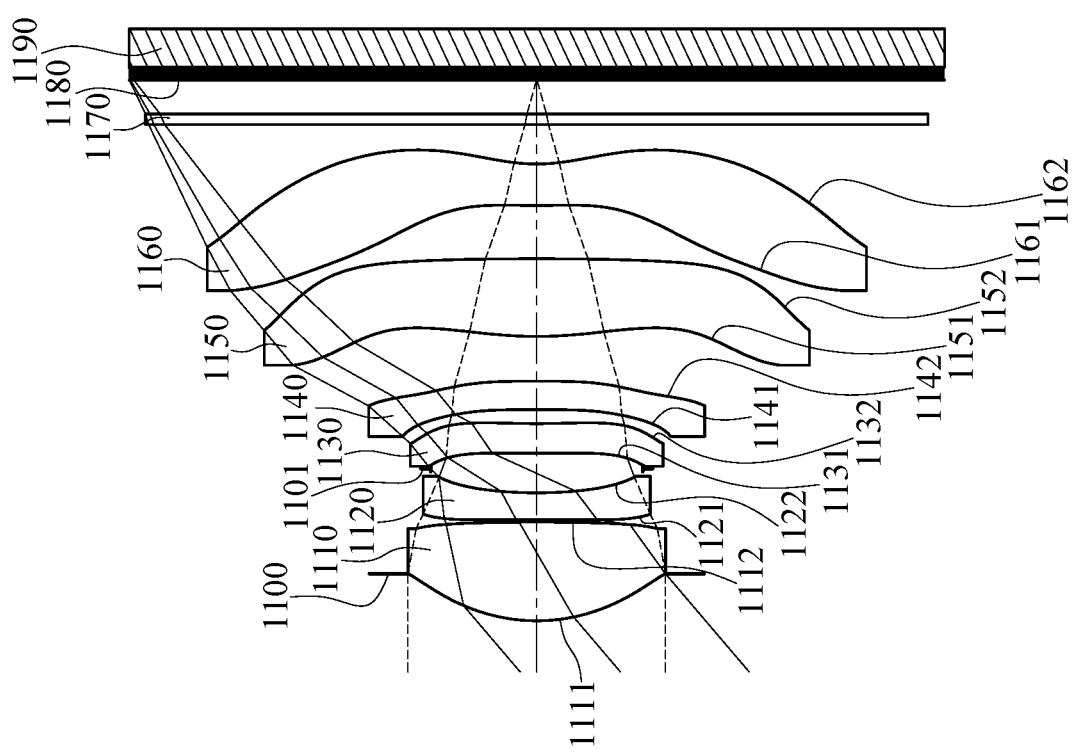
FIG. 21 is a schematic view of an image capturing unit according to the 11th embodiment of the present disclosure.
Figure 22:
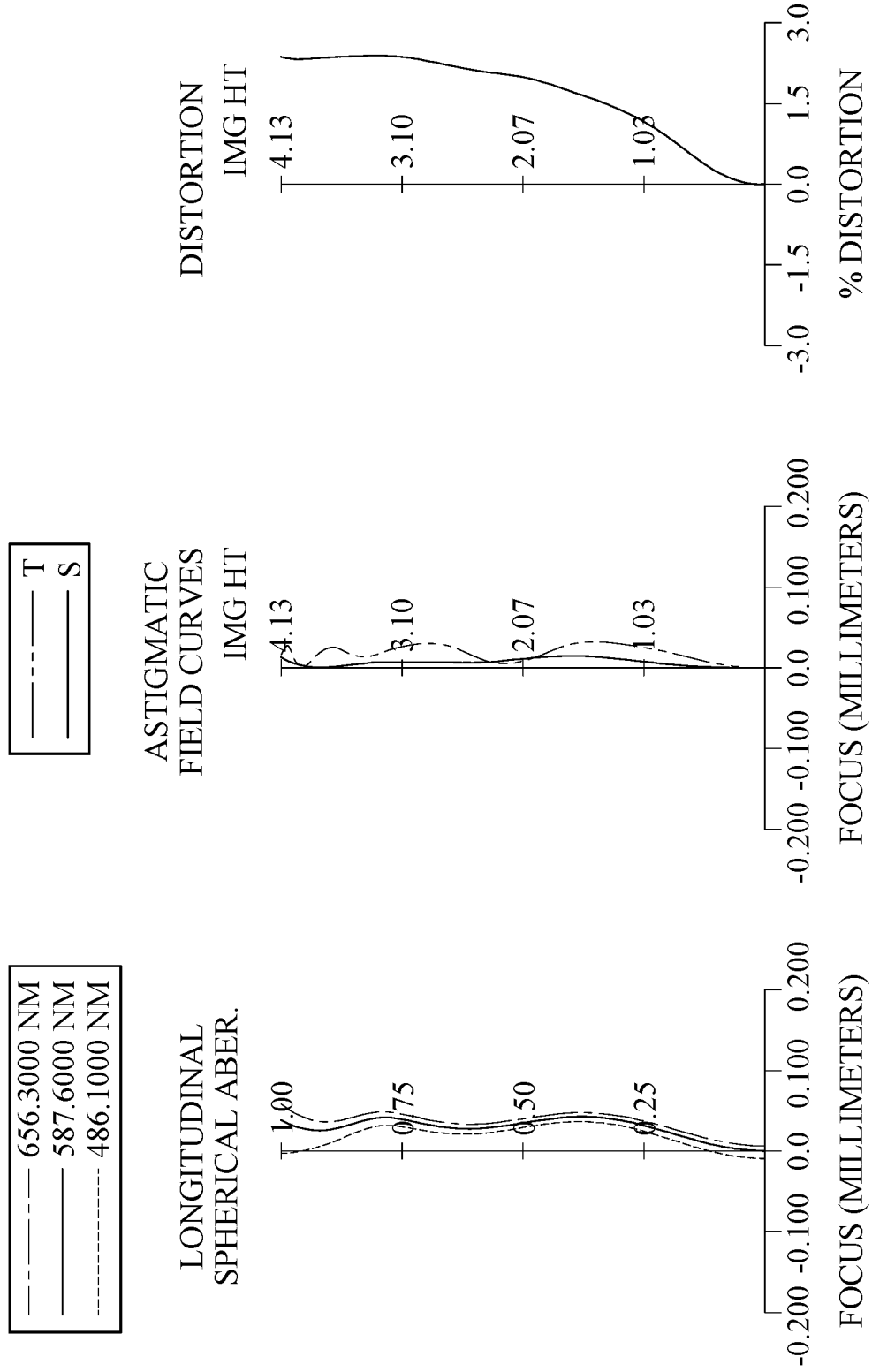
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the imaging lens system (its reference numeral is omitted) of the present disclosure and an image sensor 1190. The imaging lens system includes, in order from an object side to an image side, an aperture stop 1100, a first lens element 1110, a second lens element 1120, a stop 1101, a third lens element 1130, a fourth lens element 1140, a fifth lens element 1150, a sixth lens element 1160, a filter 1170 and an image surface 1180. The imaging lens system includes six lens elements (1110, 1120, 1130, 1140, 1150 and 1160) with no additional lens element disposed between each of the adjacent six lens elements.

The first lens element 1110 with positive refractive power has an object-side surface 1111 being convex in a paraxial region thereof and an image-side surface 1112 being convex in a paraxial region thereof. The first lens element 1110 is made of plastic material and has the object-side surface 1111 and the image-side surface 1112 being both aspheric.

The second lens element 1120 with negative refractive power has an object-side surface 1121 being concave in a paraxial region thereof and an image-side surface 1122 being concave in a paraxial region thereof. The second lens element 1120 is made of plastic material and has the object-side surface 1121 and the image-side surface 1122 being both aspheric.

The third lens element 1130 with negative refractive power has an object-side surface 1131 being convex in a paraxial region thereof and an image-side surface 1132 being concave in a paraxial region thereof. The third lens element 1130 is made of plastic material and has the object-side surface 1131 and the image-side surface 1132 being both aspheric. Each of the object-side surface 1131 and the image-side surface 1132 of the third lens element 1130 has at least one critical point. The image-side surface 1132 of the third lens element 1130 has at least one convex shape in an off-axis region thereof.

The fourth lens element 1140 with positive refractive power has an object-side surface 1141 being convex in a paraxial region thereof and an image-side surface 1142 being convex in a paraxial region thereof. The fourth lens element 1140 is made of plastic material and has the object-side surface 1141 and the image-side surface 1142 being both aspheric. The image-side surface 1142 of the fourth lens element 1140 has at least one convex shape in an off-axis region thereof.

The fifth lens element 1150 with positive refractive power has an object-side surface 1151 being convex in a paraxial region thereof and an image-side surface 1152 being convex in a paraxial region thereof. The fifth lens element 1150 is made of plastic material and has the object-side surface 1151 and the image-side surface 1152 being both aspheric.

The sixth lens element 1160 with negative refractive power has an object-side surface 1161 being convex in a paraxial region thereof and an image-side surface 1162 being concave in a paraxial region thereof. The sixth lens element 1160 is made of plastic material and has the object-side surface 1161 and the image-side surface 1162 being both aspheric. Each of the object-side surface 1161 and the image-side surface 1162 of the sixth lens element 1160 has at least one critical point. The image-side surface 1162 of the sixth lens element 1160 has at least one inflection point. The image-side surface 1162 of the sixth lens element 1160 has at least one convex shape in an off-axis region thereof. The image-side surface 1162 of the sixth lens element 1160 has a concave-to-convex shape change and then a convex-to-concave shape change in order from the paraxial region thereof to the off-axis region thereof.

The filter 1170 is made of glass material and located between the sixth lens element 1160 and the image surface 1180, and will not affect the focal length of the imaging lens system. The image sensor 1190 is disposed on or near the image surface 1180 of the imaging lens system.

In this embodiment, there is one lens element (the fourth lens element 1140) satisfying the following condition: |f/Rf|+|f/Rr|<0.80. When a focal length of the imaging lens system is f, a curvature radius of the object-side surface 1141 of the fourth lens element 1140 is R7, and a curvature radius of the image-side surface 1142 of the fourth lens element 1140 is R8, the following condition is satisfied: |f/R7|+|f/R8|=0.12.

The detailed optical data of the 11th embodiment are shown in Table 21 and the aspheric surface data are shown in Table 22 below.

TABLE 21

11th embodiment
f = 4.71 mm, Fno = 1.80, HFOV = 40.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.478 | | | | |
| 2 | Lens 1 | 1.839 | (ASP) | 1.004 | Plastic | 1.545 | 56.1 | 3.24 |
| 3 | | −35.472 | (ASP) | 0.027 | | | | |
| 4 | Lens 2 | −41.646 | (ASP) | 0.271 | Plastic | 1.639 | 23.5 | −6.33 |
| 5 | | 4.486 | (ASP) | 0.246 | | | | |
| 6 | Stop | Plano | | 0.156 | | | | |
| 7 | Lens 3 | 14.636 | (ASP) | 0.302 | Plastic | 1.614 | 26.0 | −25.05 |
| 8 | | 7.439 | (ASP) | 0.141 | | | | |
| 9 | Lens 4 | 53.229 | (ASP) | 0.290 | Plastic | 1.614 | 26.0 | 63.22 |
| 10 | | −142.888 | (ASP) | 0.456 | | | | |
| 11 | Lens 5 | 3.945 | (ASP) | 0.791 | Plastic | 1.544 | 56.0 | 6.50 |
| 12 | | −31.488 | (ASP) | 0.542 | | | | |
| 13 | Lens 6 | 10.195 | (ASP) | 0.422 | Plastic | 1.534 | 55.9 | −4.02 |
| 14 | | 1.748 | (ASP) | 0.400 | | | | |
| 15 | Filter | Plano | | 0.110 | Glass | 1.517 | 64.2 | — |
| 16 | | Plano | | 0.345 | | | | |
| 17 | Image | Plano | | — | | | | |

Note:
Reference wavelength is 587.6 nm (d-line).
An effective radius of the stop 1101 (Surface 6) is 1.078 mm.

TABLE 22

Aspheric Coefficients

| Surface # | 2 | 3 | 4 | 5 | 7 | 8 |
|---|---|---|---|---|---|---|
| k = | −5.6720E−01 | 0.0000E+00 | −3.5249E+01 | 1.5839E+00 | 8.9755E+01 | 7.0665E+00 |
| A4 = | 4.0548E−03 | −6.4204E−02 | −5.2934E−02 | −1.4876E−03 | −1.3209E−01 | −1.6191E−01 |
| A6 = | 1.0975E−02 | 1.4896E−01 | 2.1698E−01 | 1.0175E−01 | 1.5192E−01 | 1.3457E−01 |
| A8 = | −1.3102E−02 | −1.6346E−01 | −2.4459E−01 | −1.3289E−01 | −3.5811E−01 | −1.4354E−01 |
| A10 = | 5.9578E−03 | 7.8695E−02 | 1.4154E−01 | 1.3448E−01 | 4.2367E−01 | 7.2746E−02 |
| A12 = | −1.4884E−03 | −1.5164E−02 | −3.2958E−02 | −7.9830E−02 | −2.8656E−01 | −3.0590E−02 |
| A14 = | −4.3933E−04 | — | 1.5209E−03 | 2.6795E−02 | 8.2130E−02 | 9.1602E−03 |

| Surface # | 9 | 10 | 11 | 12 | 13 | 14 |
|---|---|---|---|---|---|---|
| k = | −8.4326E+01 | −5.2622E−01 | −5.6505E−01 | −6.7292E+01 | −3.8190E+01 | −7.4351E+00 |
| A4 = | −1.8305E−01 | −1.6717E−01 | −5.2754E−02 | 1.4432E−02 | −2.1536E−01 | −1.0535E−01 |
| A6 = | 7.7896E−02 | 9.3023E−02 | −3.6336E−03 | −2.9206E−02 | 9.2696E−02 | 4.1714E−02 |
| A8 = | 1.1546E−01 | −1.9846E−02 | 1.6055E−02 | 2.5081E−02 | −2.0495E−02 | −1.0883E−02 |
| A10 = | −1.8500E−01 | 1.9769E−02 | −1.2165E−02 | −1.2267E−02 | 3.1264E−03 | 1.8367E−03 |
| A12 = | 9.8628E−02 | −1.7275E−02 | 4.2961E−03 | 3.5599E−03 | −4.5503E−04 | −2.0166E−04 |
| A14 = | −1.9535E−02 | 5.5711E−03 | −8.0033E−04 | −6.3406E−04 | 6.3870E−05 | 1.4476E−05 |
| A16 = | — | −6.1707E−04 | 7.9762E−05 | 6.7865E−05 | −6.3355E−06 | −6.8751E−07 |
| A18 = | — | — | −3.8281E−06 | −3.9931E−06 | 3.4978E−07 | 2.1496E−08 |
| A20 = | — | — | 5.9460E−08 | 9.9164E−08 | −7.9934E−09 | −3.5802E−10 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 4.71 | $(TL)^2/(ImgH \times EPD)$ | 2.80 |
| Fno | 1.80 | TL/ImgH | 1.33 |
| HFOV [deg.] | 40.4 | TL/(EPD + ImgH) | 0.82 |
| V3 | 26.0 | ImgH/Fno [mm] | 2.29 |
| V4 | 26.0 | SD/TD | 0.90 |
| V3/N3 | 16.11 | tan(HFOV) | 0.85 |
| V4/N4 | 16.11 | f/EPD | 1.80 |
| V2 + V3 + V4 | 75.5 | Yc31/Yc32 | 0.77 |
| [(V1 − V3) × (V1 − V4)]/[(V3 − V2) × (V4 − V2)] | 144.96 | Yc41/Yc42 | — |
| (CT2 + CT3 + CT4)/ImgH | 0.21 | Yc61/Yc62 | 0.29 |
| (T23 + T45)/(CT2 + CT3 + CT4) | 0.99 | \|f/R1\| + \|f/R2\| | 2.69 |
| (R9 − R10)/(R9 + R10) | −1.29 | \|f/R3\| + \|f/R4\| | 1.16 |
| \|(R5 − R6)/(R5 + R6)\| + \|(R7 − R8)/(R7 + R8)\| | 2.51 | \|f/R5\| + \|f/R6\| | 0.96 |
| f/f12 | 0.89 | \|f/R7\| + \|f/R8\| | 0.12 |
| f/f3 | −0.19 | \|f/R9\| + \|f/R10\| | 1.34 |
| \|f/f3\| + \|f/f4\| | 0.26 | \|f/R11\| + \|f/R12\| | 3.16 |
| TL/EPD | 2.10 | — | — |

12th Embodiment

Figure 23:
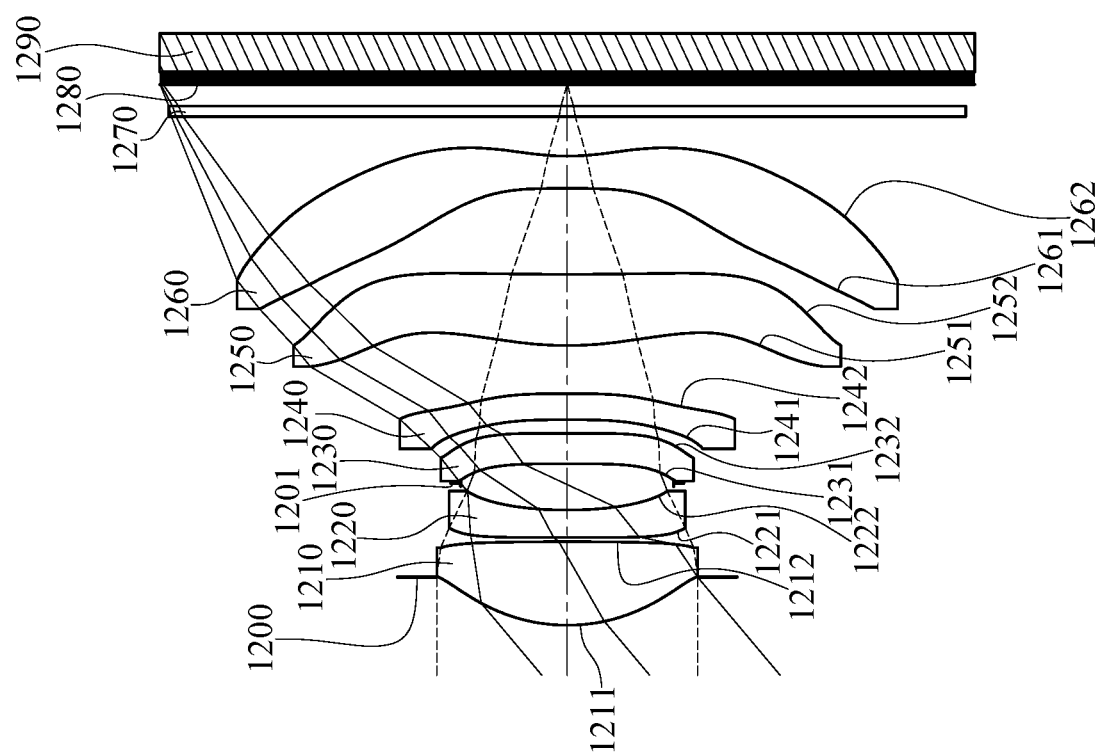
FIG. 23 is a schematic view of an image capturing unit according to the 12th embodiment of the present disclosure.
Figure 24:
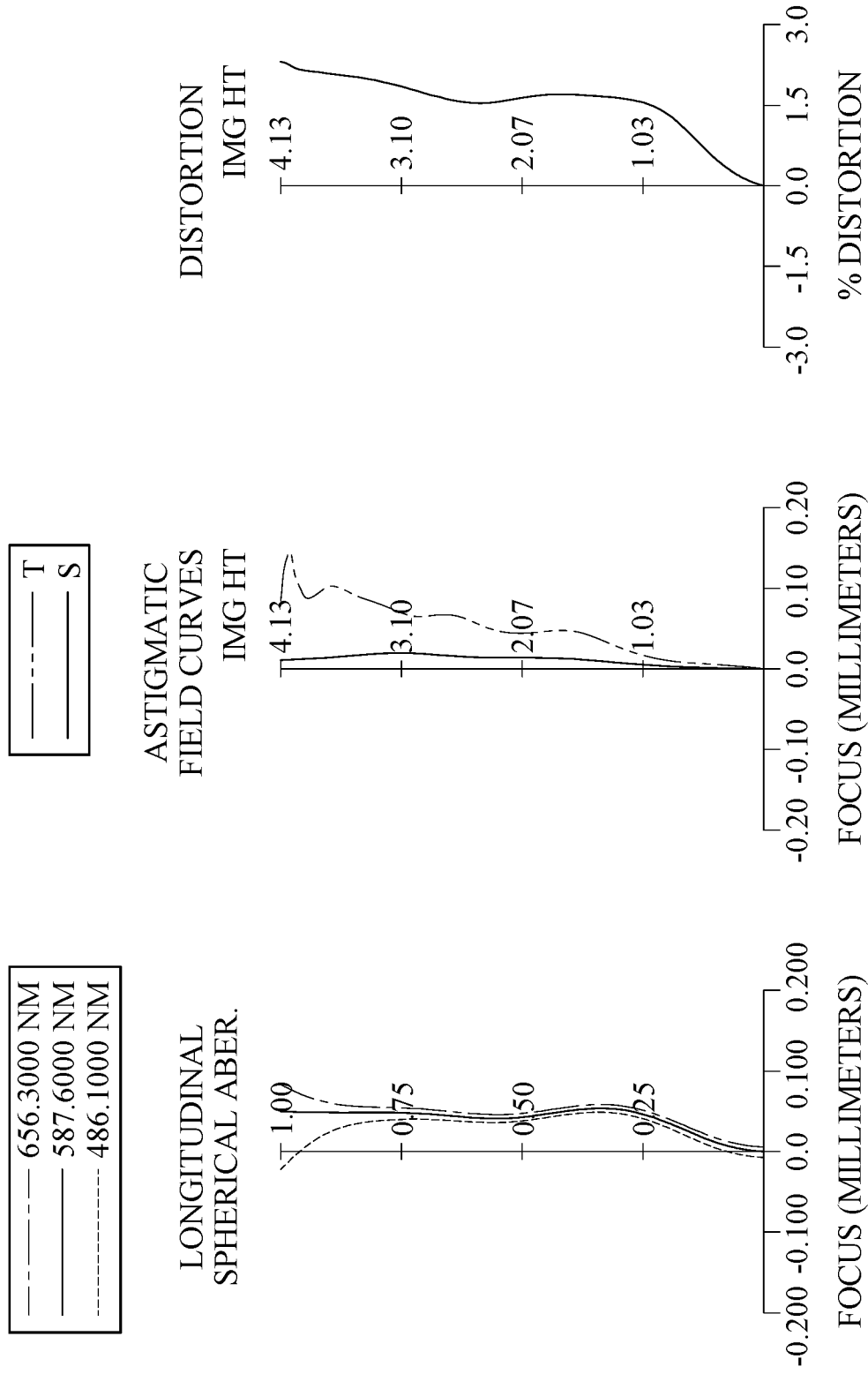
FIG. 24 shows spherical aberration curves, astigmatic field curves and a distortion curve of the image capturing unit according to the 12th embodiment.

FIG. 23 is a schematic view of an image capturing unit according to the 12th embodiment of the present disclosure. FIG. 24 shows, in order from left to right, spherical aberration curves, astigmatic field curves and a distortion curve of the image capturing unit according to the 12th embodiment. In FIG. 23, the image capturing unit includes the imaging lens system (its reference numeral is omitted) of the present disclosure and an image sensor 1290. The imaging lens system includes, in order from an object side to an image side, an aperture stop 1200, a first lens element 1210, a second lens element 1220, a stop 1201, a third lens element 1230, a fourth lens element 1240, a fifth lens element 1250, a sixth lens element 1260, a filter 1270 and an image surface 1280. The imaging lens system includes six lens elements (1210, 1220, 1230, 1240, 1250 and 1260) with no additional lens element disposed between each of the adjacent six lens elements. The first lens element 1210 with positive refractive power has an object-side surface 1211 being convex in a paraxial region thereof and an image-side surface 1212 being convex in a paraxial region thereof. The first lens element 1210 is made of plastic material and has the object-side surface 1211 and the image-side surface 1212 being both aspheric.

The second lens element 1220 with negative refractive power has an object-side surface 1221 being concave in a paraxial region thereof and an image-side surface 1222 being concave in a paraxial region thereof. The second lens element 1220 is made of plastic material and has the object-side surface 1221 and the image-side surface 1222 being both aspheric.

The third lens element 1230 with negative refractive power has an object-side surface 1231 being concave in a paraxial region thereof and an image-side surface 1232 being concave in a paraxial region thereof. The third lens element 1230 is made of plastic material and has the object-side surface 1231 and the image-side surface 1232 being both aspheric. The image-side surface 1232 of the third lens element 1230 has at least one convex shape in an off-axis region thereof.

The fourth lens element 1240 with positive refractive power has an object-side surface 1241 being concave in a paraxial region thereof and an image-side surface 1242 being convex in a paraxial region thereof. The fourth lens element 1240 is made of plastic material and has the object-side surface 1241 and the image-side surface 1242 being both aspheric. The image-side surface 1242 of the fourth lens element 1240 has at least one convex shape in an off-axis region thereof.

The fifth lens element 1250 with positive refractive power has an object-side surface 1251 being convex in a paraxial region thereof and an image-side surface 1252 being concave in a paraxial region thereof. The fifth lens element 1250 is made of plastic material and has the object-side surface 1251 and the image-side surface 1252 being both aspheric. The image-side surface 1252 of the fifth lens element 1250 has at least one convex shape in an off-axis region thereof.

The sixth lens element 1260 with negative refractive power has an object-side surface 1261 being concave in a paraxial region thereof and an image-side surface 1262 being concave in a paraxial region thereof. The sixth lens element 1260 is made of plastic material and has the object-side surface 1261 and the image-side surface 1262 being both aspheric. The image-side surface 1262 of the sixth lens element 1260 has at least one inflection point. The image-side surface 1262 of the sixth lens element 1260 has at least one convex shape in an off-axis region thereof.

The filter 1270 is made of glass material and located between the sixth lens element 1260 and the image surface 1280, and will not affect the focal length of the imaging lens system. The image sensor 1290 is disposed on or near the image surface 1280 of the imaging lens system.

In this embodiment, there are two lens elements (the third lens element 1230 and the fourth lens element 1240) satisfying the following condition: $|f/Rf|+|f/Rr|<0.80$. When a focal length of the imaging lens system is f, a curvature radius of the object-side surface 1231 of the third lens element 1230 is R5, and a curvature radius of the image-side surface 1232 of the third lens element 1230 is R6, the following condition is satisfied: $|f/R5|+|f/R6|=0.30$. When a curvature radius of the object-side surface 1241 of the fourth lens element 1240 is R7, and a curvature radius of the image-side surface 1242 of the fourth lens element 1240 is R8, the following condition is satisfied: $|f/R7|+|f/R8|=0.30$.

The detailed optical data of the 12th embodiment are shown in Table 23 and the aspheric surface data are shown in Table 24 below.

TABLE 23

12th embodiment
f = 4.77 mm, Fno = 1.80, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.490 | | | | |
| 2 | Lens 1 | 1.783 | (ASP) | 0.850 | Plastic | 1.545 | 56.1 | 3.21 |
| 3 | | −81.301 | (ASP) | 0.045 | | | | |
| 4 | Lens 2 | −216.282 | (ASP) | 0.277 | Plastic | 1.634 | 23.8 | −6.24 |
| 5 | | 4.032 | (ASP) | 0.274 | | | | |
| 6 | Stop | Plano | | 0.197 | | | | |
| 7 | Lens 3 | −175.009 | (ASP) | 0.308 | Plastic | 1.614 | 26.0 | −26.12 |
| 8 | | 17.662 | (ASP) | 0.140 | | | | |
| 9 | Lens 4 | −32.315 | (ASP) | 0.266 | Plastic | 1.614 | 26.0 | 3802.67 |
| 10 | | −31.974 | (ASP) | 0.489 | | | | |
| 11 | Lens 5 | 3.368 | (ASP) | 0.725 | Plastic | 1.544 | 56.0 | 6.63 |
| 12 | | 46.729 | (ASP) | 0.874 | | | | |
| 13 | Lens 6 | −72.591 | (ASP) | 0.329 | Plastic | 1.534 | 55.9 | −4.21 |
| 14 | | 2.323 | (ASP) | 0.400 | | | | |
| 15 | Filter | Plano | | 0.110 | Glass | 1.517 | 64.2 | — |
| 16 | | Plano | | 0.218 | | | | |
| 17 | Image | Plano | | — | | | | |

Note:
Reference wavelength is 587.6 nm (d-line).
An effective radius of the stop 1201 (Surface 6) is 1.082 mm.

TABLE 24

| Aspheric Coefficients | | | | | | |
|---|---|---|---|---|---|---|
| Surface # | 2 | 3 | 4 | 5 | 7 | 8 |
| k = | −5.7200E−01 | 0.0000E+00 | −9.0000E+01 | 2.1946E+00 | −9.0000E+01 | 3.6719E+01 |
| A4 = | −2.2277E−03 | −4.2233E−02 | −3.3186E−02 | 5.4964E−03 | −1.1552E−01 | −1.5781E−01 |
| A6 = | 4.5624E−02 | 9.9230E−02 | 1.5863E−01 | 8.6440E−02 | 1.1191E−01 | 1.5262E−01 |
| A8 = | −7.9765E−02 | −1.1118E−01 | −1.7890E−01 | −1.3581E−01 | −2.5728E−01 | −1.9066E−01 |
| A10 = | 7.3424E−02 | 5.2867E−02 | 1.0517E−01 | 1.8274E−01 | 2.8357E−01 | 1.3822E−01 |
| A12 = | −3.5312E−02 | −1.0092E−02 | −2.3976E−02 | −1.3958E−01 | −1.8982E−01 | −7.2168E−02 |
| A14 = | 5.8012E−03 | — | 1.9573E−03 | 5.1088E−02 | 5.4721E−02 | 1.8776E−02 |

| Surface # | 9 | 10 | 11 | 12 | 13 | 14 |
|---|---|---|---|---|---|---|
| k = | −9.0000E+01 | −9.0000E+01 | −1.0721E+00 | −9.0000E+01 | −7.5488E+01 | −7.7589E+00 |
| A4 = | −1.7623E−01 | −1.5747E−01 | −4.9186E−02 | 9.3449E−03 | −2.1728E−01 | −1.2733E−01 |
| A6 = | 7.0395E−02 | 7.7180E−02 | −2.1796E−02 | −2.1028E−02 | 1.0806E−01 | 5.1633E−02 |
| A8 = | 1.1988E−01 | 6.3107E−03 | 1.4518E−02 | 1.7598E−02 | −3.2845E−02 | −1.3603E−02 |
| A10 = | −1.7285E−01 | −5.4837E−03 | −1.1557E−02 | −8.9542E−03 | 7.9491E−03 | 2.2732E−03 |
| A12 = | 8.5345E−02 | −4.5499E−03 | 4.3199E−03 | 2.7095E−03 | −1.5181E−03 | −2.2810E−04 |
| A14 = | −1.5784E−02 | 2.4431E−03 | −8.8816E−04 | −5.0317E−04 | 2.0136E−04 | 1.2559E−05 |
| A16 = | — | −3.2079E−04 | 1.0457E−04 | 5.6079E−05 | −1.6612E−05 | −3.2407E−07 |
| A18 = | — | — | −6.6679E−06 | −3.4250E−06 | 7.5638E−07 | 4.0663E−09 |
| A20 = | — | — | 1.7955E−07 | 8.7985E−08 | −1.4471E−08 | −1.2304E−10 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 4.77 | (TL)$^2$/(ImgH × EPD) | 2.76 |
| Fno | 1.80 | TL/ImgH | 1.33 |
| HFOV [deg.] | 40.0 | TL/(EPD + ImgH) | 0.81 |
| V3 | 26.0 | ImgH/Fno [mm] | 2.29 |
| V4 | 26.0 | SD/TD | 0.90 |
| V3/N3 | 16.11 | tan(HFOV) | 0.84 |
| V4/N4 | 16.11 | f/EPD | 1.80 |
| V2 + V3 + V4 | 75.8 | Yc31/Yc32 | — |
| [(V1 − V3) × (V1 − V4)]/[(V3 − V2) × (V4 − V2)] | 187.19 | Yc41/Yc42 | — |
| (CT2 + CT3 + CT4)/ImgH | 0.21 | Yc61/Yc62 | — |
| (T23 + T45)/(CT2 + CT3 + CT4) | 1.13 | \|f/R1\| + \|f/R2\| | 2.74 |
| (R9 − R10)/(R9 + R10) | −0.87 | \|f/R3\| + \|f/R4\| | 1.21 |
| \|(R5 − R6)/(R5 + R6)\| + \|(R7 − R8)/(R7 + R8)\| | 1.23 | \|f/R5\| + \|f/R6\| | 0.30 |
| f/f12 | 0.90 | \|f/R7\| + \|f/R8\| | 0.30 |
| f/f3 | −0.18 | \|f/R9\| + \|f/R10\| | 1.52 |
| \|f/f3\| + \|f/f4\| | 0.18 | \|f/R11\| + \|f/R12\| | 2.12 |
| TL/EPD | 2.07 | — | — |

13th Embodiment

Figure 25:
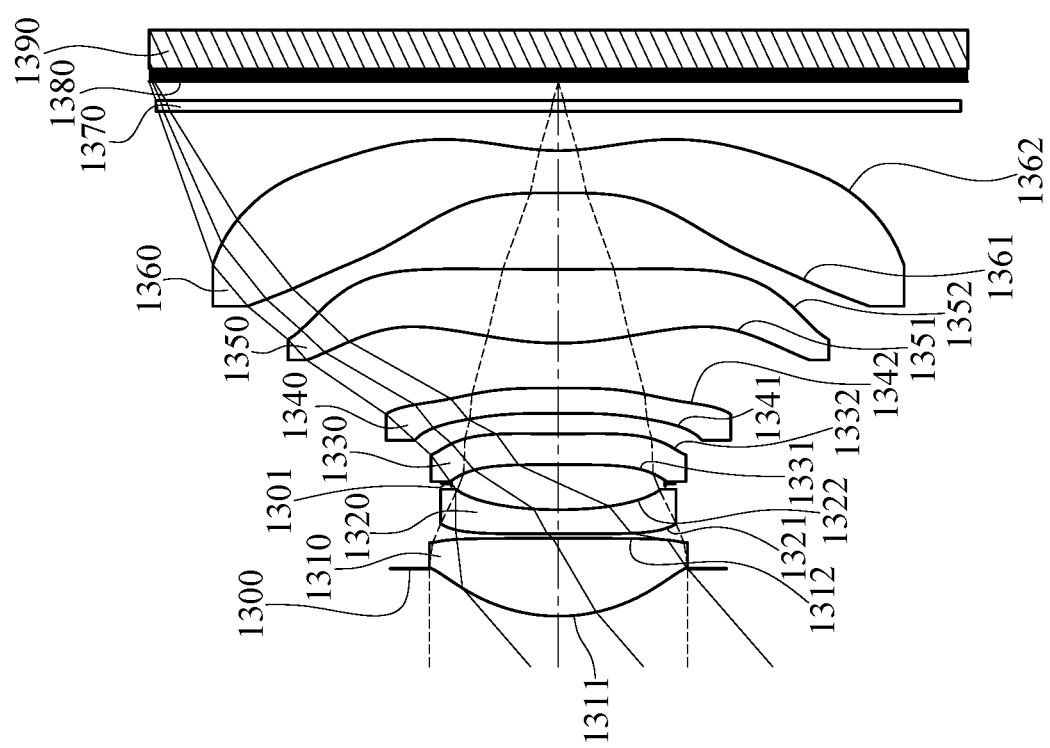
FIG. 25 is a schematic view of an image capturing unit according to the 13th embodiment of the present disclosure.
Figure 26:
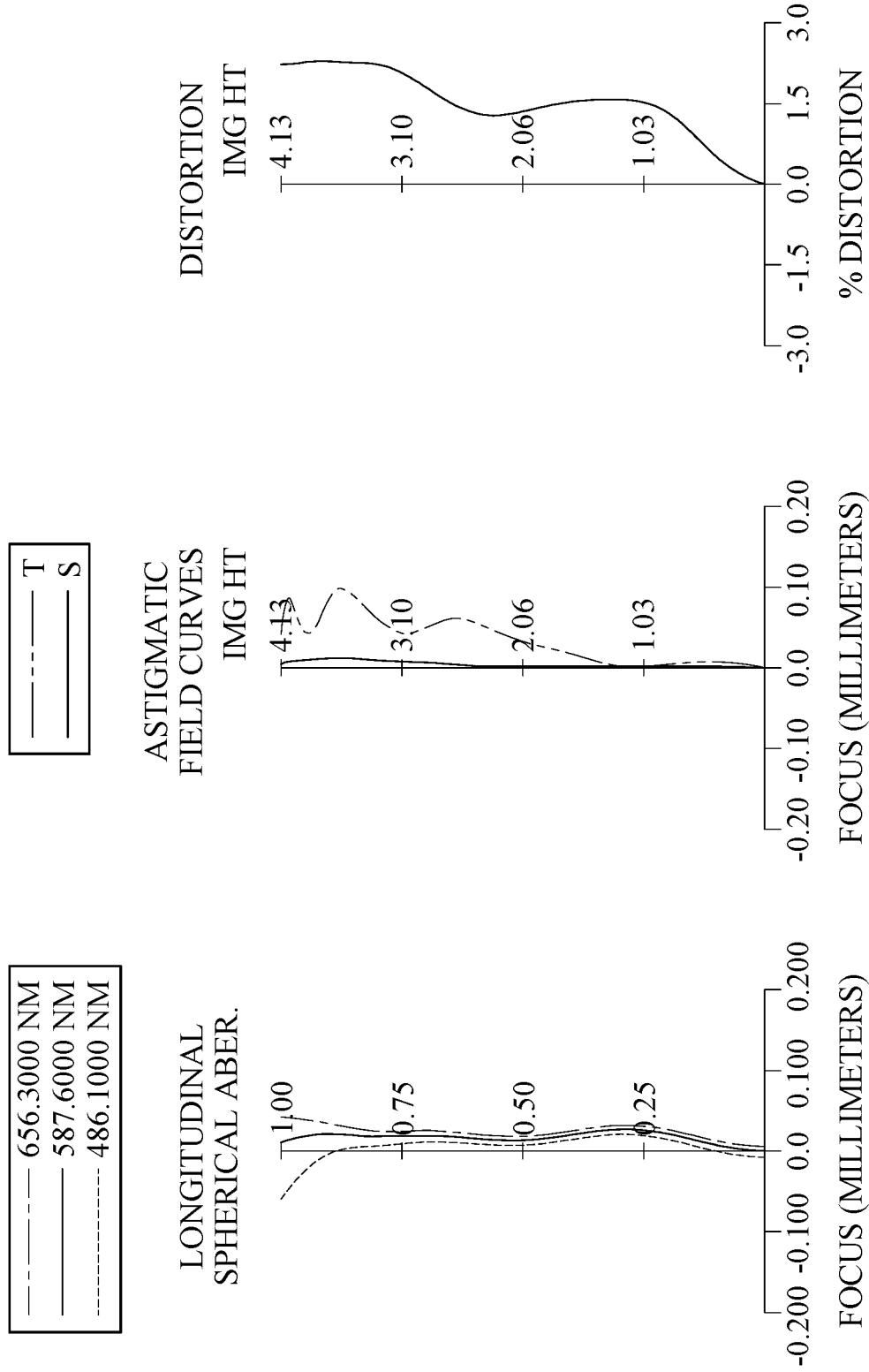
FIG. 26 shows spherical aberration curves, astigmatic field curves and a distortion curve of the image capturing unit according to the 13th embodiment.

FIG. 25 is a schematic view of an image capturing unit according to the 13th embodiment of the present disclosure. FIG. 26 shows, in order from left to right, spherical aberration curves, astigmatic field curves and a distortion curve of the image capturing unit according to the 13th embodiment. In FIG. 25, the image capturing unit includes the imaging lens system (its reference numeral is omitted) of the present disclosure and an image sensor 1390. The imaging lens system includes, in order from an object side to an image side, an aperture stop 1300, a first lens element 1310, a second lens element 1320, a stop 1301, a third lens element 1330, a fourth lens element 1340, a fifth lens element 1350, a sixth lens element 1360, a filter 1370 and an image surface 1380. The imaging lens system includes six lens elements (1310, 1320, 1330, 1340, 1350 and 1360) with no additional lens element disposed between each of the adjacent six lens elements.

The first lens element 1310 with positive refractive power has an object-side surface 1311 being convex in a paraxial region thereof and an image-side surface 1312 being convex in a paraxial region thereof. The first lens element 1310 is made of plastic material and has the object-side surface 1311 and the image-side surface 1312 being both aspheric.

The second lens element 1320 with negative refractive power has an object-side surface 1321 being convex in a paraxial region thereof and an image-side surface 1322 being concave in a paraxial region thereof. The second lens element 1320 is made of plastic material and has the object-side surface 1321 and the image-side surface 1322 being both aspheric.

The third lens element 1330 with negative refractive power has an object-side surface 1331 being convex in a paraxial region thereof and an image-side surface 1332 being concave in a paraxial region thereof. The third lens element 1330 is made of plastic material and has the object-side surface 1331 and the image-side surface 1332 being both aspheric. Each of the object-side surface 1331 and the image-side surface 1332 of the third lens element 1330 has at least one critical point. The image-side surface 1332 of the third lens element 1330 has at least one convex shape in an off-axis region thereof.

The fourth lens element 1340 with positive refractive power has an object-side surface 1341 being concave in a paraxial region thereof and an image-side surface 1342 being convex in a paraxial region thereof. The fourth lens element 1340 is made of plastic material and has the object-side surface 1341 and the image-side surface 1342 being both aspheric. The image-side surface 1342 of the fourth lens element 1340 has at least one convex shape in an off-axis region thereof.

The fifth lens element 1350 with positive refractive power has an object-side surface 1351 being convex in a paraxial region thereof and an image-side surface 1352 being concave in a paraxial region thereof. The fifth lens element 1350 is made of plastic material and has the object-side surface 1351 and the image-side surface 1352 being both aspheric. The image-side surface 1352 of the fifth lens element 1350 has at least one convex shape in an off-axis region thereof.

The sixth lens element 1360 with negative refractive power has an object-side surface 1361 being concave in a paraxial region thereof and an image-side surface 1362 being concave in a paraxial region thereof. The sixth lens element 1360 is made of plastic material and has the object-side surface 1361 and the image-side surface 1362 being both aspheric. The image-side surface 1362 of the sixth lens element 1360 has at least one inflection point. The image-side surface 1362 of the sixth lens element 1360 has at least one convex shape in an off-axis region thereof.

The filter 1370 is made of glass material and located between the sixth lens element 1360 and the image surface 1380, and will not affect the focal length of the imaging lens system. The image sensor 1390 is disposed on or near the image surface 1380 of the imaging lens system.

In this embodiment, there are two lens elements (the third lens element 1330 and the fourth lens element 1340) satisfying the following condition: |f/Rf|+|f/Rr|<0.80. When a focal length of the imaging lens system is f, a curvature radius of the object-side surface 1331 of the third lens element 1330 is R5, and a curvature radius of the image-side surface 1332 of the third lens element 1330 is R6, the following condition is satisfied: |f/R5|+|f/R6|=0.37. When a curvature radius of the object-side surface 1341 of the fourth lens element 1340 is R7, and a curvature radius of the image-side surface 1342 of the fourth lens element 1340 is R8, the following condition is satisfied: |f/R7|+|f/R8|=0.10.

The detailed optical data of the 13th embodiment are shown in Table 25 and the aspheric surface data are shown in Table 26 below.

TABLE 25

13th embodiment
f = 4.65 mm, Fno = 1.77, HFOV = 40.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.485 | | | | |
| 2 | Lens 1 | 1.780 (ASP) | 0.793 | Plastic | 1.543 | 56.5 | 3.27 |
| 3 | | −626.919 (ASP) | 0.045 | | | | |
| 4 | Lens 2 | 407.607 (ASP) | 0.245 | Plastic | 1.634 | 23.8 | −6.42 |
| 5 | | 4.026 (ASP) | 0.268 | | | | |
| 6 | Stop | Plano | 0.190 | | | | |
| 7 | Lens 3 | 104.187 (ASP) | 0.313 | Plastic | 1.584 | 28.2 | −28.24 |
| 8 | | 14.227 (ASP) | 0.210 | | | | |
| 9 | Lens 4 | −97.512 (ASP) | 0.257 | Plastic | 1.584 | 28.2 | 2163.91 |
| 10 | | −90.617 (ASP) | 0.457 | | | | |
| 11 | Lens 5 | 3.027 (ASP) | 0.751 | Plastic | 1.530 | 55.8 | 5.88 |
| 12 | | 95.969 (ASP) | 0.778 | | | | |
| 13 | Lens 6 | −40.705 (ASP) | 0.430 | Plastic | 1.535 | 56.3 | −3.94 |
| 14 | | 2.230 (ASP) | 0.400 | | | | |
| 15 | Filter | Plano | 0.110 | Glass | 1.517 | 64.2 | — |
| 16 | | Plano | 0.196 | | | | |
| 17 | Image | Plano | — | | | | |

Note:
Reference wavelength is 587.6 nm (d-line).
An effective radius of the stop 1301 (Surface 6) is 1.086 mm.

TABLE 26

Aspheric Coefficients

| Surface # | 2 | 3 | 4 | 5 | 7 | 8 |
|---|---|---|---|---|---|---|
| k = | −5.3616E−01 | 0.0000E+00 | 9.0000E+01 | 2.0476E+00 | −9.0000E+01 | 8.9563E+01 |
| A4 = | −4.5479E−03 | −3.8493E−02 | −2.6273E−02 | 7.1477E−04 | −1.0817E−01 | −1.4455E−01 |
| A6 = | 5.8514E−02 | 9.6768E−02 | 1.3728E−01 | 1.1124E−01 | 6.5270E−02 | 1.4549E−01 |
| A8 = | −1.0197E−01 | −1.1127E−01 | −1.4614E−01 | −1.9886E−02 | −1.6441E−01 | −2.0559E−01 |
| A10 = | 9.4332E−02 | 5.4690E−02 | 7.6703E−02 | 2.6361E−01 | 1.9073E−01 | 1.6669E−01 |
| A12 = | −4.4798E−02 | −1.0979E−02 | −1.0600E−02 | −1.9006E−01 | −1.4248E−01 | −8.8401E−02 |
| A14 = | 7.2895E−03 | — | −3.9661E−04 | 6.3215E−02 | 4.5006E−02 | 2.1743E−02 |

| Surface # | 9 | 10 | 11 | 12 | 13 | 14 |
|---|---|---|---|---|---|---|
| k = | 6.0000E+01 | −3.9284E−14 | −1.8635E+00 | 6.8527E+01 | 3.2653E+01 | −4.9519E+00 |
| A4 = | −1.4904E−01 | −1.5812E−01 | −5.0990E−02 | 1.0945E−02 | −1.9132E−01 | −1.2328E−01 |
| A6 = | 6.5288E−02 | 6.5620E−02 | 4.2908E−03 | −2.3211E−02 | 9.1290E−02 | 5.3645E−02 |
| A8 = | 8.7633E−02 | 3.3367E−02 | 9.7441E−03 | 1.9106E−02 | −2.9055E−02 | −1.6209E−02 |
| A10 = | −1.1786E−01 | −3.0680E−02 | −8.3510E−03 | −9.6536E−03 | 8.1110E−03 | 3.2863E−03 |
| A12 = | 5.0708E−02 | 7.0067E−03 | 2.9357E−03 | 2.9137E−03 | −1.7735E−03 | −4.2946E−04 |
| A14 = | −7.9864E−03 | −1.7039E−04 | −5.4181E−04 | −5.4000E−04 | 2.5773E−04 | 3.5421E−05 |
| A16 = | — | −8.6476E−05 | 5.4798E−05 | 6.0053E−05 | −2.2679E−05 | −1.7968E−06 |
| A18 = | — | — | −2.8370E−06 | −3.6577E−06 | 1.0903E−06 | 5.2325E−08 |
| A20 = | — | — | 5.7292E−08 | 9.3626E−08 | −2.1986E−08 | −6.9584E−10 |

In the 13th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 13th embodiment, so an explanation in this regard will not be provided again.

Moreover, these parameters can be calculated from Table 25 and Table 26 as the following values and satisfy the following conditions:

13th Embodiment

| | | | | |
|---|---|---|---|---|
| f [mm] | 4.65 | (TL)$^2$/(ImgH × EPD) | 2.73 | |
| Fno | 1.77 | TL/ImgH | 1.32 | |
| HFOV [deg.] | 40.9 | TL/(EPD + ImgH) | 0.81 | |
| V3 | 28.2 | ImgH/Fno [mm] | 2.33 | |
| V4 | 28.2 | SD/TD | 0.90 | |
| V3/N3 | 17.80 | tan(HFOV) | 0.87 | |
| V4/N4 | 17.80 | f/EPD | 1.77 | |
| V2 + V3 + V4 | 80.2 | Yc31/Yc32 | 0.38 | |
| [(V1 − V3) × (V1 − V4)]/ [(V3 − V2) × (V4 − V2)] | 41.37 | Yc41/Yc42 | — | |
| (CT2 + CT3 + CT4)/ImgH | 0.20 | Yc61/Yc62 | — | |
| (T23 + T45)/(CT2 + CT3 + CT4) | 1.12 | \|f/R1\| + \|f/R2\| | 2.62 | |
| (R9 − R10)/(R9 + R10) | −0.94 | \|f/R3\| + \|f/R4\| | 1.17 | |
| \|(R5 − R6)/(R5 + R6)\| + \|(R7 − R8)/(R7 + R8)\| | 0.80 | \|f/R5\| + \|f/R6\| | 0.37 | |

-continued

13th Embodiment

| | | | |
|---|---|---|---|
| f/f12 | 0.86 | \|f/R7\| + \|f/R8\| | 0.10 |
| f/f3 | −0.16 | \|f/R9\| + \|f/R10\| | 1.58 |
| \|f/f3\| + \|f/f4\| | 0.17 | \|f/R11\| + \|f/R12\| | 2.20 |
| TL/EPD | 2.07 | — | — |

14th Embodiment

Figure 27:
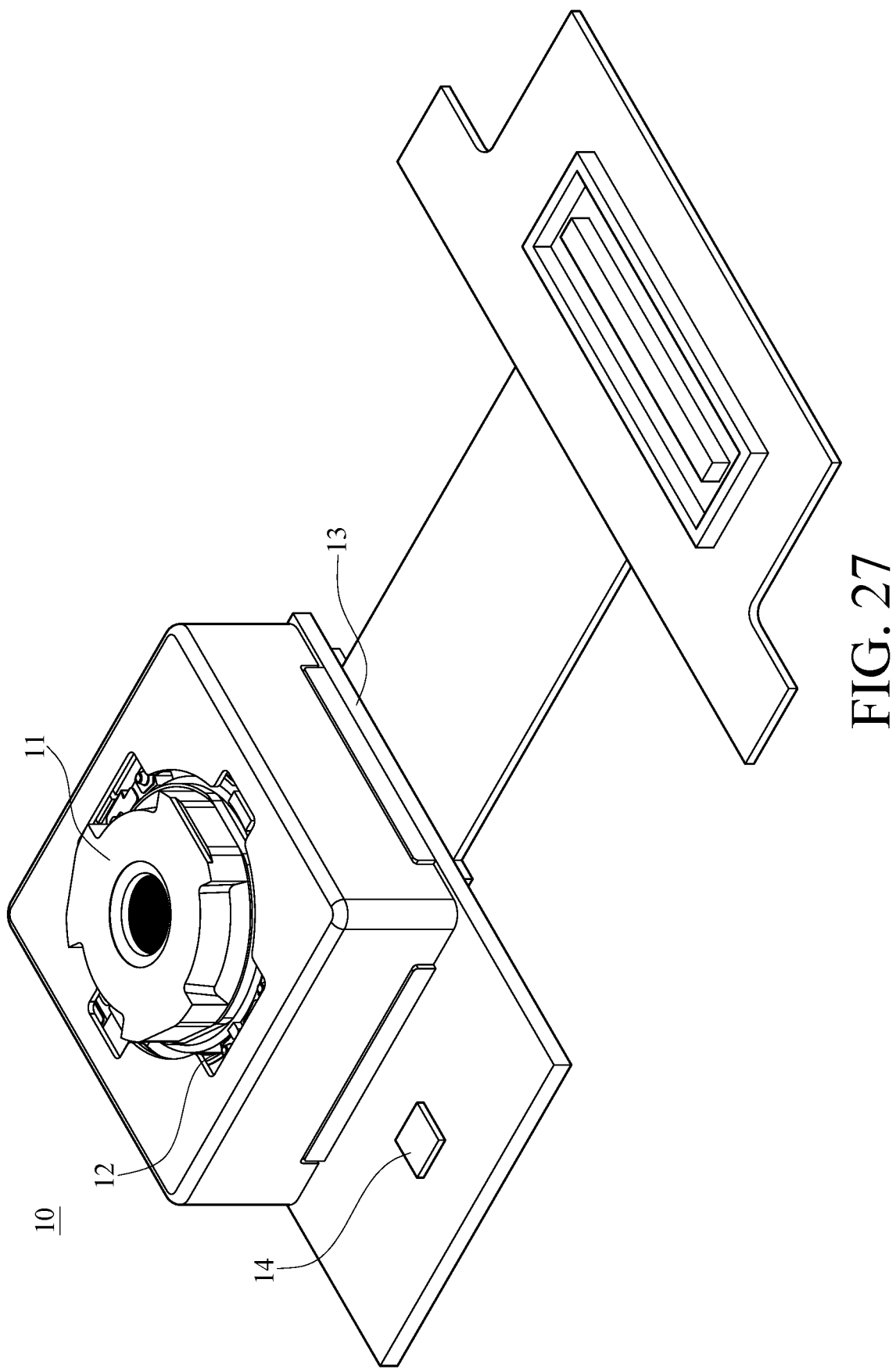
FIG. 27 is a perspective view of an image capturing unit according to the 14th embodiment of the present disclosure.

FIG. 27 is a perspective view of an image capturing unit according to the 14th embodiment of the present disclosure. In this embodiment, an image capturing unit 10 is a camera module including a lens unit 11, a driving device 12, an image sensor 13 and an image stabilizer 14. The lens unit 11 includes the imaging lens system disclosed in the 1st embodiment, a barrel and a holder member (their reference numerals are omitted) for holding the imaging lens system. The imaging light converges in the lens unit 11 of the image capturing unit 10 to generate an image with the driving device 12 utilized for focusing the image on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the imaging lens system to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving the image quality while in motion or low-light conditions.

15th Embodiment

Figure 28:
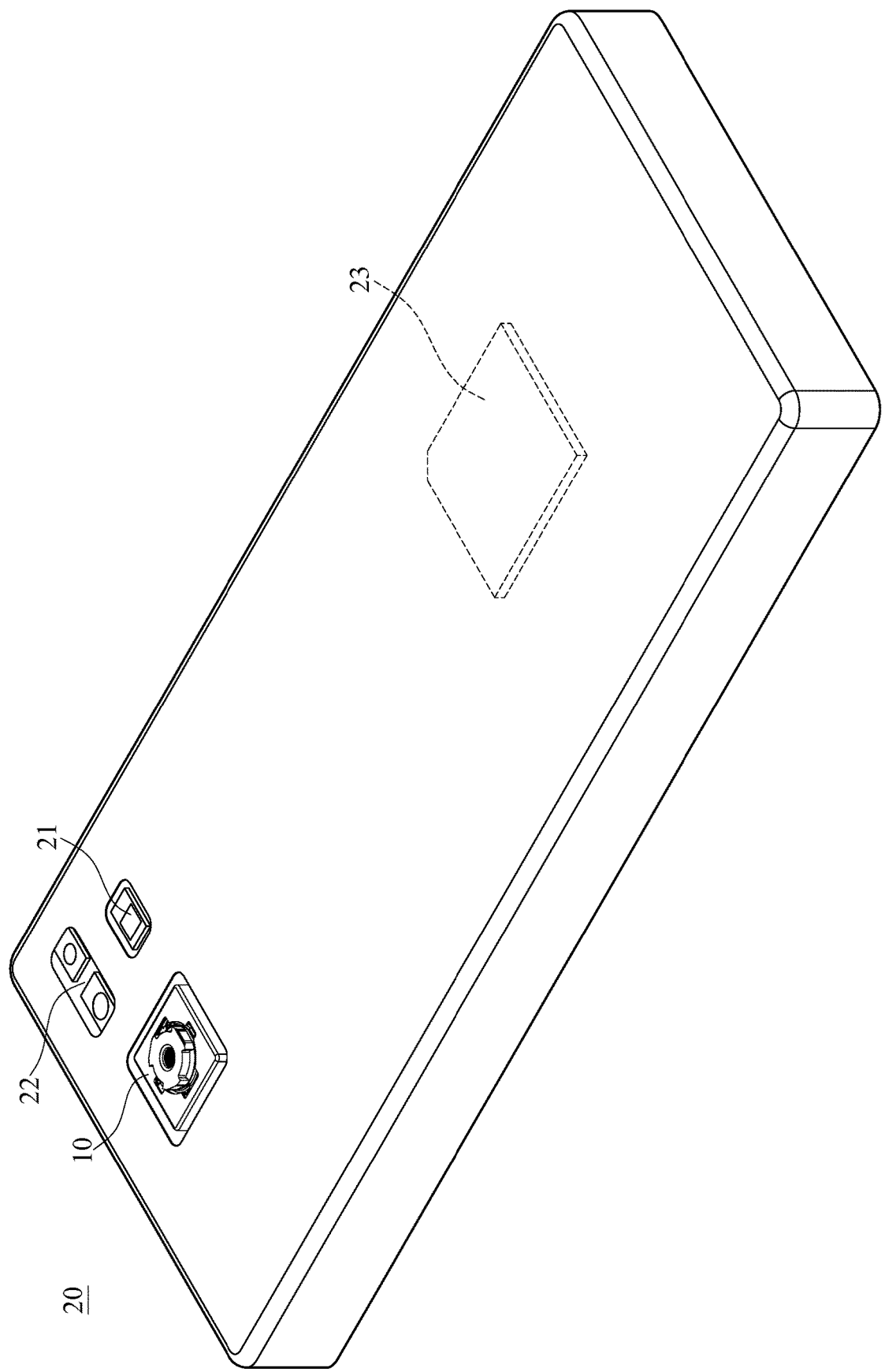
FIG. 28 is one perspective view of an electronic device according to the 15th embodiment of the present disclosure.
Figure 29:
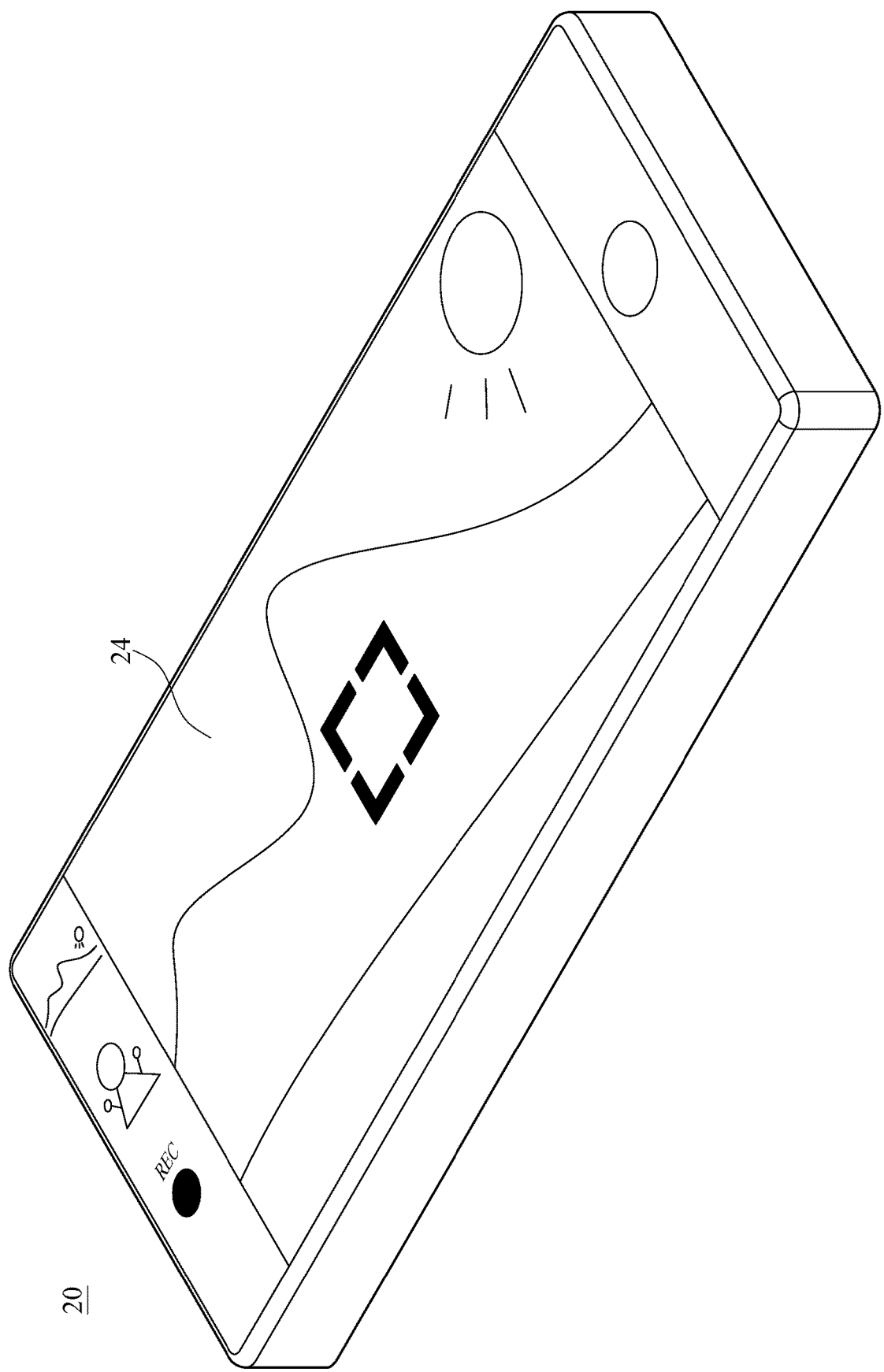
FIG. 29 is another perspective view of the electronic device in FIG. 28.
Figure 30:
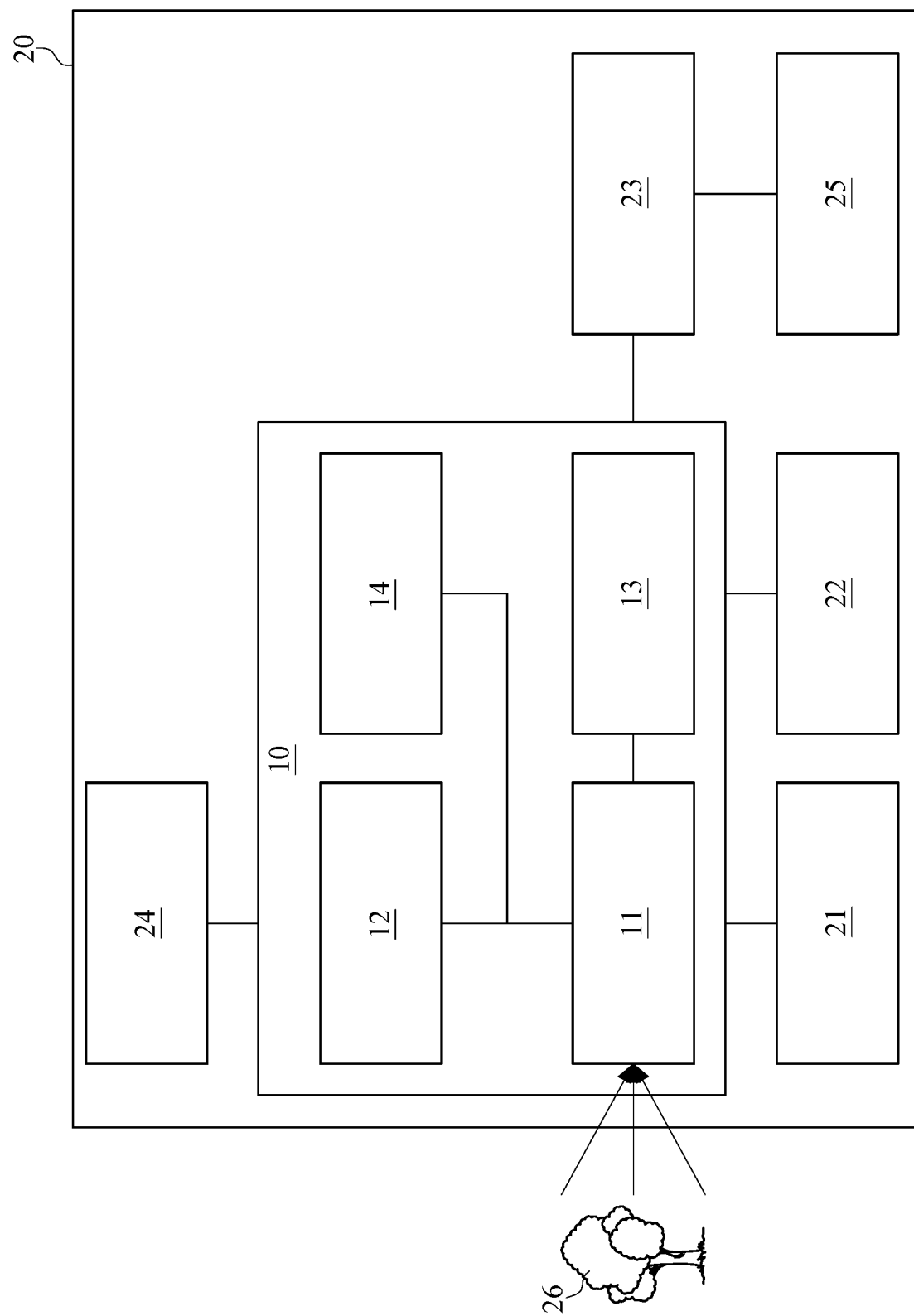
FIG. 30 is a block diagram of the electronic device in FIG. 28.

FIG. 28 is one perspective view of an electronic device according to the 15th embodiment of the present disclosure. FIG. 29 is another perspective view of the electronic device in FIG. 28. FIG. 30 is a block diagram of the electronic device in FIG. 28. In this embodiment, an electronic device 20 is a smartphone including the image capturing unit 10 disclosed in the 14th embodiment, a flash module 21, a focus assist module 22, an image signal processor 23, a user interface 24 and an image software processor 25. In this embodiment, the electronic device 20 includes one image capturing unit 10, but the disclosure is not limited thereto. In some cases, the electronic device 20 can include multiple image capturing units 10, or the electronic device 20 further includes another different image capturing unit.

When a user captures images of an object 26 through the user interface 24, the light rays converge in the image capturing unit 10 to generate an image, and the flash module 21 is activated for light supplement. The focus assist module 22 detects the object distance of the imaged object 26 to achieve fast auto focusing. The image signal processor 23 is configured to optimize the captured image to improve the image quality. The light beam emitted from the focus assist module 22 can be either conventional infrared or laser. The user interface 24 can be a touch screen or a physical button. The user is able to interact with the user interface 24 and the image software processor 25 having multiple functions to capture images and enable further image processing.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the imaging lens system of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multiple camera devices, image recognition systems, motion sensing input devices, wearable devices and other electronic imaging devices.

The foregoing description, for the purpose of explanation, has been described with reference to specific embodiments. It is to be noted that TABLES 1-26 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens system comprising six lens elements, the six lens elements being, in order from an object side to an image side, a first lens element, a second lens element, a third lens element, a fourth lens element, a fifth lens element and a sixth lens element; the sixth lens element having an image-side surface being concave in a paraxial region thereof, and the image-side surface of the sixth lens element having at least one inflection point;

wherein an axial distance between an object-side surface of the first lens element and an image surface is TL, a maximum image height of the imaging lens system is ImgH, an entrance pupil diameter of the imaging lens system is EPD, an Abbe number of the first lens element is V1, an Abbe number of the second lens element is V2, an Abbe number of the third lens element is V3, an Abbe number of the fourth lens element is V4, a focal length of the imaging lens system is f, a focal length of the fifth lens element is f5, and the following conditions are satisfied:

$1.0 < (TL)^2/(ImgH \times EPD) < 5.0;$ $3.50 < [(V1-V3) \times (V1-V4)]/[(V3-V2) \times (V4-V2)] < 220;$ $1.0 < TL/EPD < 2.50;$ and $-0.10 \le f/f5 < 2.50.$ 2. The imaging lens system of claim 1, wherein the sixth lens element has negative refractive power.

3. The imaging lens system of claim 1, wherein the second lens element has an object-side surface being convex in a paraxial region thereof and an image-side surface being concave in a paraxial region thereof.

4. The imaging lens system of claim 1, wherein the image-side surface of the sixth lens element has a concave-to-convex shape change and a convex-to-concave shape change in order from the paraxial region thereof to an off-axis region thereof.

5. The imaging lens system of claim 1, wherein the Abbe number of the first lens element is V1, the Abbe number of the second lens element is V2, the Abbe number of the third lens element is V3, the Abbe number of the fourth lens element is V4, an Abbe number of the fifth lens element is V5, an Abbe number of the sixth lens element is V6, and the following conditions are satisfied:

$$V2<V3<V1;$$

$$V2<V3<V5;$$

$$V2<V3<V6;$$

$$V2<V4<V1;$$

$$V2<V4<V5; \text{ and}$$

$$V2<V4<V6.$$

6. The imaging lens system of claim 1, further comprising an aperture stop disposed between an imaged object and the second lens element, wherein an axial distance between the aperture stop and the image-side surface of the sixth lens element is SD, an axial distance between the object-side surface of the first lens element and the image-side surface of the sixth lens element is TD, and the following condition is satisfied:

$$0.73<SD/TD<1.10.$$

7. The imaging lens system of claim 1, wherein the focal length of the imaging lens system is f, a focal length of the third lens element is f3, a focal length of the fourth lens element is f4, and the following condition is satisfied:

$$|f/f3|+|f/f4|<0.70.$$

8. The imaging lens system of claim 1, wherein an axial distance between the second lens element and the third lens element is T23, an axial distance between the fourth lens element and the fifth lens element is T45, a central thickness of the second lens element is CT2, a central thickness of the third lens element is CT3, a central thickness of the fourth lens element is CT4, and the following condition is satisfied:

$$0.80<(T23+T45)/(CT2+CT3+CT4)<1.80.$$

9. The imaging lens system of claim 1, wherein at least one lens element among the six lens elements satisfies the following conditions:
the focal length of the imaging lens system is f, a curvature radius of an object-side surface of the at least one lens element is Rf, a curvature radius of an image-side surface of the at least one lens element is Rr, and $|f/Rf|+|f/Rr|<0.80$.

10. The imaging lens system of claim 1, wherein the axial distance between the object-side surface of the first lens element and the image surface is TL, the maximum image height of the imaging lens system is ImgH, the focal length of the imaging lens system is f, the entrance pupil diameter of the imaging lens system is EPD, and the following conditions are satisfied:

$$0.70<TL/ImgH<1.45; \text{ and}$$

$$0.90<f/EPD<1.95.$$

11. The imaging lens system of claim 1, wherein the fifth lens element has positive refractive power, the focal length of the imaging lens system is f, a composite focal length of the first lens element and the second lens element is f12, and the following condition is satisfied:

$$0<f/f12<1.80.$$

12. The imaging lens system of claim 1, wherein the Abbe number of the third lens element is V3, a refractive index of the third lens element is N3, and the following condition is satisfied:

$$15.0<V3/N3<25.0.$$

13. The imaging lens system of claim 1, wherein a vertical distance between a non-axial critical point on an object-side surface of the third lens element and an optical axis is Yc31, a vertical distance between a non-axial critical point on an image-side surface of the third lens element and the optical axis is Yc32, and the following condition is satisfied:

$$0.50<Yc31/Yc32<1.80.$$

14. An imaging lens system comprising six lens elements, the six lens elements being, in order from an object side to an image side, a first lens element, a second lens element, a third lens element, a fourth lens element, a fifth lens element and a sixth lens element; the second lens element having negative refractive power, the sixth lens element having an image-side surface being concave in a paraxial region thereof, and the image-side surface of the sixth lens element having at least one inflection point;
wherein an axial distance between an object-side surface of the first lens element and an image surface is TL, a maximum image height of the imaging lens system is ImgH, an entrance pupil diameter of the imaging lens system is EPD, an Abbe number of the third lens element is V3, an Abbe number of the fourth lens element is V4, a focal length of the imaging lens system is f, a focal length of the third lens element is f3, and the following conditions are satisfied:

$$1.0<(TL)^2/(ImgH \times EPD)<3.40;$$

$$10.0<V3<35.0;$$

$$10.0<V4<35.0; \text{ and}$$

$$-1.50<f/f3<0.90.$$

15. The imaging lens system of claim 14, wherein the object-side surface of the first lens element is convex in a paraxial region thereof, and the first lens element has an image-side surface being concave in a paraxial region thereof.

16. The imaging lens system of claim 14, wherein the third lens element has an object-side surface being convex in a paraxial region thereof and an image-side surface being concave in a paraxial region thereof.

17. The imaging lens system of claim 14, wherein the sixth lens element has an object-side surface being convex in a paraxial region thereof.

18. The imaging lens system of claim 14, wherein half of a maximum field of view of the imaging lens system is HFOV, the focal length of the imaging lens system is f, the entrance pupil diameter of the imaging lens system is EPD, and the following conditions are satisfied:

$0.75 < \tan(\text{HFOV}) < 1.40$; and $0.90 < f/\text{EPD} < 1.95$.

19. The imaging lens system of claim 14, wherein the Abbe number of the fourth lens element is V4, a refractive index of the fourth lens element is N4, and the following condition is satisfied:

$15.0 < V4/N4 < 25.0$.

20. The imaging lens system of claim 14, wherein an Abbe number of the second lens element is V2, the Abbe number of the third lens element is V3, the Abbe number of the fourth lens element is V4, and the following condition is satisfied:

$30 < V2 + V3 + V4 < 90$.

21. The imaging lens system of claim 14, wherein the axial distance between the object-side surface of the first lens element and the image surface is TL, the entrance pupil diameter of the imaging lens system is EPD, the maximum image height of the imaging lens system is ImgH, and the following condition is satisfied:

$0.50 < \text{TL}/(\text{EPD} + \text{ImgH}) < 0.90$.

22. The imaging lens system of claim 14, wherein a curvature radius of an object-side surface of the third lens element is R5, a curvature radius of an image-side surface of the third lens element is R6, a curvature radius of an object-side surface of the fourth lens element is R7, a curvature radius of an image-side surface of the fourth lens element is R8, and the following condition is satisfied:

$|(R5-R6)/(R5+R6)| + |(R7-R8)/(R7+R8)| < 1.20$.

23. The imaging lens system of claim 14, wherein a curvature radius of an object-side surface of the fifth lens element is R9, a curvature radius of an image-side surface of the fifth lens element is R10, and the following condition is satisfied:

$-4.0 < (R9-R10)/(R9+R10) < 1.0$.

24. The imaging lens system of claim 14, wherein the maximum image height of the imaging lens system is ImgH, an f-number of the imaging lens system is Fno, and the following condition is satisfied:

$1.80 \text{ [mm]} < \text{ImgH}/\text{Fno} < 3.50 \text{ [mm]}$.

25. The imaging lens system of claim 14, wherein a central thickness of the second lens element is CT2, a central thickness of the third lens element is CT3, a central thickness of the fourth lens element is CT4, the maximum image height of the imaging lens system is ImgH, and the following condition is satisfied:

$0.05 < (CT2 + CT3 + CT4)/\text{ImgH} < 0.25$.

26. The imaging lens system of claim 14, wherein a vertical distance between a non-axial critical point on an object-side surface of the sixth lens element and an optical axis is Yc61, a vertical distance between a non-axial critical point on the image-side surface of the sixth lens element and the optical axis is Yc62, and the following condition is satisfied:

$0.10 < Yc61/Yc62 < 4.0$.

27. The imaging lens system of claim 14, wherein a vertical distance between a non-axial critical point on an object-side surface of the fourth lens element and an optical axis is Yc41, a vertical distance between a non-axial critical point on an image-side surface of the fourth lens element and the optical axis is Yc42, and the following condition is satisfied:

$0.50 < Yc41/Yc42 < 2.0$.

28. The imaging lens system of claim 14, wherein each of an image-side surface of the third lens element, an image-side surface of the fourth lens element, an image-side surface of the fifth lens element, and the image-side surface of the sixth lens element has at least one convex shape in an off-axis region thereof.

29. An image capturing unit, comprising:
   the imaging lens system of claim 14;
   a driving device disposed on the imaging lens system; and
   an image sensor disposed on the image surface of the imaging lens system.

30. An electronic device, comprising:
   the image capturing unit of claim 29.

* * * * *